US011990722B2

(12) United States Patent
Johnson et al.

(10) Patent No.: US 11,990,722 B2
(45) Date of Patent: *May 21, 2024

(54) ROBOTIC WIRE TERMINATION SYSTEM

(71) Applicant: Onanon, Inc., Milpitas, CA (US)

(72) Inventors: Dennis J. Johnson, Milpitas, CA (US); Brian Fang, Milpitas, CA (US)

(73) Assignee: Onanon, Inc., Milpitas, CA (US)

(*) Notice: Subject to any disclaimer, the term of this patent is extended or adjusted under 35 U.S.C. 154(b) by 20 days.

This patent is subject to a terminal disclaimer.

(21) Appl. No.: 17/985,298

(22) Filed: Nov. 11, 2022

(65) Prior Publication Data
US 2023/0074234 A1 Mar. 9, 2023

Related U.S. Application Data

(63) Continuation of application No. 17/121,034, filed on Dec. 14, 2020, now Pat. No. 11,502,470, which is a
(Continued)

(51) Int. Cl.
B23K 37/00 (2006.01)
B23K 3/08 (2006.01)
(Continued)

(52) U.S. Cl.
CPC ......... H01R 43/0249 (2013.01); B23K 3/087 (2013.01); B23K 37/04 (2013.01); H01R 43/0263 (2013.01)

(58) Field of Classification Search
CPC ................ H01R 43/0249; H01R 43/0263; H01R 43/01; H01R 2107/00; B23K 37/04;
(Continued)

(56) References Cited

U.S. PATENT DOCUMENTS 3,418,544 A 12/1968 France
3,608,190 A 9/1971 Steranko
(Continued)

FOREIGN PATENT DOCUMENTS

GB 1499678 A 2/1978
JP 56102370 A 8/1981
(Continued)

OTHER PUBLICATIONS

PCT International Preliminary Report on Patentability and Written Opinion for PCT/US2015/027111; dated Nov. 2, 2017.
(Continued)

Primary Examiner — Kiley S Stoner
(74) Attorney, Agent, or Firm — Neustel Law Offices

(57) ABSTRACT

A robotic wire termination system for efficiently and accurately connecting a plurality of wires to an electrical connector having a plurality of connector pins with corresponding wire receptacles. The system generally includes a housing, a removable alignment plate, a robotic positioner, a heating device, a touch responsive display, and a control unit. The alignment plate removably holds a selected electrical connector in a specific position and orientation with the connector pins exposed in the housing and the wire receptacles exposed outside. The display provides a visual representation of the connector pins and selections of the connector pins. The control unit receives inputs indicating the pin selections and controls the robotic positioner to sequentially move the heating device along three orthogonal longitudinal axes to a series of heating positions relative to the selected connector pins to provide heat for melting solder to connect wires to the wire receptacles.

20 Claims, 34 Drawing Sheets

Related U.S. Application Data continuation of application No. 16/809,378, filed on Mar. 4, 2020, now Pat. No. 10,868,401.

(51) Int. Cl.
  *B23K 37/04* (2006.01)
  *H01R 43/02* (2006.01)

(58) Field of Classification Search
  CPC .......... B23K 2101/38; B23K 1/00–206; B23K 3/00–087
  See application file for complete search history.

(56) References Cited

U.S. PATENT DOCUMENTS

| | | | |
|---|---|---|---|
| 4,332,083 A | 6/1982 | Johnson, Jr. |
| 4,632,294 A | 12/1986 | Druschel |
| 4,774,760 A | 10/1988 | Seaman |
| 4,842,184 A | 6/1989 | Miller, Jr. |
| 4,987,283 A | 1/1991 | Beinhaur |
| 5,092,035 A | 3/1992 | McMichen |
| 5,145,104 A | 9/1992 | Apap |
| 5,163,856 A | 11/1992 | McGaffigan |
| 5,269,056 A | 12/1993 | Yang |
| 5,634,821 A | 6/1997 | Crane, Jr. |
| 5,651,178 A | 7/1997 | Sasse |
| 5,782,401 A | 7/1998 | Hinrichs |
| 5,808,259 A | 9/1998 | Spinner |
| 6,137,075 A | 10/2000 | Grabkowski |
| 6,142,787 A | 11/2000 | Ikesugi |
| 6,179,631 B1 | 1/2001 | Downes |
| 6,224,399 B1 | 5/2001 | Yacoub |
| 6,266,870 B1 | 7/2001 | Wollermann |
| 6,392,888 B1 | 5/2002 | Chen |
| 6,818,839 B2 | 11/2004 | Hosaka |
| 6,822,867 B2 | 11/2004 | Hsieh |
| 6,887,104 B2 | 5/2005 | Lee |
| 6,945,814 B2 | 9/2005 | Snape |
| 6,974,615 B2 | 12/2005 | Hosaka |
| 7,973,239 B2 | 7/2011 | Koyama |
| 9,190,795 B2 | 11/2015 | Johnson |
| 9,629,259 B1 | 4/2017 | Hart |
| 9,904,259 B2 | 2/2018 | Bando |
| 10,239,164 B2 | 3/2019 | Johnson |
| 2002/0077003 A1 | 6/2002 | Northey |
| 2002/0179692 A1 | 12/2002 | Tung |
| 2002/0190107 A1 | 12/2002 | Shah |
| 2004/0144834 A1 | 7/2004 | Nomoto |
| 2004/0232204 A1 | 11/2004 | Wolf |
| 2008/0155823 A1 | 7/2008 | Heinzel |
| 2008/0280495 A1 | 11/2008 | Ko |
| 2009/0080140 A1 | 3/2009 | Iyer |
| 2010/0038358 A1 | 2/2010 | Dingle |
| 2011/0113626 A1 | 5/2011 | Ng |
| 2011/0124215 A1 | 5/2011 | Yin |
| 2011/0308850 A1 | 12/2011 | Ni |
| 2014/0201989 A1 | 7/2014 | Paynter |
| 2014/0298898 A1 | 10/2014 | Yang |
| 2015/0077962 A1 | 3/2015 | Mirpuri |
| 2015/0098178 A1 | 4/2015 | Otake |
| 2015/0107103 A1 | 4/2015 | Johnson |
| 2015/0202706 A1 | 7/2015 | Brosnan |
| 2015/0229088 A1 | 8/2015 | Johnson |
| 2015/0290736 A1 | 10/2015 | Zhang |
| 2016/0207131 A1 | 7/2016 | Endress |
| 2017/0100795 A1 | 4/2017 | Wu |
| 2018/0272479 A1 | 9/2018 | Hori |
| 2019/0123463 A1 | 4/2019 | Lee |
| 2020/0036148 A1 | 1/2020 | Huang |

FOREIGN PATENT DOCUMENTS

| | | |
|---|---|---|
| JP | 02309581 A | 12/1990 |
| JP | 2012084686 A | 4/2012 |
| KR | 200291242 Y1 | 10/2002 |
| WO | 09921676 A1 | 5/1999 |

OTHER PUBLICATIONS

PCT International Search Report and Written Opinion for PCT/US2015/0271111; dated Jul. 30, 2015.

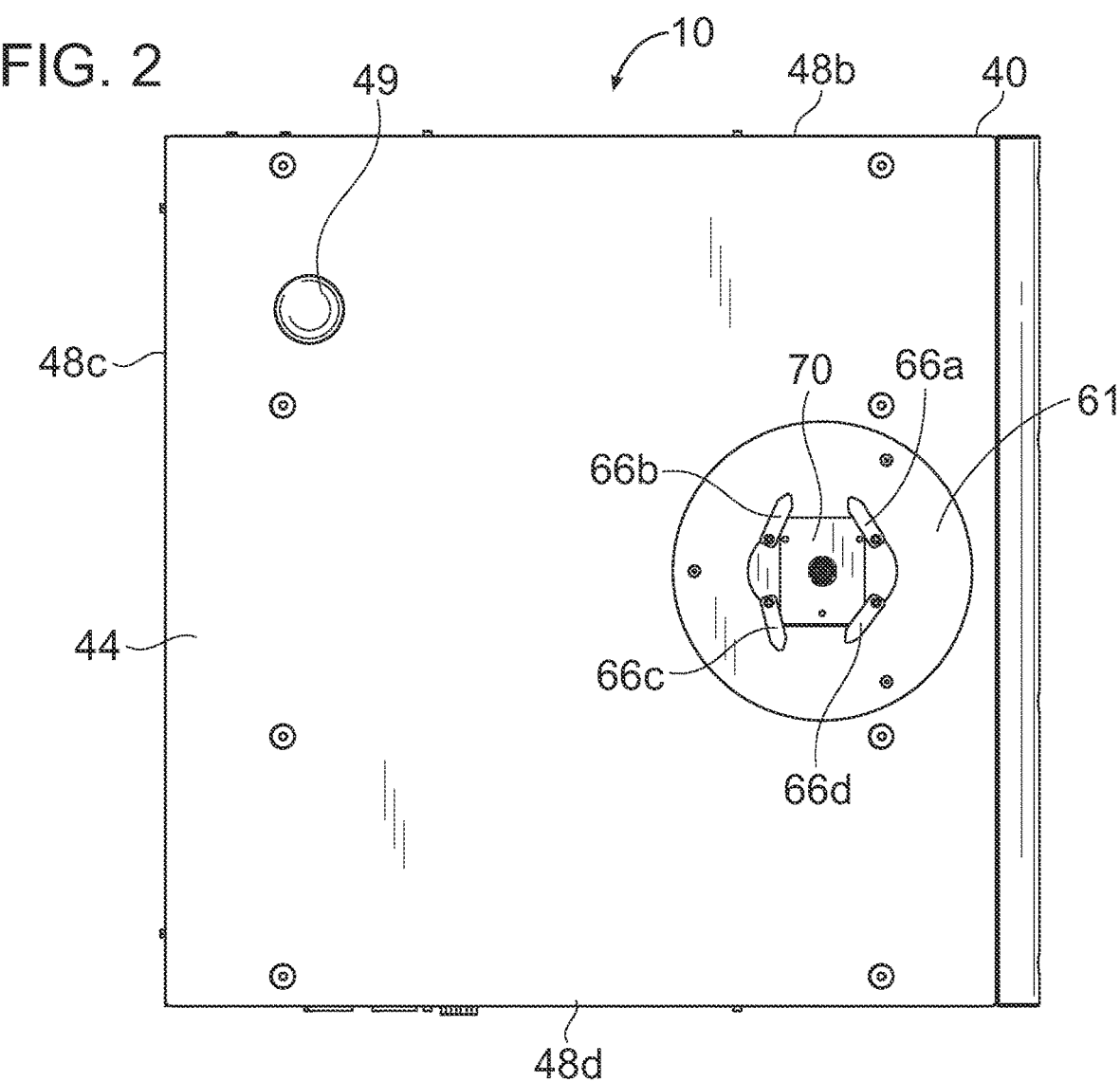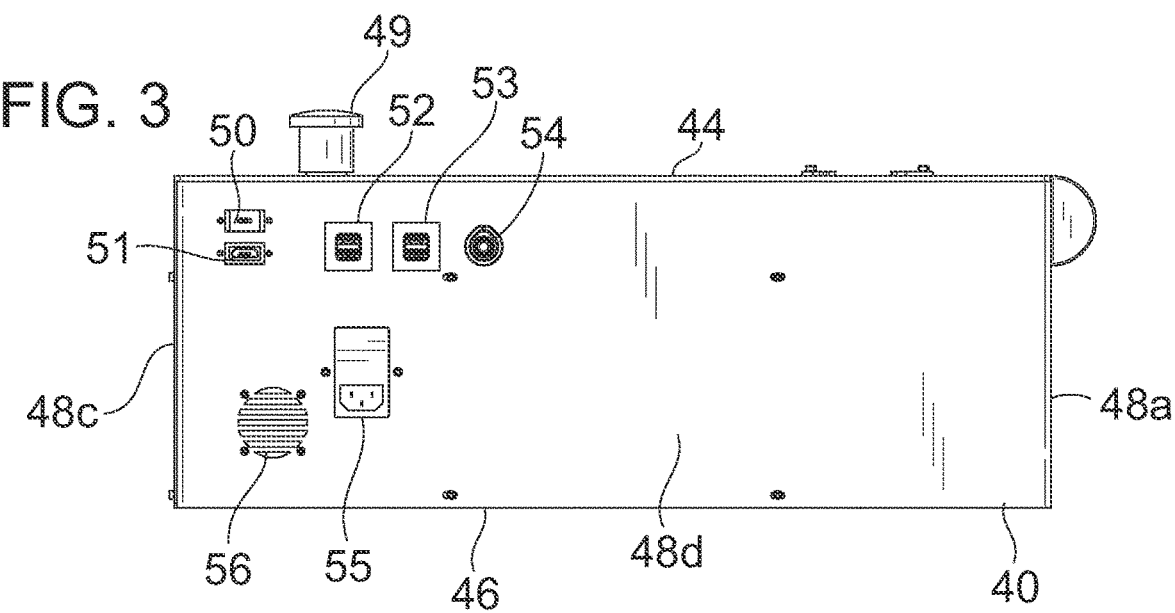

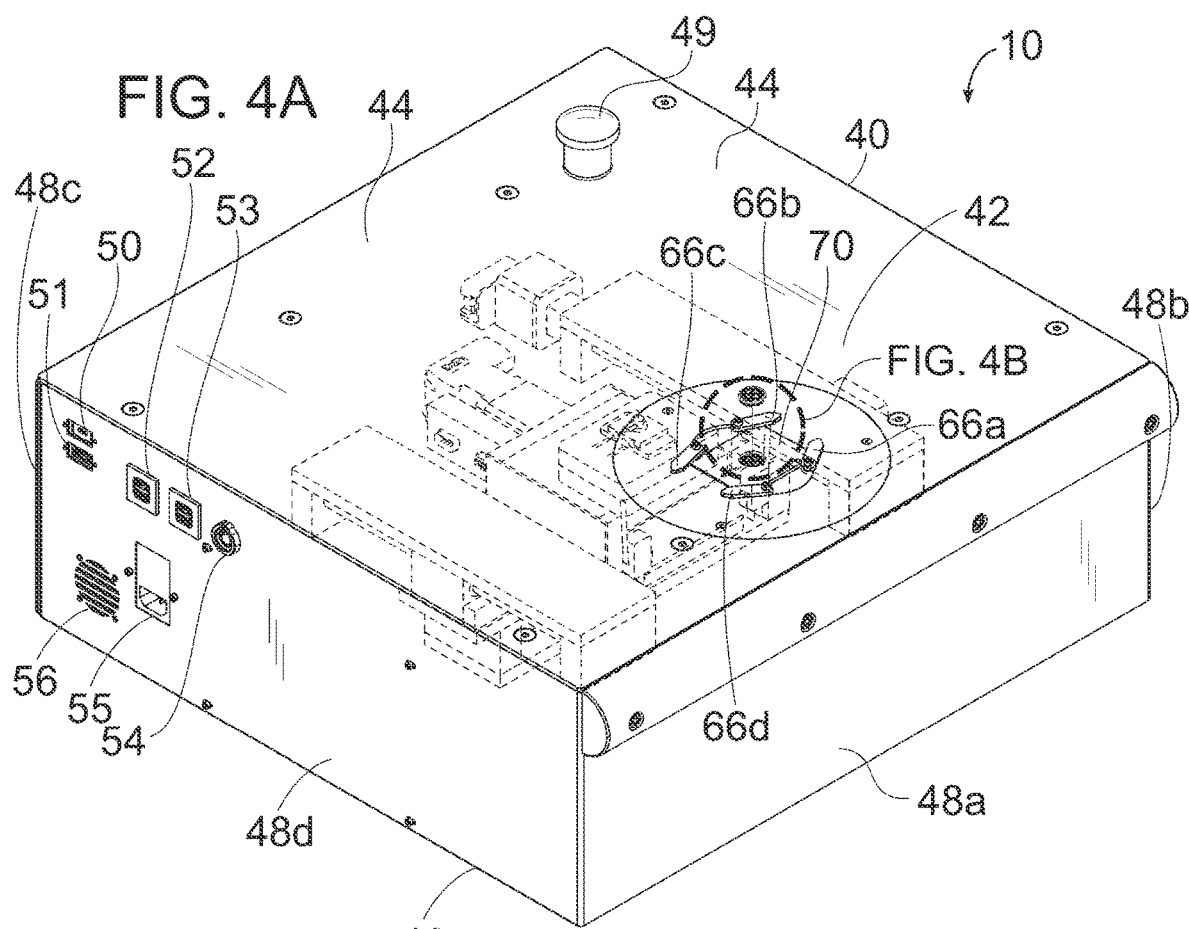
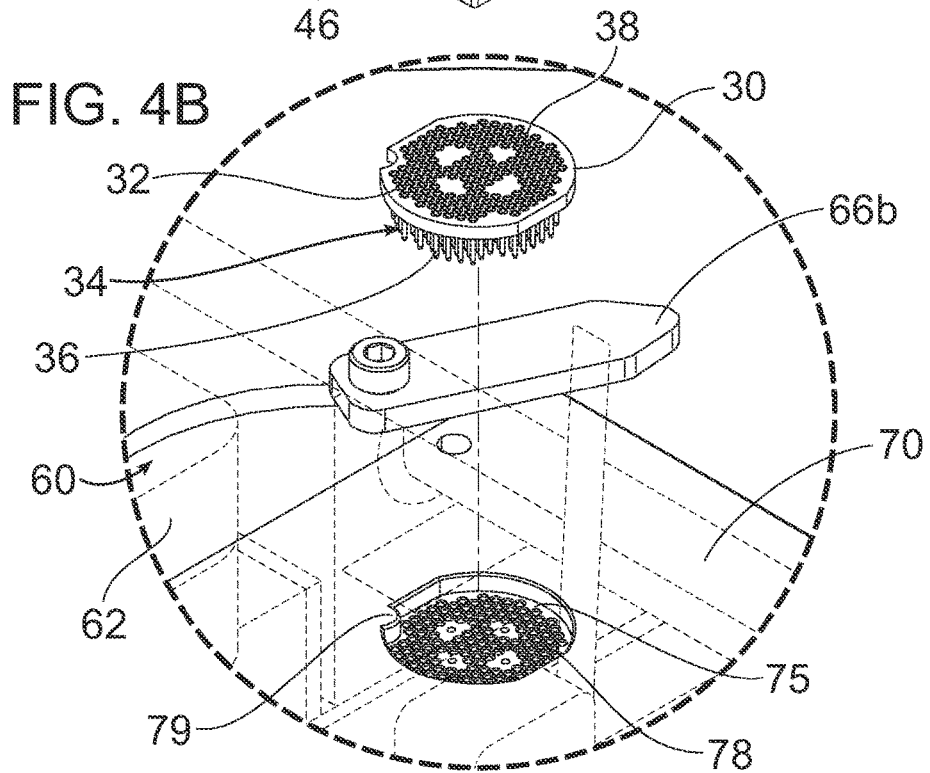

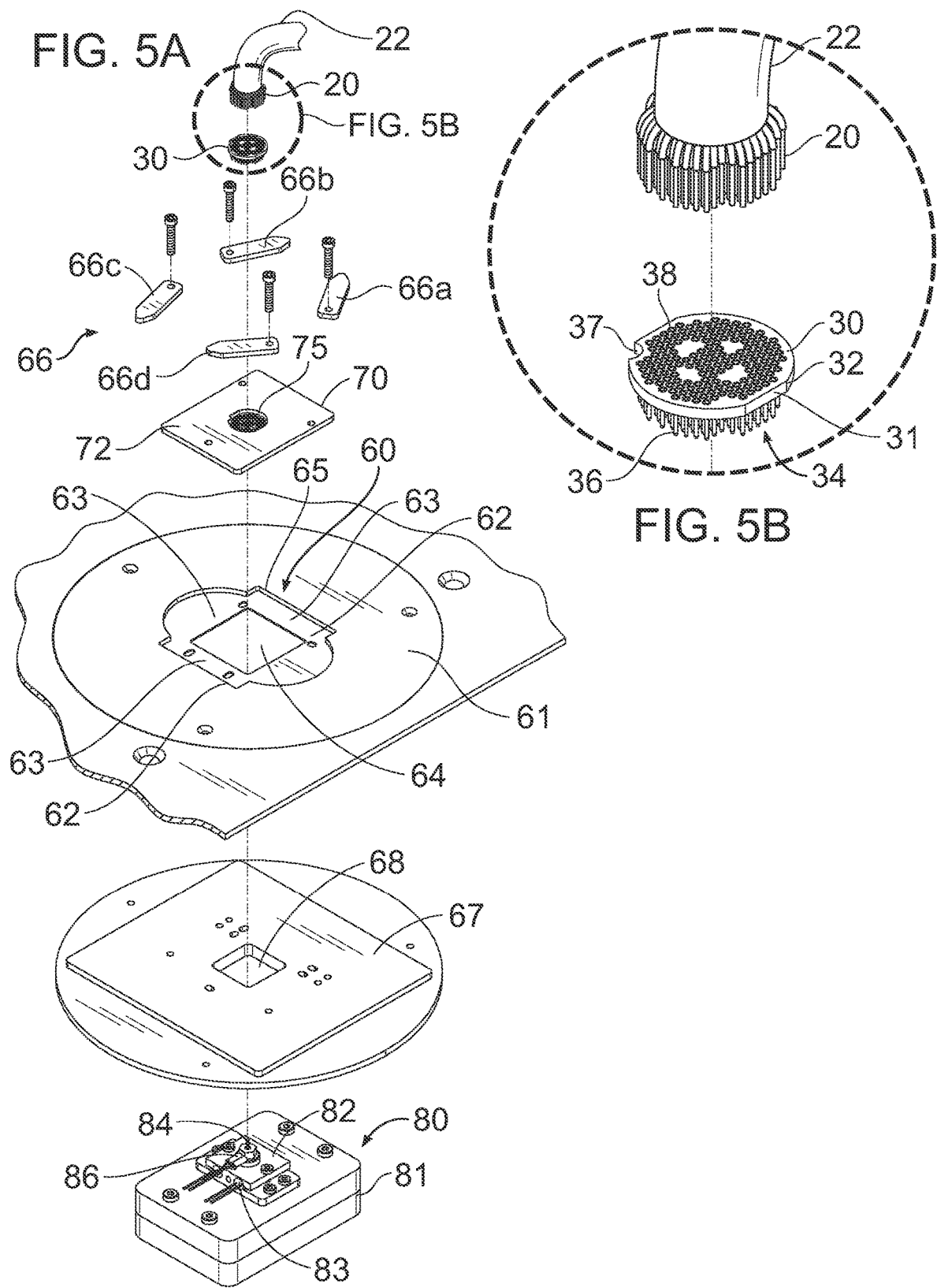

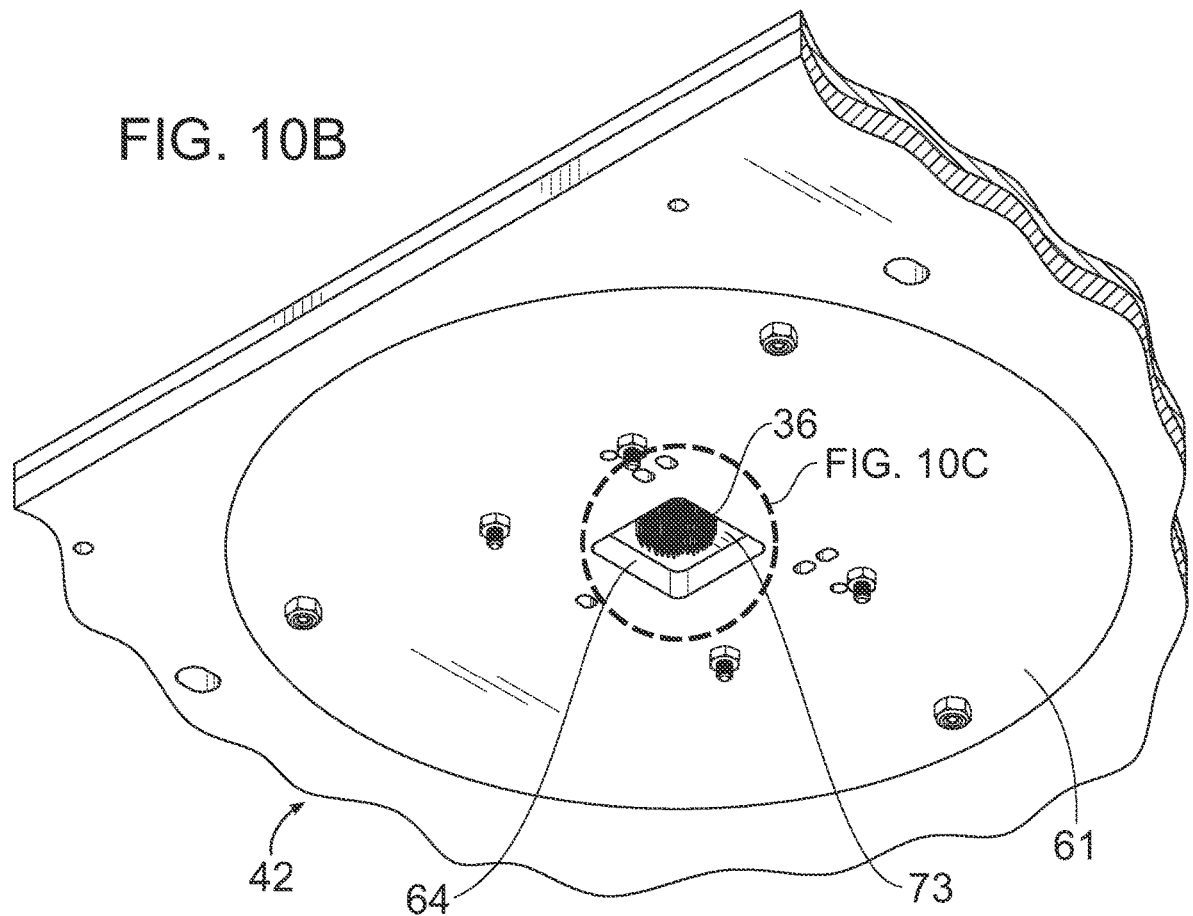
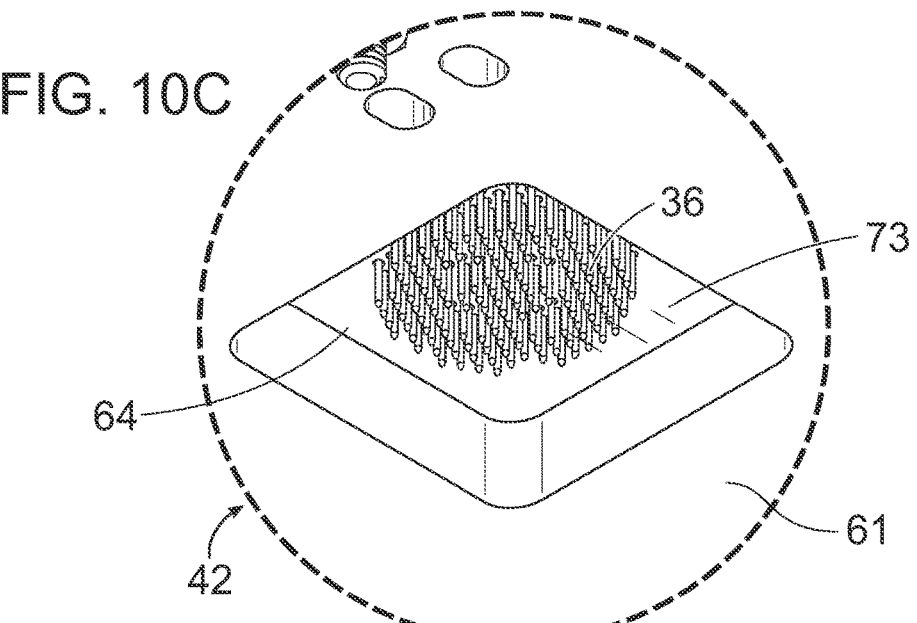

ROBOTIC WIRE TERMINATION SYSTEM

CROSS REFERENCE TO RELATED APPLICATIONS

The present application is a continuation of U.S. application Ser. No. 17/121,034 filed on Dec. 14, 2020 which issues as U.S. Pat. No. 11,502,470 on Nov. 15, 2022, which is a continuation of U.S. application Ser. No. 16/809,378 filed on Mar. 4, 2020 now issued as U.S. Pat. No. 10,868,401. Each of the aforementioned patent applications is herein incorporated by reference in their entirety.

STATEMENT REGARDING FEDERALLY SPONSORED RESEARCH OR DEVELOPMENT

Not applicable to this application.

BACKGROUND

Field

Example embodiments in general relate to a robotic wire termination system for accurately and efficiently connecting the ends of a plurality of wires to an electrical connector.

Related Art

Any discussion of the related art throughout the specification should in no way be considered as an admission that such related art is widely known or forms part of common general knowledge in the field.

There are various types of electrical connectors used today including but not limited to fine wire terminations, pinned connectors, terminal blocks, plug and socket connectors, medical connectors, transition devices and custom connectors. Conventional electrical connectors include a plurality of connector pins that are intended to be connected to the ends of a corresponding plurality of wires of a cable, typically by soldering. The ends of the wires are connected and soldered to the connector pins according to a pinout which cross-references the wires to the connector pins. Typically, technicians manually connect each individual wire to a corresponding connector pin on the electrical connector. The number of connector pins on a connector can range from 2 to greater than 100 connector pins each of which receives the end of a corresponding wire.

Medical probes typically have numerous connector pins within an electrical connector to which the ends of a corresponding number of fine wires are to be connected and soldered. For example, modern catheters may contain more than 120 40-gauge wires connecting medical transducers. A skilled technician manually connects the end of each of the fine wires to a corresponding connector pin on the electrical connector utilizing a soldering device (e.g. soldering iron or soldering gun). The technician must identify a fine wire and a corresponding connector pin to which the end of the fine wire will be connected. After identifying the proper connection point, the technician must then position the end of the fine wire adjacent to the connector pin and then heat the solder with the soldering device to melt the solder on both the fine wire and the connector pin. The technician then removes the soldering device, causing the melted solder to solidify thereby physically and electrically connecting the fine wire to the connector pin. The technician must manually repeat this process for each individual fine wire and corresponding connector pin until all of the fine wires are connected to corresponding connector pins.

As can be appreciated, the manual process of locating and soldering a plurality of wires to an electrical connector is labor intensive, time consuming, costly, and creates a significant amount of discarded material. Moreover, the process is prone to error. Errors by technicians soldering wires to electrical connectors are common with error rates approaching 25% with some medical connectors where the wires are very thin and a large number of connections are typically to be made. For example, a technician may mistakenly connect a wire to an incorrect connector pin thereby resulting in a defective electrical connector being produced. Even a single mistake can result in expense and additional time for rework to fix the defect or even the complete loss of the electrical connector. Errors by technicians are compounded by the increasingly smaller wires and larger number and smaller size of connector pins used in electrical connectors today, particularly in the medical industry, where some devices require 100 or more connector pins within a square centimeter. To make matters worse for technicians, they must often times connect and solder extremely fine wires having a 40-gauge or 50-gauge size, which are more prone to physical damage than heavier gauge wires.

Some wire termination systems have incorporated certain robotic components to automate at least a portion of the wire connection operations in order to help improve accuracy and efficiency. For example, U.S. Pat. No. 10,239,164, which is assigned to the assignee of the present application, discloses several variations of robotic positioners in a robotic wire termination system. However, further improvements are still desirable.

Because of the inherent problems and shortcomings with conventional wire termination systems, there is a need for a new and improved robotic wire termination system for accurately and efficiently connecting a plurality of wires to corresponding connector pins of an electrical connector.

SUMMARY

An example embodiment is directed to a robotic wire termination system for connecting a plurality of wires to an electrical connector. The robotic wire termination system includes a housing, an electrical connector alignment plate ("alignment plate") adapted to removably receive and hold an electrical connector having a plurality of connector pins with a plurality of corresponding wire receptacles, a robotic positioner within the housing, a heating device connected to the robotic positioner, a display adapted to display a graphical representation of the plurality of connector pins, and a control unit in communication with the display and with the robotic positioner.

The control unit is configured to receive an input identifying the selection of a first connector pin of the plurality of connector pins and in response to control the robotic positioner to position the heating device in a first heating position relative to the first connector pin to melt solder in a corresponding first wire receptacle of the plurality of corresponding wire receptacles. The display is adapted to provide a visual indication of the selection of the first connector pin and a visual indication of the heating device being in the first heating position as a visual indication to an operator to insert a wire into the corresponding first wire receptacle to connect the wire to the electrical connector.

The input identifying the selection of the first connector pin comprises a signal resulting from selection of a graphic on the display that is associated with selecting the first connector pin in the graphical representation of the plurality of connector pins on the display. The display can comprises a touch responsive display and the input identifying the selection of the first connector pin can comprise a signal resulting from the display being touched at a position associated with selecting the first connector pin in the graphical representation of the plurality of connector pins on the display.

The visual indication of the selection of the first connector pin comprises a first display attribute of the first connector pin in the graphical representation of the plurality of connector pins on the display such as a first color. The visual indication of the heating device being in the heating position comprises a second display attribute of the first connector pin in the graphical representation of the plurality of connector pins on the display such as a second color.

The control unit can be configured to receive an input indicating completion of a wire connecting operation with respect to the first connector pin and in response to automatically control the robotic positioner to position the heating device to a programmatically determined second heating position relative to a second connector pin to melt solder in a corresponding second wire receptacle of the plurality of corresponding wire receptacles. The input indicating completion of the wire connecting operation can comprises a signal resulting from selection on the display of a graphic comprising a visual indication to proceed to a next connector pin. If the display comprises a touch responsive display, the input indicating completion of the wire connecting operation can comprise a signal resulting from the display being touched at a position associated with selecting the second connector pin in the graphical representation of the plurality of connector pins on the display.

The heating device can comprise a thermal tip or a nozzle adapted to direct a flow of heated air. If the heating device comprises a thermal tip, the first heating position comprises the thermal tip being in contact with the first connector pin. If the heating device comprises a nozzle, the first heating position comprises the nozzle being in proximity with but not in contact with the first connector pin.

The alignment plate is adapted to be removably received and held in relation to the housing. The housing comprises an alignment plate retainer adapted to removably receive and hold the alignment plate in a specific position and orientation in relation to the housing. The alignment plate retainer comprises an opening. The housing also comprises a retainer that may comprise one or more rotatable clips and that is selectively movable between a first position to engage the alignment plate and a second position to disengage the alignment plate.

The alignment plate is adapted to removably receive and hold an electrical connector having a plurality of connector pins with a plurality of corresponding wire receptacles. The alignment plate comprises a key that enables the electrical connector to be received and held in a specific position and orientation in relation to the alignment plate. The alignment plate also comprises a plurality of openings corresponding to and adapted to receive and hold the plurality of connector pins with the plurality of connector pins exposed through the opening of the alignment plate retainer inside the housing and the plurality of corresponding wire receptacles exposed outside the housing.

The robotic positioner comprises a first positioner movable along a first longitudinal axis, a second positioner movable along a second longitudinal axis substantially orthogonal to the first longitudinal axis, and a third positioner movable in a third longitudinal axis substantially orthogonal to the first longitudinal axis and to the second longitudinal axis. The first longitudinal axis and the second longitudinal axis extend laterally in a plane beneath the plurality of connector pins exposed within the housing, and the third longitudinal axis extends vertically in relation to the plurality of connector pins exposed within the housing. The heating device is connected to the third positioner. Each of the first positioner, the second positioner, and the third positioner is selectively and independently controllable for movement and the control unit is configured to independently control the first positioner, the second positioner, and the third positioner to sequentially position the heating device in a plurality of heating positions with each heating position being associated with a connector pin to melt solder in a corresponding wire receptacle.

There has thus been outlined, rather broadly, some of the embodiments of the robotic wire termination system in order that the detailed description thereof may be better understood, and in order that the present contribution to the art may be better appreciated. There are additional embodiments of the robotic wire termination system that will be described hereinafter and that will form the subject matter of the claims appended hereto. In this respect, before explaining at least one embodiment of the robotic wire termination system in detail, it is to be understood that the robotic wire termination system is not limited in its application to the details of construction or to the arrangements of the components set forth in the following description or illustrated in the drawings. The robotic wire termination system is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

FIG. 2 is a top plan view of a robotic wire termination system in accordance with an example embodiment.

FIG. 3 is a side view of a robotic wire termination system in accordance with an example embodiment illustrating external connections.

FIG. 4A is a top perspective view of a robotic wire termination system in accordance with an example embodiment illustrating an electrical connector aligned with an alignment plate in an alignment plate retainer of a housing and with the housing illustrated partially transparent to reveal internal components.

FIG. 4B is an enlarged view of the area enclosed by dashes in FIG. 4A.

FIG. 5A is an exploded top perspective view of a portion of a robotic wire termination system in accordance with an example embodiment illustrating a cable and wires aligned with an electrical connector, an alignment plate, an alignment plate retainer of a housing, and other system components.

FIG. 5B is an enlarged view of the area enclosed by dashes in FIG. 5A.

FIG. 10B is a bottom perspective view of a portion of a robotic wire termination system in accordance with an example embodiment illustrating an electrical connector in an alignment plate in an alignment plate retainer of a housing with connector pins of the electrical connector exposed to the interior of the housing.

FIG. 10C is an enlarged view of the area enclosed by dashes in FIG. 10B.

DETAILED DESCRIPTION

A. Overview

Figure 1:
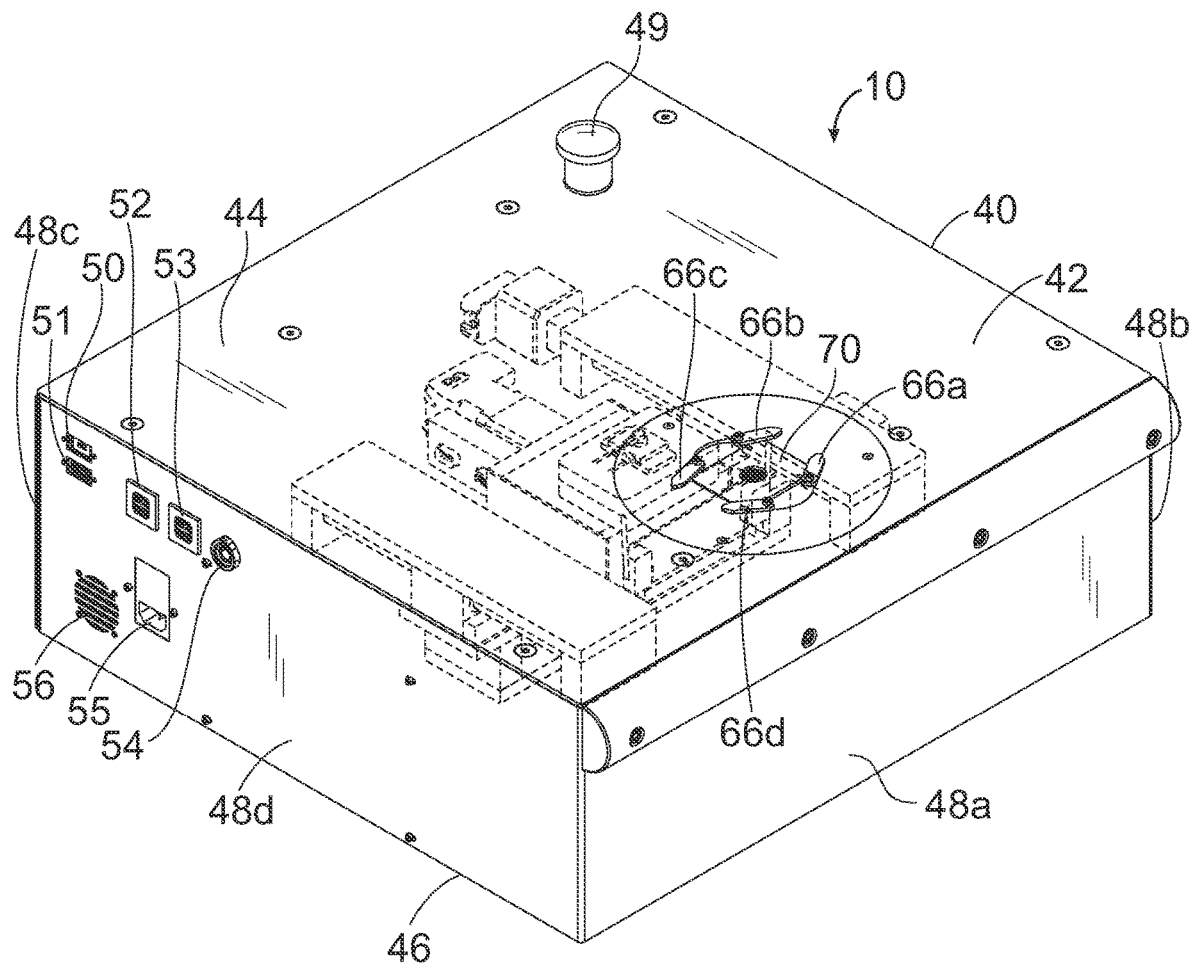
FIG. 1 is a top perspective view of a robotic wire termination system in accordance with an example embodiment with a housing illustrated partially transparent to reveal internal components.
Figure 6A:
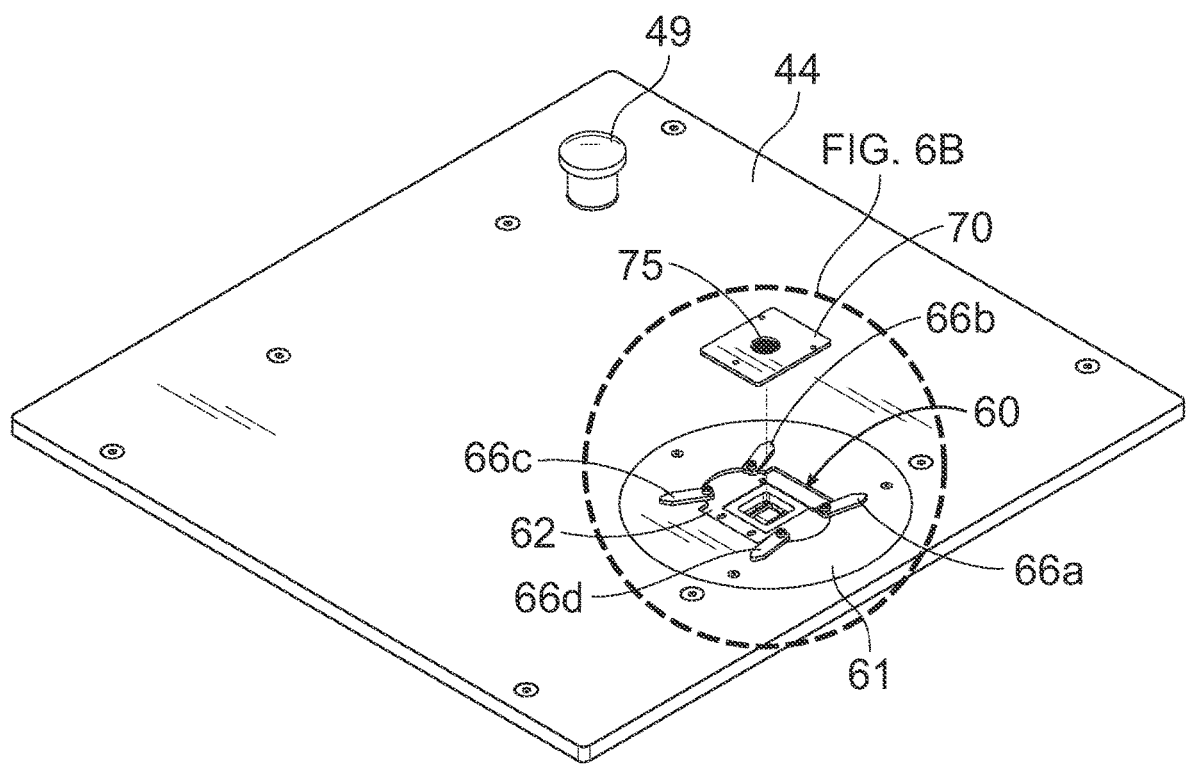
FIG. 6A is a top perspective view of a portion of a robotic wire termination system in accordance with an example embodiment illustrating an alignment plate aligned with an alignment plate retainer of a housing.
Figure 6B:
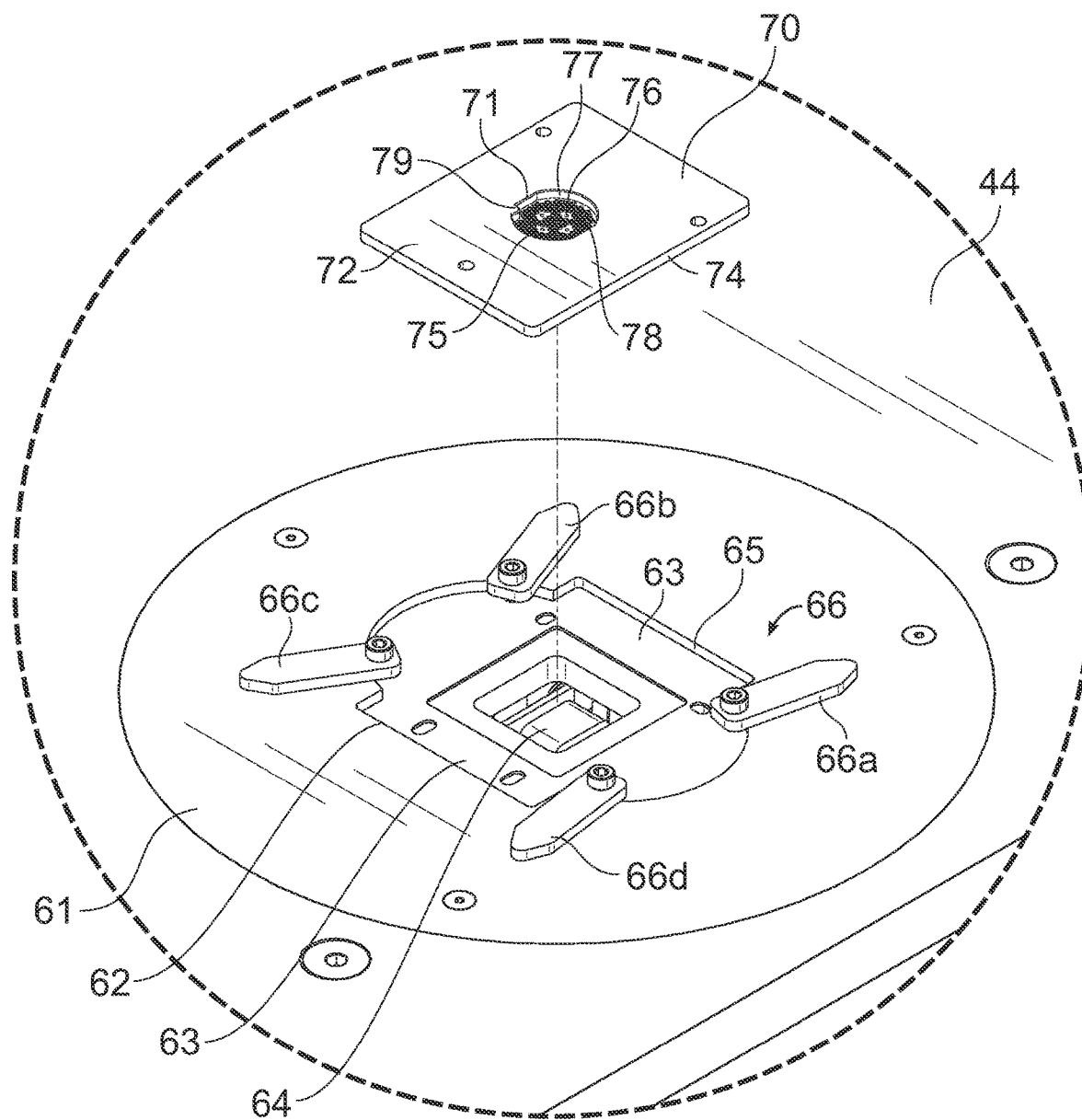
FIG. 6B is an enlarged view of the area enclosed by dashes in FIG. 6A.
Figure 7A:
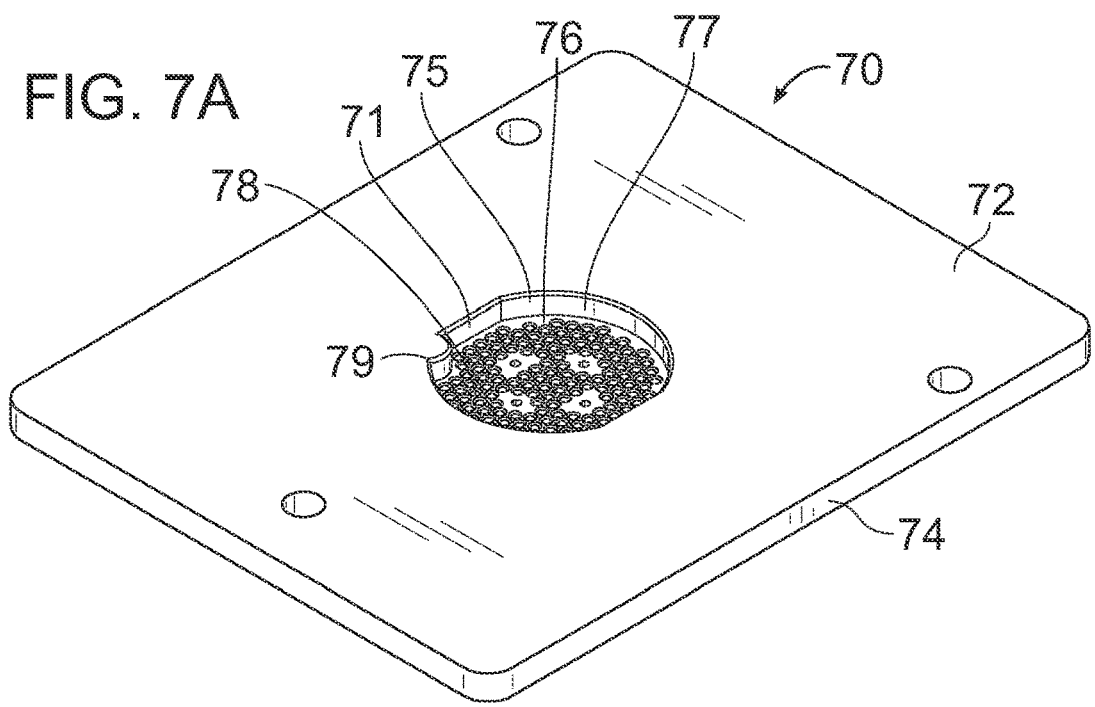
FIG. 7A is a top perspective view of an alignment plate of a robotic wire termination system in accordance with an example embodiment.
Figure 7B:
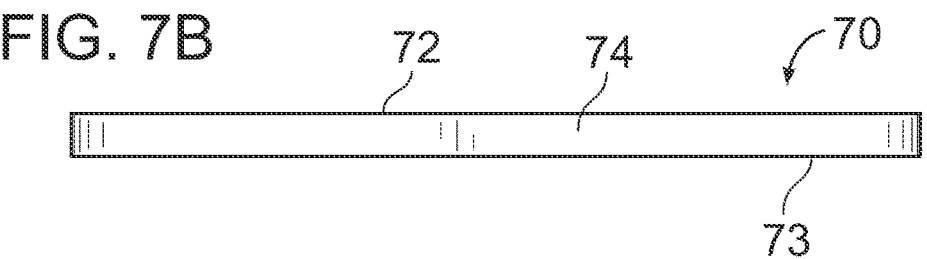
FIG. 7B is a side view of an alignment plate of a robotic wire termination system in accordance with an example embodiment.
Figure 7C:
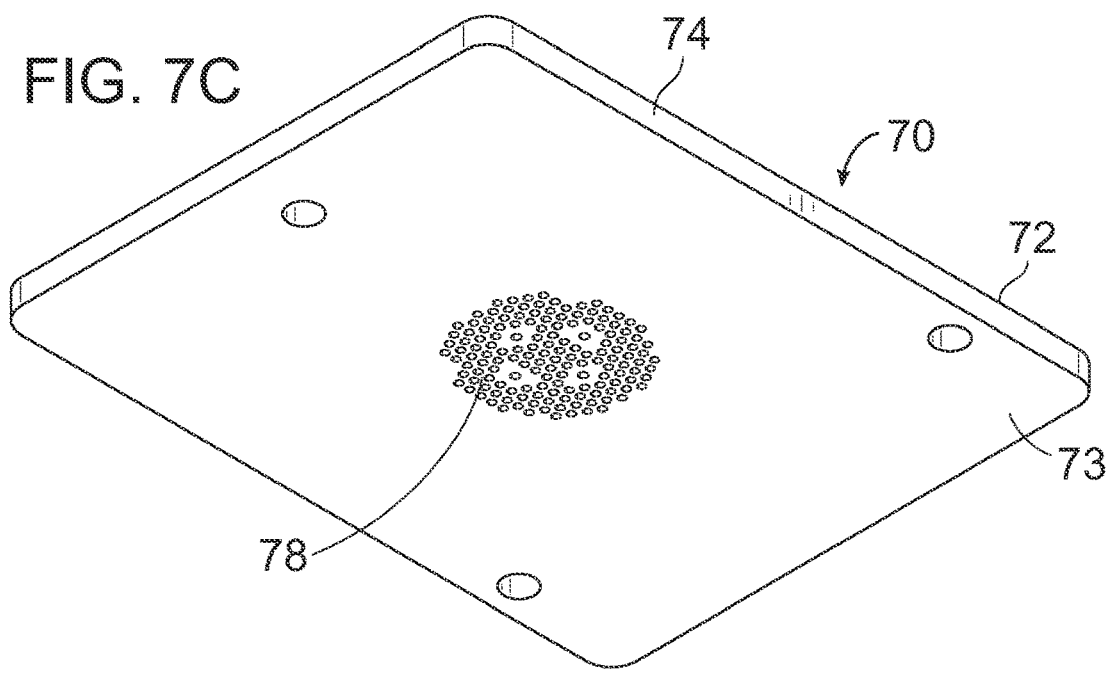
FIG. 7C is a bottom perspective view of an alignment plate of a robotic wire termination system in accordance with an example embodiment.
Figure 8A:
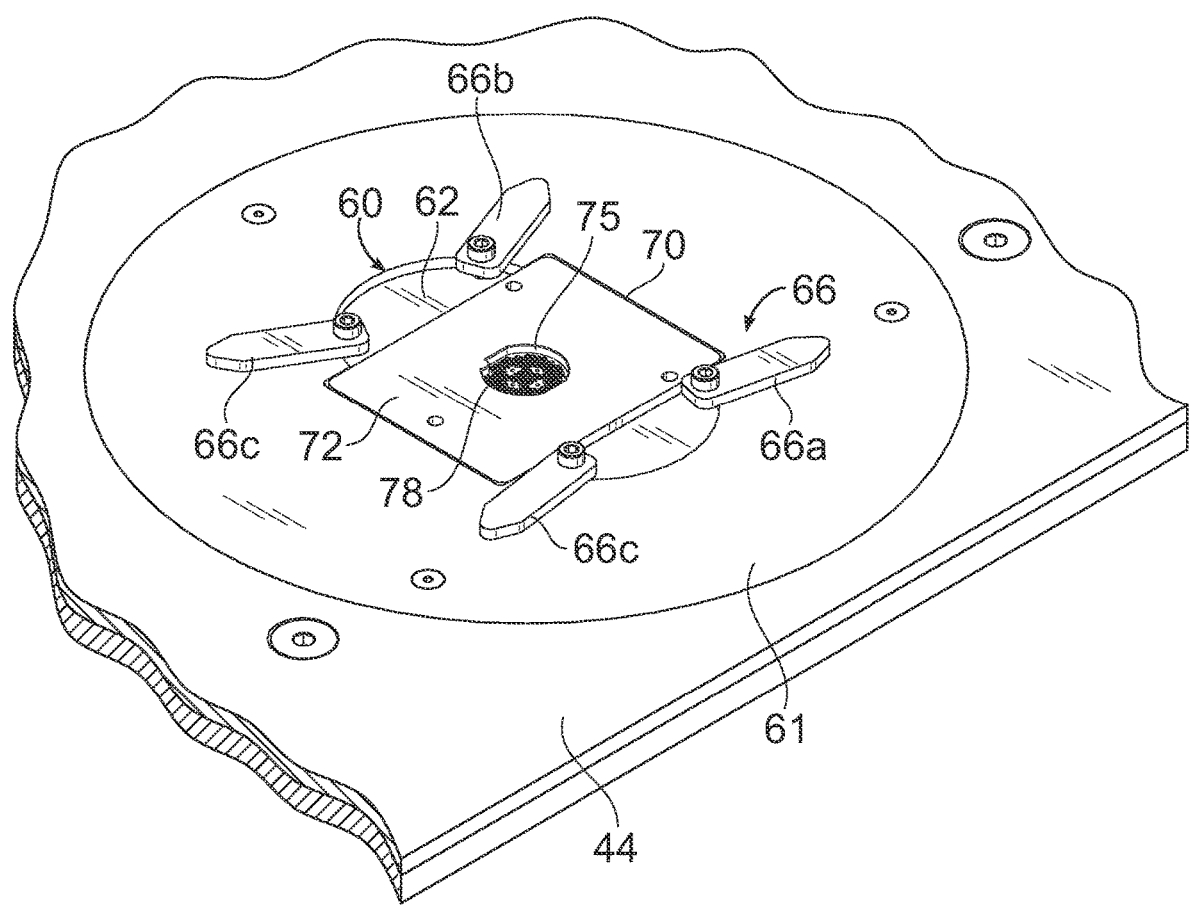
FIG. 8A is a top perspective view of a portion of a robotic wire termination system in accordance with an example embodiment illustrating an alignment plate in an alignment plate retainer of a housing with a plurality of retainer clips in a first position disengaged from the alignment plate.
Figure 8B:
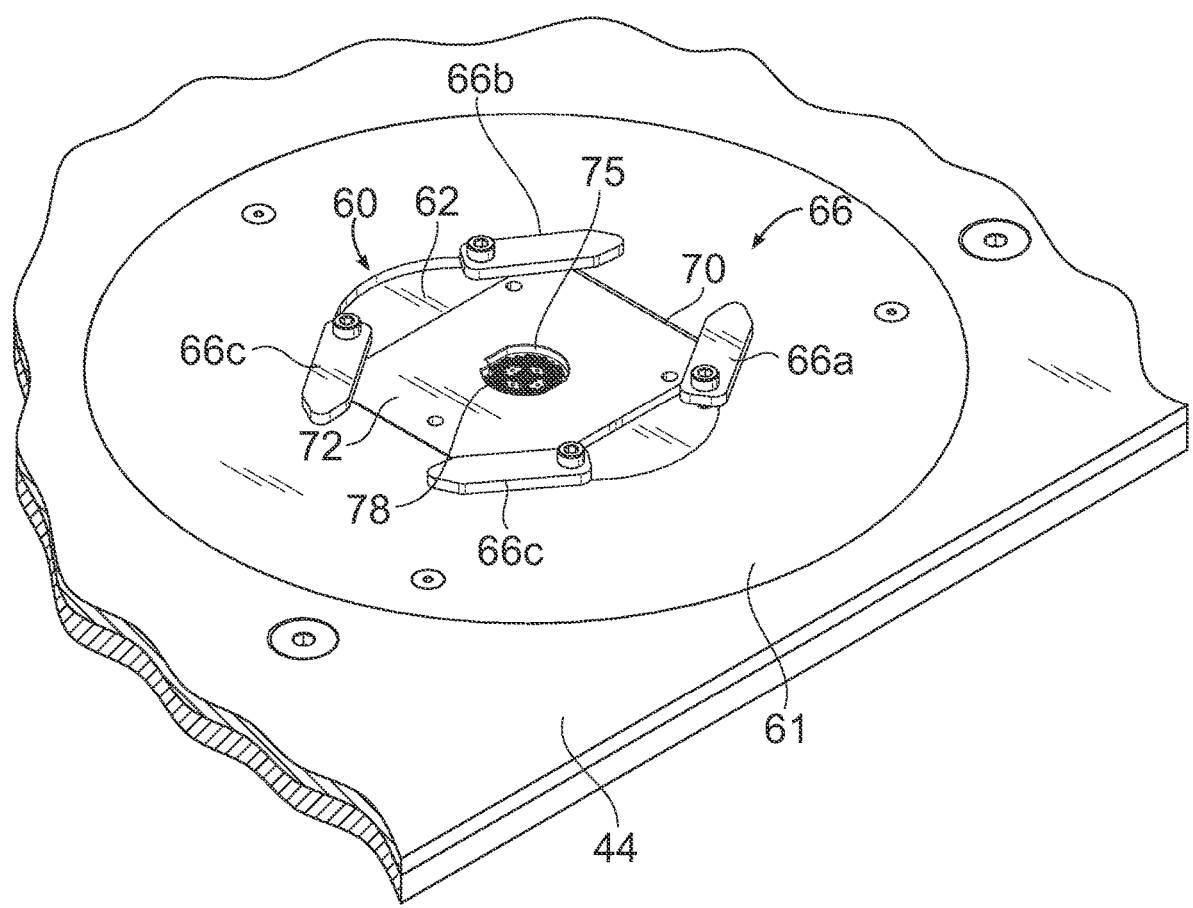
FIG. 8B is a top perspective view of a portion of a robotic wire termination system in accordance with an example embodiment illustrating an alignment plate in an alignment plate retainer of a housing with a plurality of retainer clips in a second position engaged with the alignment plate.
Figure 8C:
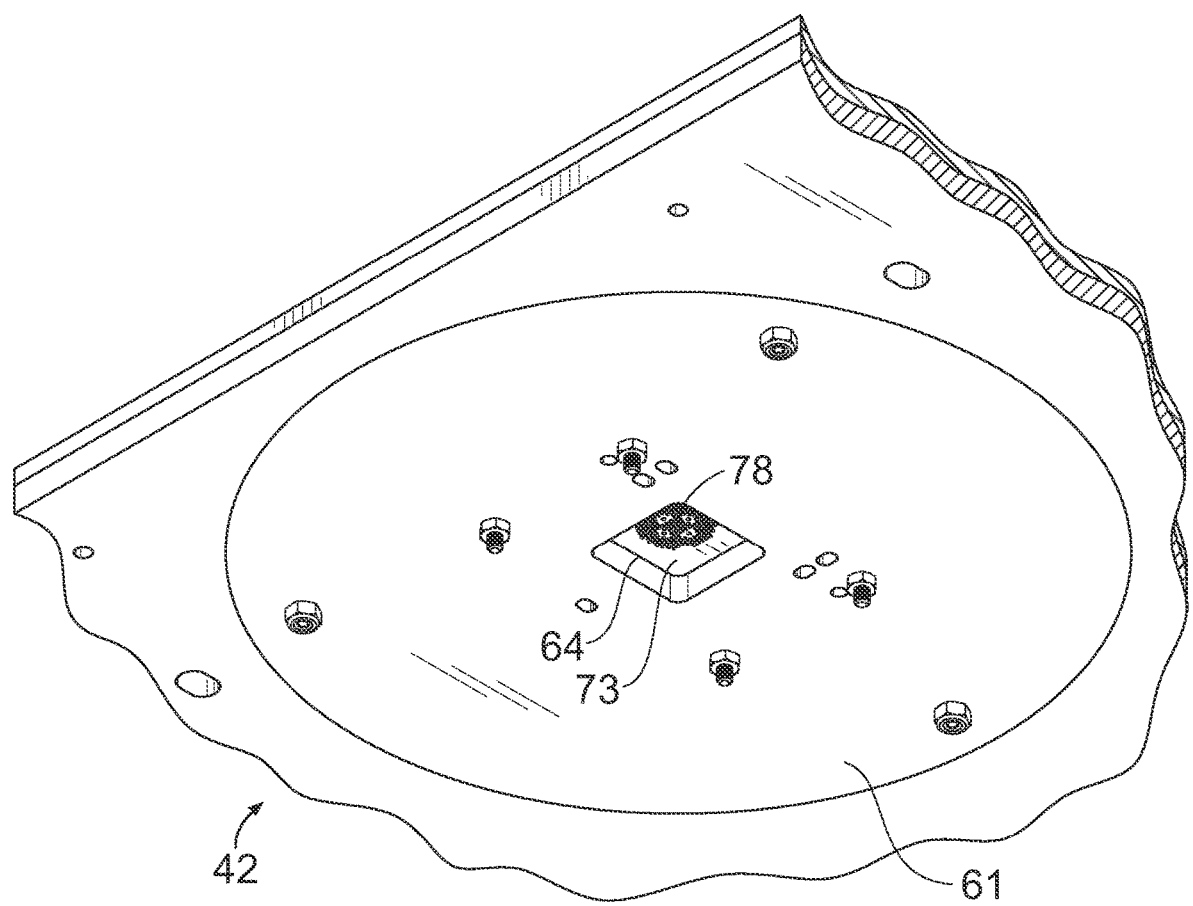
FIG. 8C is a bottom perspective view of a portion of a robotic wire termination system in accordance with an example embodiment illustrating an alignment plate in an alignment plate retainer of a housing with openings in the bottom of the alignment plate exposed to the interior of the housing.

As illustrated in FIGS. 1-21 and as described herein, an example robotic wire termination system 10 is configured and adapted to enable an operator to efficiently and accurately connect a plurality of wires 20 of a cable 22 (or other source of wires) to an electrical connector 30 having a plurality of connector pins 34 with corresponding wire receptacles 38 that are preloaded with solder preform 39. The robotic wire termination system 10 generally includes a housing 40, an electrical connector alignment plate 70 ("alignment plate"), a heating device 80, a robotic positioner 90, a control unit 110, and a display 120.

The housing 40 includes an alignment plate retainer 60 for removably receiving and holding the alignment plate 70 in a specific position and orientation. The alignment plate retainer 60 includes an opening 64 aligned with a corresponding opening in the housing 40. The alignment plate 70 has an inset portion 75 for removably receiving and holding the electrical connector 30 to which wires 20 are to be connected in a specific position and orientation. The alignment plate 70 also has a plurality of openings 78 that are arranged to correspond with the plurality of connector pins 34 of the electrical connector 30. With the alignment plate 70 held by the alignment plate retainer 60 and the electrical connector 30 held by the alignment plate 70, the connector pins 34 of the electrical connector 30 are exposed to the interior 42 of the housing 40 and the corresponding wire receptacles 38 are exposed outside the housing 40.

The heating device 80, robotic positioner 90, and control unit 110 are enclosed within the interior 42 of the housing 40 with the heating device 80 and robotic positioner 90 in communication and under control of the control unit 110. The heating device 80 is mounted on the robotic positioner 90. The robotic positioner 90 comprises first, second, and third positioners 92, 94, 96. The first, second, and third positioners 92, 94, 96 are independently controllable and movable by the control unit 110 along three mutually orthogonal longitudinal axes to selectively move the heating device 80 to selected coordinates within the 3D space in the interior 42 of the housing 40 corresponding to positions relative to the connector pins 34 exposed in the interior 42 of the housing 40.

The control unit 110 is configured to receive as inputs a selection of an electrical connector 30 to which wires 20 are to be connected and subsequently selections of one or a plurality of individual connector pins 34 of the selected electrical connector 30 to which individual wires 20 are to be connected. In response, the control unit 110 controls the robotic positioner 90 to move the heating device 80 to a heating position relative to the selected connector pin 34 or to a plurality of heating positions relative to the plurality of selected connector pins 34 in a predetermined sequence or series. The heating device 80 is controlled at each heating position to apply heat to the currently selected connector pin 34 to melt the solder preform and form a connection between the selected connector pin 34 and the corresponding wire 20 of the cable 22 or other source of wires.

The display 120, which can comprise a touch responsive display, is in communication with the control unit 110 and provides selections made by an operator as inputs to the control unit 110. The display 120 displays several control screens. One control screen displays icons or graphics for the operator to select a particular electrical connector 30. Another control screen displays graphics and icons for the operator to selectively control various operations of the system and to select connector pins 34 of the selected electrical connector 30. These include a visual graphic representation of the connector pins 34. This control screen also displays visual indications showing a selected connector pin 34, and showing that the heating device 80 is in the heating position with respect to a selected connector pin 34. From this information the operator can determine to insert a wire 20 into the corresponding wire receptacle 38 of the connector pin 34 to form a solder connection. Another control screen displays icons and graphics for the operator to manually control movement of the robotic positioner 90 and heating device 80. Other input devices 108 such as a remote footswitch and/or hand switch also are in communication with the control unit 110 and also can be used by the operator to selectively control various operations of the system.

B. Electrical Connector

The electrical connector 30 (also referred to as an insulator) with which the robotic wire termination system 10 is intended for use may be comprised of any device at which electrical wires 20 are to be terminated. There are various types of electrical connectors in use including but not limited to fine wire terminations, pinned connectors, terminal blocks, plug and socket connectors, medical connectors, transition devices and custom connectors. The electrical connector 30 also may be intended for various types of industries such as but not limited to the medical industry.

Figure 9A:
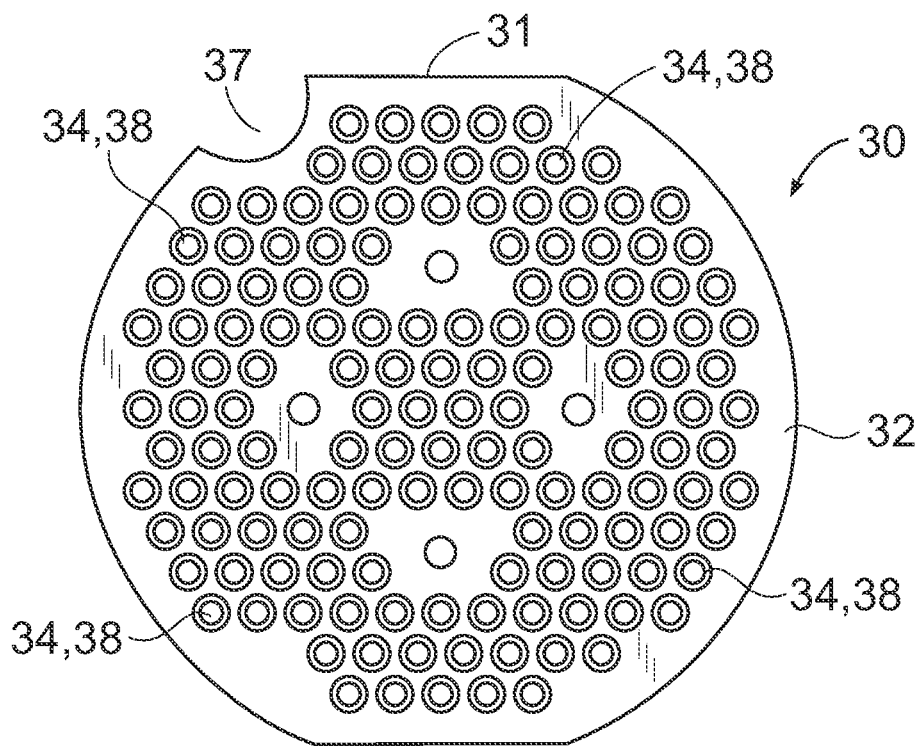
FIG. 9A is a top view of an electrical connector for use with a robotic wire termination system in accordance with an example embodiment.
Figure 9B:
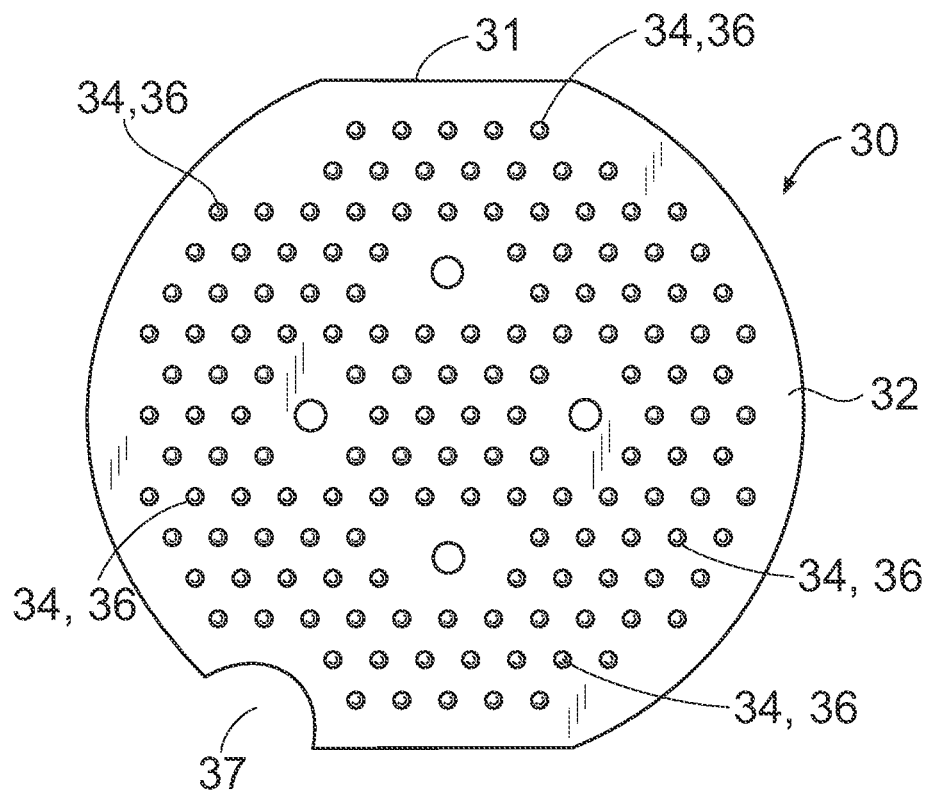
FIG. 9B is a bottom view of an electrical connector for use with a robotic wire termination system in accordance with an example embodiment.
Figure 9C:
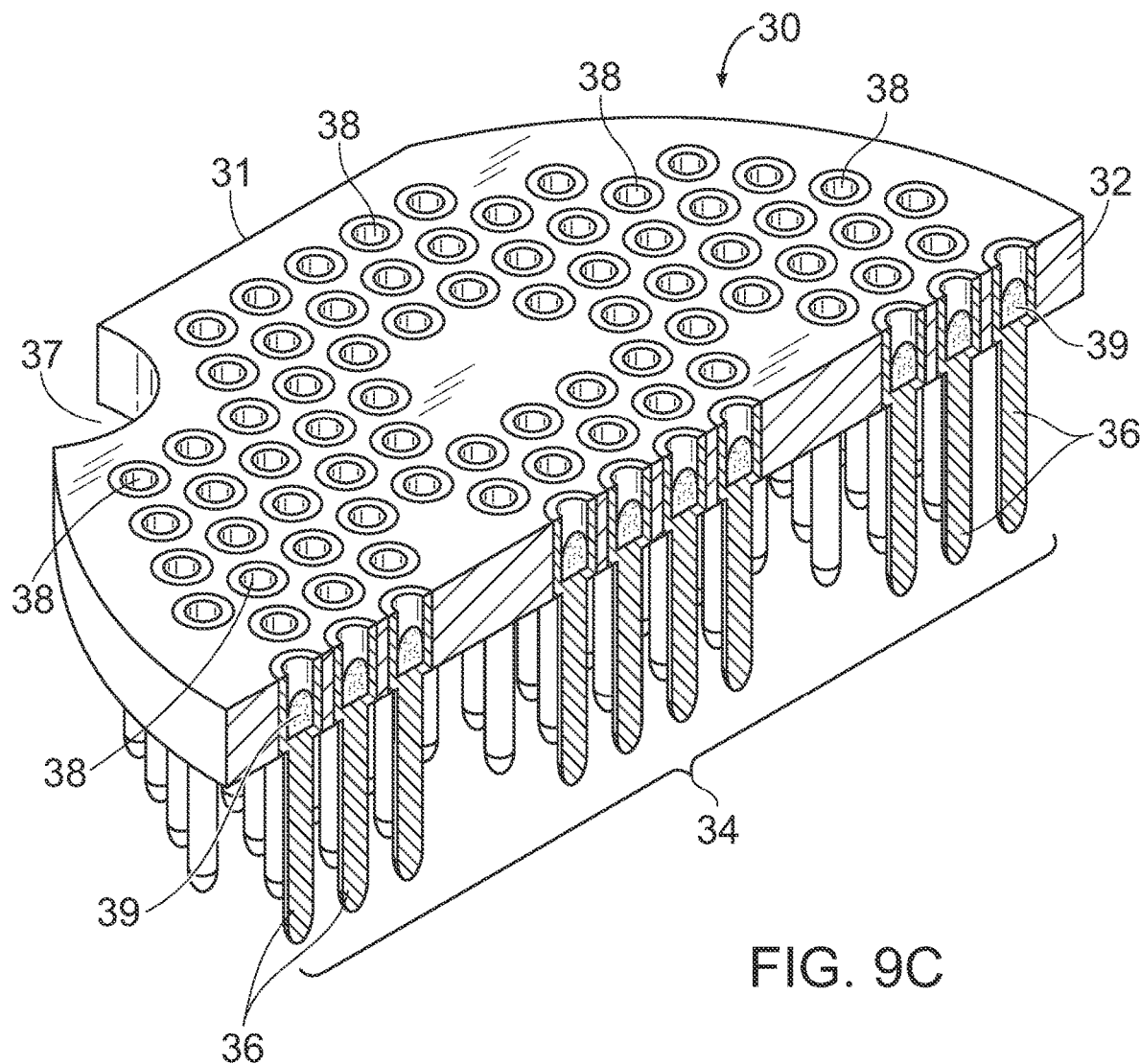
FIG. 9C is a top perspective view in cross-section of an electrical connector for use with a robotic wire termination system in accordance with an example embodiment.
Figure 10A:
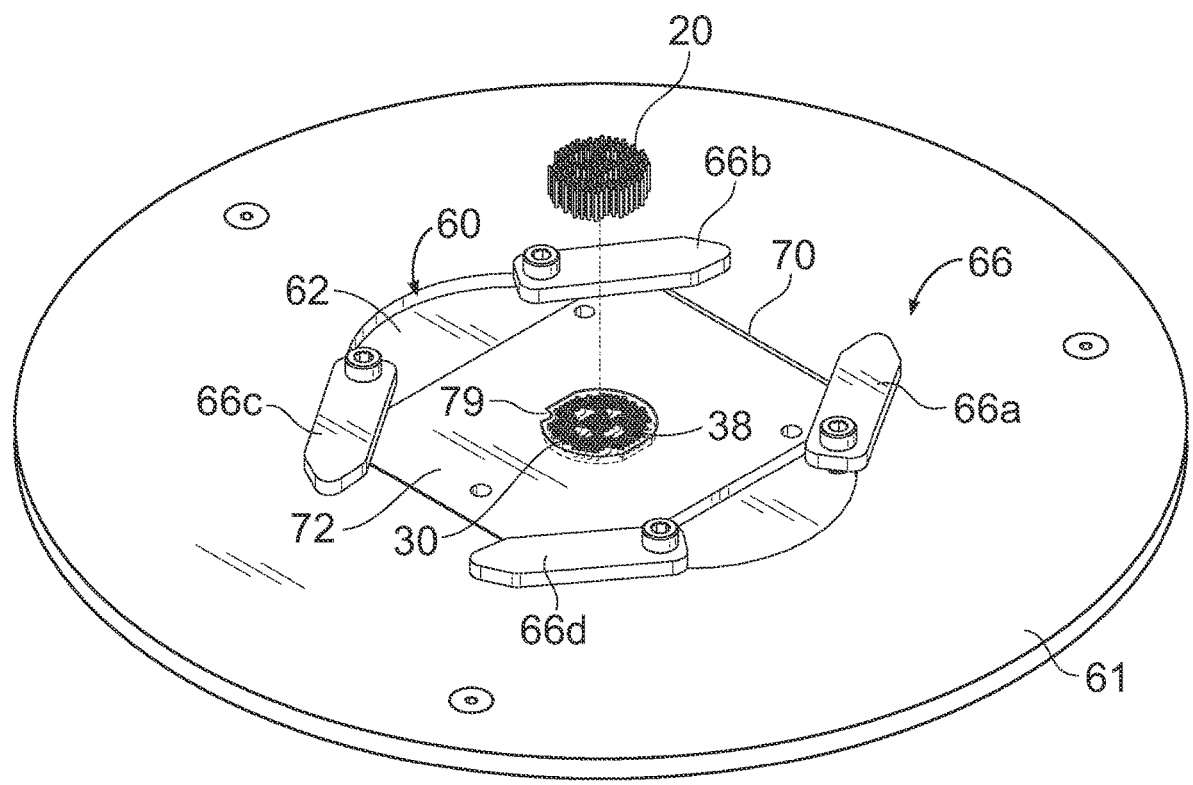
FIG. 10A is a top perspective view of a portion of a robotic wire termination system in accordance with an example embodiment illustrating an electrical connector in an alignment plate in an alignment plate retainer of a housing and a plurality of wires of a cable aligned with wire receptacles of the electrical connector.
Figure 11A:
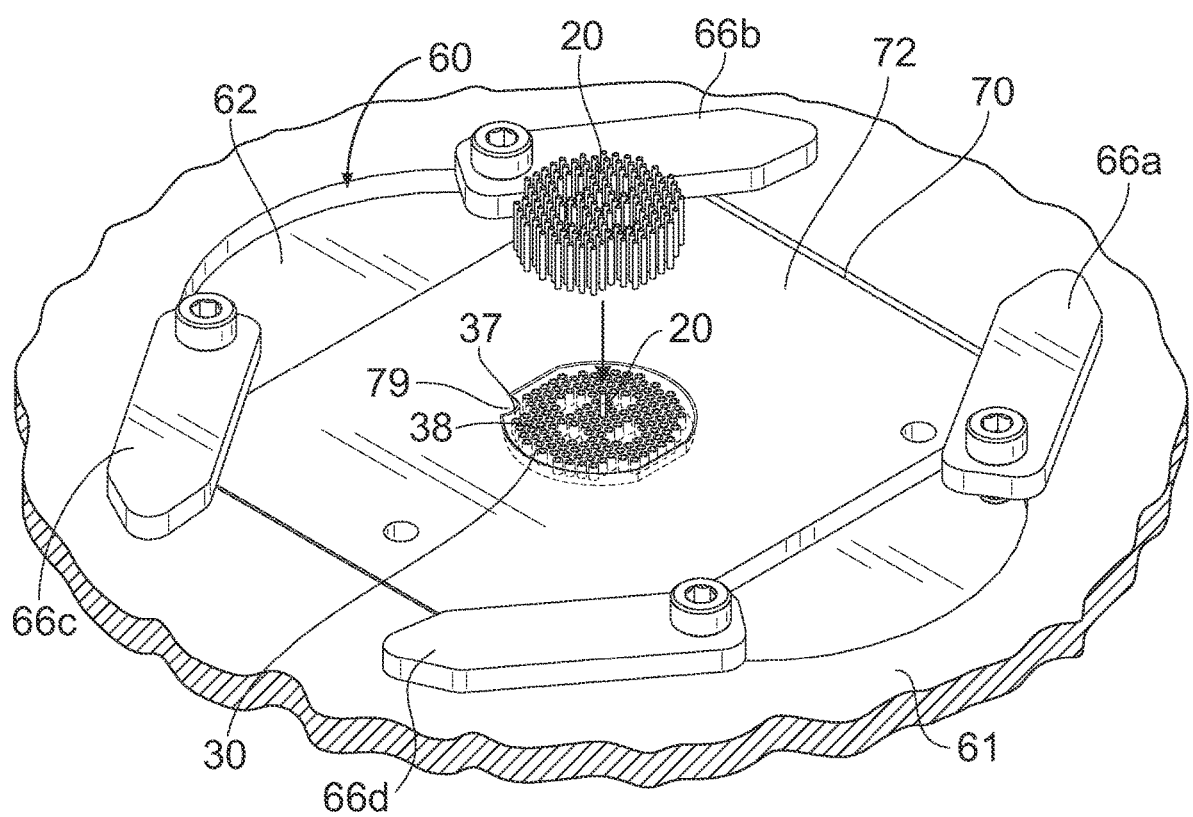
FIG. 11A is a top perspective view of a portion of a robotic wire termination system in accordance with an example embodiment illustrating an electrical connector in an alignment plate in an alignment plate retainer of a housing with a first wire of a cable inserted within a first wire receptacle of the electrical connector.
Figure 11B:
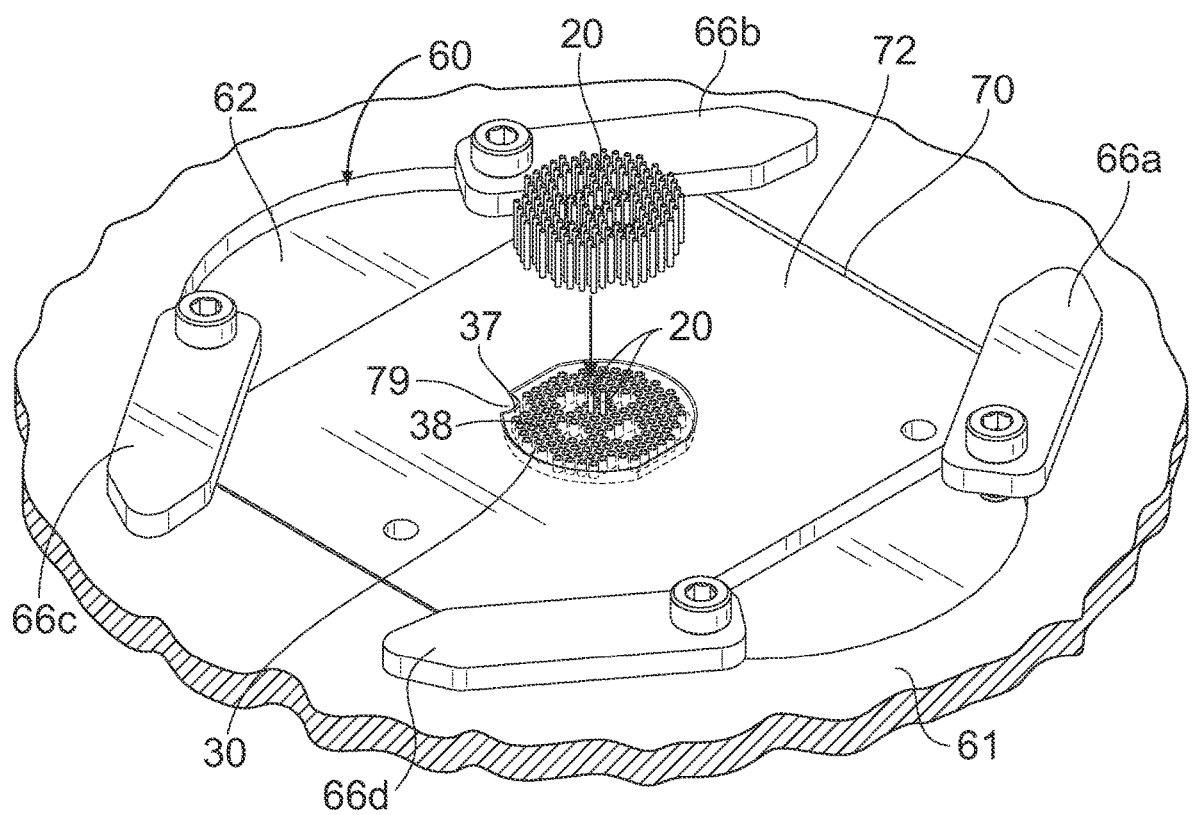
FIG. 11B is a top perspective view of a portion of a robotic wire termination system in accordance with an example embodiment illustrating an electrical connector in an alignment plate in an alignment plate retainer of a housing with first and second wires of a cable inserted within first and second wire receptacles of the electrical connector.
Figure 12A:
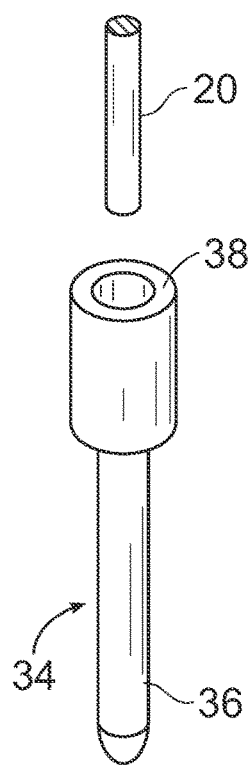
FIG. 12A is a top perspective view of a connector pin of an electrical connector for use with a robotic wire termination system in accordance with an example embodiment illustrating an end of a wire aligned for insertion within a wire receptacle of the connector pin.
Figure 12B:
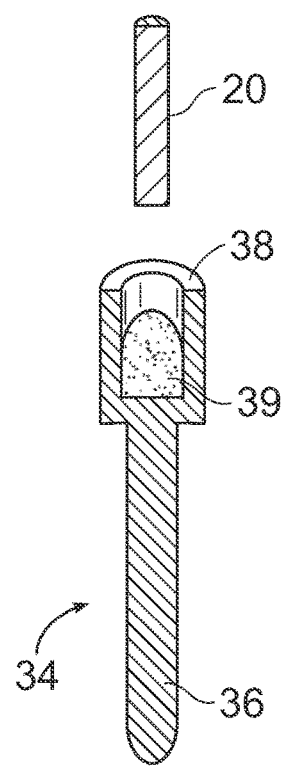
FIG. 12B is a top perspective view in cross-section of a connector pin of an electrical connector for use with a robotic wire termination system in accordance with an example embodiment illustrating an end of a wire aligned for insertion within a wire receptacle of the connector pin.
Figure 12C:
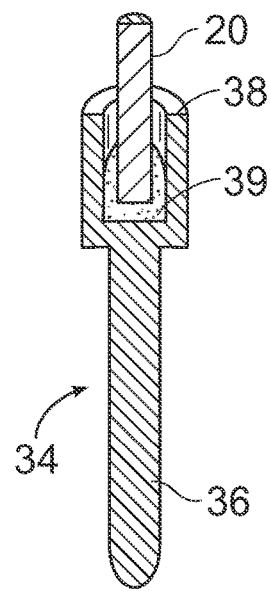
FIG. 12C is a top perspective view in cross-section of a connector pin of an electrical connector for use with a robotic wire termination system in accordance with an example embodiment illustrating an end of a wire inserted in a wire receptacle of the connector pin.

As best illustrated in FIGS. 4B, 5B, and 9A-9C, the electrical connector 30 comprises an insulator body or housing 32 formed of an electrically insulating material and a plurality of connector pins 34 that extend through the insulator body or housing 32. The connector pins 34 are comprised of an electrically conductive material such as metal. The insulator body or housing 32 electrically insulates one or more of the connector pins 34 from the other connector pins 34 and also provides support for the connector pins 34. The insulator body or housing 32 may have various shapes (e.g., substantially circular as illustrated in FIGS. 9A-9C), thicknesses, and sizes.

The connector pins 34 are typically configured to extend substantially parallel with one another through the insulator body or housing 32. The connector pins 34 can be arranged in various shapes and patterns depending on the application for which the electrical connector 30 is intended. The number of connector pins 34 can range from two connector pins 34 to greater than 100 connector pins 34, again depending on the intended application for the electrical connector 30.

One or more and typically all of the connector pins 34 have a male connecting end 36 (which sometimes is itself referred to as a pin). The male connecting end 36 typically has a tapered or pointed end that is used to electrically connect the electrical connector 30 to a corresponding electrical socket or the like having a like plurality and arrangement of female receptacles. The male connecting end 36 typically is comprised of a solid pin structure as illustrated in FIG. 9C. The male connecting ends 36 extend outwardly from a first side of the insulator body or housing 32 as best illustrated in FIGS. 4B, 5B, 9B and 9C.

One or more and typically all of the connector pins 34 include a corresponding wire receptacle 38 that is positioned opposite of the male connecting ends 36 of the connector pins 34. The distal ends of wires 20, such as the distal ends of wires 20 protruding from the end of a cable 22, are inserted and terminate in the wire receptacles 38 for connection to the electrical connector 30, typically via a solder connection as illustrated in FIGS. 11A-11B and 12A-12C. The ends of the wires 20 are inserted into the corresponding wire receptacles 38 of the connector pins 34 and soldered, typically according to a pinout, to form a physical and electrical connection between the wires 20 and the electrical connector 30, and more specifically between the wires 20 and the connector pins 34 of the electrical connector 30.

In the example electrical connector 30 illustrated in FIGS. 4B, 5B, 9A-9C, and 12A-12C, the wire receptacles 38 are comprised of a female connecting end having a substantially tubular structure adapted to receive and terminate the ends of the wires 20. The wire receptacles 38 alternatively may have a non-tubular structure as long as the wire receptacles 38 allow for the insertion or other termination, and soldering of the wires 20. The wire receptacles 38 preferably extend outwardly from a second side of the insulator body or housing 32 of the electrical connector 30 which is opposite of the first side. The wire receptacles 38 preferably have an upper opening that may be recessed in, extend past, or be flush with the second side of the insulator body or housing 32 of the electrical connector 30 as best illustrated in FIGS. 4B, 5B, 9A-9C, and 11A-11B. Preferably all of the wire receptacles 38 are flush or recessed or extend the same distance with respect to the second side of the electrical connector 30. However, if desired different wire receptacles 38 can extend outwardly from the second side at different distances (e.g., central located receptacles may extend outwardly further than outer located receptacles, or some receptacles may be flush or recessed and others extend outwardly).

The wire receptacles 38 are preferably prefilled with a solder material 39 prior to a wire connection operation being carried out on the electrical connector 30 with the example robotic wire termination system 10 as described herein. For example, the interior cavities of one or more of the wire receptacles 38 may be at least partially filled with a customized solder preform 39. The prefilling of the wire receptacles 38 with solder preform 39 allows for the heating device 80 of the example robotic wire termination system 10 to be moved into heating positions relative to individual connector pins 34 and to provide heat to the individual connector pins 34 to connect the wires 20 without an operator having to manually apply solder. It will be appreciated however that the example robotic wire termination system 10 also can be used to connect wires 20 to an electrical connector 30 without the wire receptacles 38 being prefilled with solder preform 39. For example, an operator can manually apply solder to a wire 20 and/or wire receptacle 38 as the heating device 80 applies heat to the connector pin 34. In either case, the example robotic wire termination system 10 provides substantial improvements to wire connection operations.

Various types of solder preform 39 may be utilized such as but not limited to lead solder, lead-free solder, solder balls, solder paste and flux-core solder. The solder preform 39 may be comprised of various fusible metal alloys that have a relatively low melting point capable of physically and electrically connecting the wires 20 to the connector pins 34 of the electrical connector 30.

C. Cable and Wires

FIGS. 5A, 5B illustrate a typical cable 22 comprising a substantially tubular outer insulation or sheath 24 enclosing a plurality of wires 20 with the distal ends of the wires 20 extending outwardly from the insulation or sheath 24. However, it can be appreciated that the wires 22 to be connected to the electrical connector 30 do not have to be part of the same insulated cable and instead can be separate of one another without a common sheathing and with or without individual insulation or sheathing. The wires 20 can have various lengths and sizes and can extend outwardly from any insulation by varying distances.

The plurality of wires 20 of the cable 22 is typically soldered to the wire receptacles 38 of the respective connector pins 34 according to a pinout which cross-references the wires 20 to corresponding connector pins 34 to which they are to be connected. The pinout can be a diagram or chart that visually cross-references the specific connector pins 34 and corresponding wires 20 to be connected. The pinout can be color coded, numbered or otherwise coded to assist an operator in positioning and inserting the correct wires 20 into the correct wire receptacles 38 of the corresponding connector pins 34 so that the wires 20 are correctly connected to the electrical connector 30. Incorrect connection of any wire 20 to a connector pin 34 of the electrical connector 30 can result in time-consuming and expensive rework or even the complete scrapping and loss of the electrical connector 30.

D. Housing and Housing External Components

The housing 40 of the example robotic wire termination system 10 may comprise almost any structure that is able to support, hold, and/or contain the various components of the system as described herein. In the example embodiments, the housing 40 has an interior space 42 enclosed by a substantially horizontal top 44, a substantially horizontal bottom 46, and four substantially vertical sides 48a, 48b, 48c, and 48d that extend between the top 44 and the bottom 46. The top 44, bottom, 46, and sides 48a-48d can be arranged to form an enclosure having any shape and interior volume suitable for and consistent with carrying out the functions and objectives described herein. Preferably the housing 40 will be of a size and shape that is suitable for the system to be operated on a support surface of a table, desk, work bench, or the like.

The housing 40 may include various externally accessible components on the exterior surfaces of one or more of the top 44 and sides 48a-48d. For example, the housing 40 preferably includes an emergency power kill switch 49, a plurality of input/output (I/O) ports 50-54, and an electrical socket 55.

The emergency power kill switch 49 is preferably located on the top 44 or alternatively on a side 48a-48d of the housing 40 preferably in a location that is easy and fast for a technician to access. The emergency power kill switch 49 can be wired into the electrical power system of the example robotic wire termination system 10 and can be of a type such that manually actuating it interrupts power to at least the components of the robotic positioner 90 and the heating device 80. This enables an operator to immediately remove power in the event of an emergency to prevent damage to the system 10, the electrical connector 30, and/or the surrounding environment.

The I/O ports 50-54 are preferably located on one or more of the sides 48a-48d, such as side 48d for example, and/or the top 44 of the housing 40. Preferably the I/O ports 50-54 are in locations such that wired connections can be conveniently made between external I/O devices 108 as described herein, other external peripherals, external power sources and the example robotic wire termination system 10 without interfering with the process of connecting wires 20 to the electrical connector 30 as described further herein.

The I/O ports may comprise, for example, a micro USB port 50 that is electrically connected to the control unit 110 for receiving and providing power from an external power source to the control unit 110. The I/O ports also may comprise an HDMI port 51 that is connected to the control unit 110 for providing communication between the control unit 110 and the display 120, and USB ports 52-53 that are connected to the control unit 110 for communicating data between the control unit 110 and I/O devices 108 and other external peripherals such as external storage. The I/O ports also may comprise an Echo® port 54 that is connected to the control unit 110 and that is adapted to receive a corresponding Echo® magnetic connector of a cable to receive and/or communicate data and/or signals between the control unit 110 and I/O devices 108 such as a hand and/or foot switch as described further herein. Echo® is a registered trademark of Onanon Inc. of Milpitas, California and the Echo® magnetic connector is the subject of patents owned by Onanon.

The electrical socket 55 can comprise an alternating current (AC) electrical socket 55 for receiving electrical power from an external power source to power the robotic positioner 90, the heating device 80, and other components, such as fans, that require AC power to operate. An on/off power switch (in addition to the emergency power kill switch 49) that is externally accessible by an operator can be provided in circuit with the electrical socket 55.

Various components of the example robotic wire termination system 10 enclosed within the housing 40 may produce heat in operation, including for example the heating device 80 and the control unit 110. To maintain a suitable operating temperature within the housing 40, one or more fans can be disposed within the housing 40 and one or more vents 56 can be provided in one or more of the sides 48a-48d, for example side 48d, of the housing 40.

The housing 40 also comprises an alignment plate retainer 60 which is illustrated in FIGS. 5A, 6A-6B, 8C, 10B-10C among others. The alignment plate retainer 60 is preferably disposed on the exterior surface of the top 44 of the housing 40 in a location easily and conveniently accessible by an operator. The alignment plate retainer 60 can be formed in a substantially flat relatively thin plate 61 that is attached to the housing 40 and exposed in the top 44 of the housing 40. The alignment plate retainer 60 also can comprise an integral part of the top 44 of the housing 40 itself.

The alignment plate retainer 60 is adapted to removably receive, support, and hold the alignment plate 70 in a specific orientation and position in relation to the housing 40 in order to carry out an operation to connect wires 20 to an electrical connector 30 using the example robotic wire termination system 10. For that purpose, the alignment plate retainer 60 comprises an inset portion 62 and a support surface 63 with an opening 64. The inset portion 62 comprises a substantially flat horizontal bottom surface, at least part of which comprises the support surface 63, and a substantially vertical peripheral wall 65 that extends from the bottom surface to the top surface of the plate 61 (or the exterior surface of the top 44 of the housing 40) and at least partially around the outer periphery of the support surface 63.

The inset portion 62 preferably has at least a portion that is shaped and dimensioned substantially the same as the alignment plate 70. This allows the alignment plate 70 to be received and supported in the alignment plate retainer 60, and more particularly the inset portion 62, in a specific orientation and position relative to the housing 40. Further, with the alignment plate 70 received in the inset portion 62, the peripheral edges 74 of the alignment plate 70 abut against the vertical peripheral walls 65 of the inset portion 62 so that the alignment plate 70 is held in place and prevented from moving laterally within the alignment plate retainer 60 and more specifically the inset portion 62. In the example embodiments, the inset portion 62 and the alignment plate 70 each have substantially the same rectangular shape. It will be appreciated however that the alignment plate 70 and the inset portion 62 may take many other corresponding shapes consistent with the objective of the alignment plate retainer 60 receiving, supporting, and holding the alignment plate 70 in a specific orientation and position.

In addition, the depth of the inset portion 62 preferably is approximately equal to the thickness of the alignment plate 70, which is described in more detail below. Accordingly, when the alignment plate 70 is received in the inset portion 62 it is held and supported with its bottom surface 73 supported on the support surface 63 and its top surface 72 substantially flush with the top surface of the plate 61 and/or the exterior surface of the top 44 of the housing 40 as best illustrated in FIGS. 8A-8B, 10A, and 11A-11B.

An opening 64 is formed in the bottom surface of the inset portion 62. The opening 64 can be formed substantially centrally in the bottom surface of the inset portion 62 and can have a substantially square or rectangular shape as in the example embodiments. However, it will be appreciated that the opening 64 also can be formed in numerous different shapes and have numerous different placements, provided they are consistent with achieving the functions and objectives described herein.

The support surface 63 comprises at least a portion of the bottom surface of the inset portion 62 that extends around the opening 64. The support surface 63 engages the bottom surface 73 of the alignment plate 70 at and near its edges 74 and provides support for the alignment plate 70 when the alignment plate 70 is received and held in the inset portion 62 of the alignment plate retainer 60. The support surface 63 and opening 64 are configured and arranged so that at least the portion of the bottom surface 73 of the alignment plate 70 that contains openings 78 is exposed and accessible from the interior 42 of the housing 40 through the opening 64 when the alignment plate 70 is held and supported in the inset portion 62.

If the alignment plate retainer 60 is formed in the plate 61 rather than directly in the top 44 of the housing 40, the top 44 of the housing 40 has an opening to the interior 42 of the housing 40 that preferably is substantially aligned with the opening 64 of the alignment plate retainer 60. In either case, when the alignment plate 70 is held and supported in the alignment plate retainer 60 and more particularly the inset portion 62, and an electrical connector 30 is inserted and held in the alignment plate 70 as described below, the plurality of connector pins 34 of the electrical connector 30 are exposed to the interior 42 of the housing 40 through the opening 64 and the corresponding wire terminals 38 are exposed outside the housing 40.

The housing 40 also comprise a heat shield 67. The heat shield 67 can be comprised of a substantially flat plate of aluminum or another material that provides suitable insulation against the conductance of heat. The heat shield 67 can be mounted or attached to the housing 40 in any suitable fashion and preferably is positioned between the plate 61 or other structure in which the alignment plate retainer 60 is disposed or formed and the heating device 80. The heat shield 67 will have an opening 68 that is substantially aligned with the opening 64 in the plate 61 and/or the opening in the top 44 of the housing 40.

The housing 40 also comprises a retainer 66 that is adapted to engage the alignment plate 70 and prevent it from moving, including vertically, when it is received, held, and supported in the alignment plate retainer 60 and more specifically the inset portion 62. The retainer 66 is movable between a first position to engage the alignment plate 70 and a second position to disengage from the alignment plate 70.

The retainer 66 can comprise one or a plurality of substantially flat elongated clips 66a-66d. Each of the clips 66a-66d has a first proximal end, a second distal end, a top surface and a bottom surface. The clips 66a-66d can be attached to the top surface of the plate 61 or the top 44 of the housing 40 at spaced apart locations around the alignment plate retainer 60. Each clip 66a-66d can be rotatably attached at or near its first proximal end to the top surface of the plate 61 or the top 44 of the housing 40 near the alignment plate retainer 60, and more specifically the inset portion 62, by a screw, bolt or other suitable fastener. Each clip 66a-66d is rotatably movable around the point at which it is attached to the top of the plate 61 or the top 44 of the housing 40 independently of the other clips 66a-66d. The clips 66a-66d are preferably attached to the top of the plate 61 or the top 44 of the housing 40 so that their respective bottom surfaces are in or near to being in movable contact with the exterior surface of the plate 61 or the top 44 of the housing 40. Accordingly, when a clip 66a-66d is moved rotationally around its attachment point its bottom surface essentially slides over and approximately flush with the exterior surface of the plate 41 or the top 44 of the housing 40.

The clips 66a-66d are preferably positioned around the alignment plate retainer 60 and each clip is preferably dimensioned lengthwise so that when it is rotationally moved about its attachment point, its second distal end extends at least partly over a portion of the periphery of the inset portion 62 of the alignment plate retainer 60. Accordingly, when an alignment plate 70 is held and supported in the alignment plate retainer 60 as described above, each rotatable clip 66a-66d can be selectively and independently moved rotationally by an operator into a first angular position in which its bottom surface engages at least a portion of the top surface 72 of the alignment plate 70 to hold it in position and prevent it from oving, including vertically. Similarly, each rotatable clip 66a-66d can be selectively and independently moved rotationally by an operator into a second angular position wherein it disengages the alignment plate 70, thus allowing the alignment plate 70 to be easily and quickly removed from the alignment plate retainer 60 and/or another alignment plate 70 to be inserted in the alignment plate retainer 60 as desired.

It will be apparent that in place of one or more clips 66a-66d as described above other structures can be used for the retainer 66 provided they are consistent with achieving the functions and objectives of the retainer 66. Such other structures or devices can be spring-biased or not spring-biased. They can roll rather than slide across the top of the plate 61 or the top 44 of the housing 40. They can move linearly rather than rotationally. They may or may not be attached and move substantially flush with and/or in contact with the top of the plate 61 or the top 44 of the housing 40. Fasteners or adhesive elements can be used, provided an operator can operate them to relatively easily and quickly insert and remove alignment plates 70. In addition, more or fewer clips 66a-66d or other structures can be used.

It will be appreciated that because the alignment plate retainer 60 is adapted to removably receive, hold, and support the alignment plate 70, the example robotic wire termination system 10 can be used to carry out wire connection operations on a plurality of different electrical connectors 30 having different configurations of connector pins 34 without the need to make significant changes to the components or configuration of the system. All that is needed to change the system over from one electrical connector 30 to another is to remove the alignment plate 70 corresponding to the one electrical connector 30 from the alignment plate retainer 60 and seat another alignment plate 70 corresponding to the other electrical connector 30 in the alignment plate retainer 60.

E. Electrical Connector Alignment Plate ("Alignment Plate")

The alignment plate 70 of the example robotic wire termination system 10 is best illustrated in FIGS. 6B, 7A-7C and 8A-8C among others. The alignment plate 70 comprises a substantially flat thin plate having a substantially horizontal top surface 72 and substantially horizontal bottom surface 73, and a substantially vertical peripheral edge 74 that extends between the top surface 72 and bottom surface 73 around the periphery of the alignment plate 70.

As described above, the alignment plate 70 is adapted to be removably received, held and supported in the alignment plate retainer 60 of the housing 40 in a specific position and orientation in relation to the housing 40. Accordingly, the alignment plate 70 is shaped and dimensioned substantially the same as the inset portion 62 of the alignment plate retainer 60, which in the example embodiments is substantially rectangular. However, as described above, the alignment plate 70 and the inset portion 62 of the alignment plate retainer 60 can have many other corresponding geometric shapes suitable to accomplish the same objectives.

As also described above, the alignment plate 70 preferably has a thickness that is substantially the same as the depth of the inset portion 62 of the alignment plate retainer 60. As a result, with the alignment plate 70 received and supported in the inset portion 62, the top surface 72 of the alignment plate 70 is substantially flush with the top surface of the plate 61 (or the exterior surface of the top 44 of the housing 40) and the peripheral edges 74 of the alignment plate 70 abut against the vertical peripheral walls 65 of the inset portion 62 further ensuring that the alignment plate 70 is held in place and prevented from moving laterally within the alignment plate retainer 60 and more specifically the inset portion 62. Holding the alignment plate 70 in a specific position and orientation in relation to the housing 40 enables the robotic positioner 90 of the example robotic wire termination system 10 to precisely and accurately position the heating device 80 in relation to the individual connector pins 34 of an electrical connector 30 mounted in the alignment plate 70 in order to provide heat precisely to each individual connector pin 34 to connect a wire 20.

The top surface 72 of the alignment plate 70 includes an inset portion 75. The inset portion 75 is adapted and configured to removably receive and hold an electrical connector 30 to which wires 20 are to be connected.

The inset portion 75 has a substantially flat horizontal bottom surface 76 and a substantially vertical peripheral wall 77 that extends around the periphery of the bottom surface 76 substantially vertically from the bottom surface 76 to the top surface 72 of the alignment plate 70. A plurality of openings 78 are formed in the bottom surface 76 of the inset 75 and extend through the bottom surface 73 of the alignment plate 70. The openings 78 are preferably formed to extend substantially parallel to each other and substantially perpendicular to the top surface 72 and the bottom surface 73 of the alignment plate 70.

The inset portion 75, including the bottom surface 76 and the peripheral wall 77 are preferably shaped and dimensioned to correspond to the shape and dimensions of a particular electrical connector 30 with which the alignment plate 70 is intended for use, such as the electrical connector 30 illustrated in FIGS. 9A-9C. The number and arrangement of the openings 78 preferably correspond to the number and arrangement of the connector pins 34 of the particular electrical connector 30 with which the alignment plate 70 is intended for use. However, the openings 78 also can be configured in number and arrangement to generically accept the connector pins 34 of a number of different electrical connectors 30 having the same shape and dimensions as the inset portion 75.

For a particular electrical connector 30 to be inserted in and received by the alignment plate 70, and more particularly the inset portion 75, the male connecting ends 36 of the connector pins 34 of the electrical connector 30 must be properly aligned with the openings 78 in the alignment plate 70. The electrical connector 30 can then be inserted by simply pushing it into the inset portion 75. The male connecting ends 36 will extend through the openings 78 and outwardly from the bottom surface 73 of the alignment plate 70. At the same time, the first surface of the insulator body or housing 32 (from which the male connecting ends 36 of the connector pins 34 extend) is supported on the bottom surface 76 of the inset portion 75 and the peripheral side edges of the insulator body or housing 32 abut the vertical peripheral wall 77 of the inset portion 76. The electrical connector 30 can be easily and quickly removed from the alignment plate 70 by simply pulling it out of the inset portion 75.

As illustrated in FIGS. 7A and 9A-9C, the inset portion 75 and the electrical connector 30 also can have one or more keys to ensure the electrical connector 30 can only be received and held in the alignment plate 70 in a specific position and orientation and to prevent the inset portion 75 from receiving and holding the electrical connector 30 in any other position or orientation. For example, the inset portion 75 can have one more flats 71 formed in the vertical peripheral wall 77 and the particular electrical connector 30 can have one or more corresponding flats 31 formed in the peripheral edge of the insulator body or housing 32 so that the electrical connector 30 can only be received in the inset portion 75 with the corresponding flats aligned. Separately, or in addition, the inset portion 75 can have one more inward protrusions or projections 79 formed in the vertical peripheral wall 77 and the particular electrical connector 30 can have one or more corresponding notches or insets 37 formed in the peripheral edge of the insulator body or housing 32 so that the electrical connector 30 can only be received in the inset portion 75 with the protrusion or projection 79 and the corresponding notch 37 aligned.

It should be noted that the inset portion 75 is preferably located on the alignment plate 70 so that when the alignment plate 70 is received and held in the alignment plate retainer 60, at least the portion of the bottom surface 73 of the alignment plate 70 below the inset portion 75 is exposed to and accessible from the interior 42 of the housing 40 through the opening 64 of the alignment plate retainer 60. Accordingly, as best illustrated in FIGS. 5A-5B and 10A-10C, when a particular electrical connector 30 with which the alignment plate 70 is intended for use is received and held in the alignment plate 70, the male connecting ends 36 of the connector pins 34 of the electrical connector 30 extend through the openings 78 in the alignment plate 70, are exposed to the interior 42 of the housing 40, and are accessible by the heating device 80 through the opening 64. At the same time, the corresponding wire receptacles 38 of the connector pins 34 are exposed outside the housing 40 and are accessible to receive the ends of the wires 20 to be connected to the electrical connector 30 as best illustrated in FIGS. 4B, 5A-5B, 10A, and 11A-11B.

It will be appreciated that because the alignment plate 70, and more particularly the inset portion 75, is adapted and configured to receive and hold a particular electrical connector 30 in a particular position and orientation in relation to the alignment plate 70 and the housing 40, the robotic positioner 90 can be controlled to precisely and accurately position the heating device 80 to a heating position relative to each individual connector pin 34 of the electrical connector 30 to provide heat to connect a wire 20.

It also will be appreciated that because the alignment plate 70 is removably received and held in the alignment plate retainer 60, an operator can select from among a plurality of alignment plates 70 with different inset 75 configurations for use with a plurality of different electrical connectors 30 having different insulator body 32 shapes and sizes, and different numbers and arrangements of connector pins 34. It is thus a beneficial aspect of the example robotic wire termination system 10 that it readily and easily usable with many different electrical connectors 30 without the need for substantial configuration or hardware changes. Another related beneficial aspect is that an operator can easily and quickly switch over from one electrical connector 30 to another electrical connector 30, by simply removing one alignment plate 70 from the alignment plate retainer 60 and replacing it with another alignment plate 70. Production delays due to change-over time are thus greatly reduced.

F. Robotic Positioner

The robotic positioner 90 of the example robotic wire termination system 10 is illustrated in detail in FIGS. 14A-14F and 15A-15B. The robotic positioner 90 is also illustrated in connection with the housing 40, alignment plate retainer 60 and alignment plate 70, heating device 80, and other system components in FIGS. 1, 4A, and 16A-16H.

The robotic positioner 90 is mounted within the housing 40 and is in communication with the control unit 110. The robotic positioner 90 is controllable by the control unit 110 and is operable to move the heating device 80 in three dimensions (3D) within the housing 40. More particularly, the robotic positioner 90 is controllable and operable to move the heating device 80 in three dimensions to and between a plurality of positions within the housing 40 in relation to the connector pins 34 of an electrical connector 30. The positions include a heating position relative to each individual connector pin 34. Each position corresponds to a unique set of coordinates of a three dimensional coordinate system, such as the X, Y, and Z coordinates of a Cartesian coordinate system.

Because each electrical connector 30 to which wires 20 are to be connected is received and held by a corresponding alignment plate 70 in the alignment plate retainer 60 of the housing 40 in a specific position and orientation relative to the housing 40, and because the specifications of each such electrical connector 30, including the number, arrangement, and spacing of connector pins 34 are known, the unique set of coordinates corresponding to the position in 3D space of each connector pin 34 can be determined. The coordinate sets for all of the connector pins 34 of a particular electrical connector 30 can be grouped and stored together in the control unit 110 or in storage accessible to the control unit 110 with each unique set of coordinates associated with or indexed to a different connector pin 34 and the entire group associated or indexed to the particular electrical connector 30. As individual connector pins 34 of a particular connector 30 are selected to have wires 20 connected, the control unit 110 can access and use the associated coordinates to control the robotic positioner 90 to move the heating device 80 to a position beneath a selected connector pin 34, and from there to a heating position relative to the selected connector pin 34.

As one example, the robotic positioner 90 can be controlled by the control unit 110 to move and position the heating device 80 to a set of coordinates that corresponds to a heating position relative to a first selected connector pin 34. After the heating device 80 has applied heat to the first selected connector pin 34 for a wire 20 to be connected, the robotic positioner 90 can be controlled to move and position the heating device 80 to another set of coordinates corresponding to a heating position relative to a second selected connector pin 34. The robotic positioner 90 can be controlled to selectively move the heating device 80 to any set of coordinates, including any set of coordinates corresponding to a heating position relative to any selected connector pin 34 of an electrical connector 30 and this can be done in any order and without regard to the relative locations of the selected connector pins 34 on the electrical connector 30.

As another example, the robotic positioner 90 can be controlled by the control unit 110 to automatically move and position the heating device 80 to each of a plurality of different sets of coordinates corresponding to a plurality of different heating positions relative to a plurality of different selected connector pins 34 of an electrical connector 30 according to a predetermined sequence or series. After the heating device 80 has applied heat to one connector pin 34 of the sequence or series for a wire 20 to be connected, the robotic positioner 90 can be automatically controlled to move the heating device 80 to a next set of coordinates corresponding to a heating position relative to the next connector pin 34 in the sequence or series. The robotic positioner 90 can be controlled to automatically move the heating device 80 to sets of coordinates corresponding to heating positions relative to connector pins 34 of an electrical connector 30 according to a predetermined sequence or series in any order and without regard to the relative locations of the selected connector pins 34 on the electrical connector 30. However, for efficiency it may be preferable to move the heating device 80 between adjacent connector pins 34 in a common row, to complete the wire connection operations with respect to the connector pins 34 in that row, and then to reposition the heating device 80 to an adjacent connector pin 34 in an adjacent row and complete the wire connection operations with respect to the connector pins 34 in that row, and so on.

The robotic positioner 90 can be controlled to move and position the heating device 80 to a heating position relative to one or more individually selected connector pins 34 of an electrical connector 30, or sequentially to each connector pin 34 in a predetermined sequence or series of connector pins 34 of the electrical connector 30 based on manual input from an operator, programmatically, or a combination of both. For example, the control unit 110 can be configured to receive an input indicating completion of a wire connecting operation with respect to an individually selected first connector pin 34 by an operator actuating a switch or making a selection on a display as described below, or otherwise. In response, the control unit 110 can be configured to wait to receive a selection of a second connector pin 34 from the operator and then to automatically control the robotic positioner 90 to move and position the heating device 80 to the heating position relative to the second connector pin 34.

Similarly, the control unit 110 can be configured to receive an operator input indicating completion of a wire connecting operation with respect to one connector pin 34 in a predetermined sequence or series of connector pins 34 or to proceed from one connector pin 34 in the predetermined sequence or series to the next connector pin 34 in the series. In response, the control unit 110 can be configured to automatically control the robotic positioner 90 to position the heating device 80 to the heating position relative to the next connector pin 34 in the sequence or series.

The control unit 110 also can be configured to control the robotic positioner 90 to move and position the heating device 80 from a heating position relative to one connector pin 34 in a predetermined series of connector pins 34 to a heating position relative to the next connector pin 34 of the predetermined series based on programmatic input. For example, the control unit 110 can be configured to monitor the temperature of the heating device 80 and/or the elapsed time the heating device 80 is in the heating position with respect to the one connector pin 34, and to automatically control the robotic positioner 90 to move and position the heating device 80 to the heating position relative to the next connector pin 34 in the series when it is determined that the temperature of the heating device 80 has fallen below a predetermined value, and/or or a predetermined time has elapsed with the heating device 80 in the heating position.

The robotic positioner 90 comprises a first positioner 92, a second positioner 94, and a third positioner 96. The first positioner 92, the second positioner 94, and the third positioner 96 are each in communication with the control unit 110 and are each selectively and independently controllable and movable by the control unit 110.

The first positioner 92, the second positioner 94, and the third positioner 96 each preferably comprise a linear positioner. In the example embodiments, the first positioner 92 comprises a first drive motor and encoder 93, a pair of elongated first mounting frames 92a, 92b, a pair of elongated first drive screws 95a, 95b, a first set of one or more elongated first guide rails 97a, a second set of one or more elongated first guide rails 97b, and a pair of first linear stages 99a, 99b. The second positioner 94 comprises a second drive motor and encoder 100, an elongated second mounting frame 94a, an elongated second drive screw 101, a set of one or more elongated second guide rails 102, and a second linear stage 103. The third positioner 96 comprises a third drive motor and encoder 104 and a vertical stage 105.

Any suitable linear positioner or positioners may be used for the first positioner 92, the second positioner 94, and the third positioner 96. For example, a number of linear positioners used in connection with 3D printers are suitable for use. More specifically, a stepper motor-driven leadscrew linear stage sold by Newmark Systems, Inc. of Rancho Santa Margarita, California as the "eTrack" linear stage is specified as having positional resolution of 0.04 μm and is suitable for the first positioner 92 and the second positioner 94. A stepper motor-driven leadscrew vertical lift stage also sold by Newmark Systems, Inc. as the "VS" series is specified as having a positional resolution of 0.03 μm and is suitable for the third positioner 94.

In general, the first positioner 92, the second positioner 94, and the third positioner 96 are preferably arranged and configured in relation to each other so that the first positioner 92 is movable along a first longitudinal axis, the second positioner 94 is movable along a second longitudinal axis substantially orthogonal or perpendicular to the first longitudinal axis, and the third positioner 96 is movable along a third longitudinal axis substantially orthogonal or perpendicular to the first longitudinal axis and to the second longitudinal axis. The first positioner 92, the second positioner 94, and the third positioner 96 are each selectively and independently controllable by the control unit 110 for movement along the first, second, and third longitudinal axis respectively.

As used herein, "along" a longitudinal axis in the context of the components and movement of the robotic positioner means and includes not only "on" the longitudinal axis but also "in a direction parallel to" the longitudinal axis. Further, and for purposes of description, the first longitudinal axis can correspond to the X-axis, the second longitudinal axis can correspond to the Y-axis, and the third longitudinal axis can correspond to the Z-axis of a 3D Cartesian coordinate system.

Thus, for example, the first positioner 92 may be movable along the X-axis, the second positioner 94 may be movable along the Y-axis, and the third positioner 96 may be movable along the Z-axis of the 3D Cartesian coordinate system under control of the control unit 110. Of course it will be appreciated that the axes of the 3D coordinate system can be arbitrarily reassigned to the first positioner 92, the second positioner 94, and the third positioner 96 so that each positioner is movable along a longitudinal axis corresponding to one of the other X, Y, or Z axes of the coordinate system.

In the example embodiments, the first mounting frames 92a, 92b of the first positioner 92 each comprise a substantially similar elongated plate with end plates at opposite ends. The first drive screw 95a is connected to the first drive motor and encoder 93, and is selectively and rotationally drivable by the first drive motor and encoder 93. The first drive screw 95a extends outward linearly along the first longitudinal axis from the first drive motor and encoder 93 through an opening in the end plate at one end of first mounting frame 92a and terminates at the end plate at the opposite end of the first mounting frame 92a. The first set of one or more first guide rails 97a extend linearly between the end plates substantially along the first longitudinal axis and substantially in parallel with the first drive screw 95a, and are supported at their opposite ends by the end plates. The first set of one or more first guide rails 97a extend though passages in the first linear stage 99a to support the first linear stage 99a and guide it for movement substantially along the first longitudinal axis between the end plates. The first drive screw 95a extends through a threaded passage of the first linear stage 99a so that rotation of the first drive screw 95a causes the first linear stage 99a to translate and move linearly on the first set of one or more first guide rails 97a substantially along the first longitudinal axis between the end plates.

The first mounting frame 92b is spaced apart from and is arranged to be substantially co-planar with and to extend substantially parallel to the first mounting frame 92a. The first drive screw 95b is arranged to extend substantially linearly between the end plates of the first mounting frame 92b substantially along the first longitudinal axis and substantially co-planar with and parallel to the first drive screw 95a. The opposite ends of the first drive screw 95b are supported for rotational by the end plates, for example by bearings or the like. No drive motor is directly connected to the first drive screw 95b, but as will be appreciated from the description herein, the first drive motor and encoder 93 are indirectly connected to the first drive screw 95b. The second set of one or more first guide rails 97b are arranged to extend substantially linearly between the end plates of the first mounting frame 92b substantially along the first longitudinal axis, substantially parallel to the first drive screw 95b, and substantially co-planar with and parallel to the first set of one or more first guide rails 97a, and to have their opposite ends supported by the end plates. The first drive screw 95b and the first set of one or more first guide rails 97a extend though passages in the first linear stage 99b to support the first linear stage 99b and to guide it for movement between the end plates substantially along the first longitudinal axis and substantially co-planar with and substantially parallel to the first linear stage 99a.

It will be appreciated that in the foregoing arrangement the first positioner 92 has two spaced-apart sides comprising the first mounting frames 92a, 92b with a space between them. Further, the side with the first drive motor and encoder 93 comprises a driven side, while the other side comprises a follower side. That is, provided the driven side and the follower side are interconnected, as the first drive motor and encoder 93 is selectively operated to rotate the first drive screw 95a on the driven side, the first linear stage 99a is driven linearly by translation on the first drive screw 95a along the first longitudinal axis. At the same time, the first linear stage 99b on the follower side follows the movement of the first linear stage 99a by translating linearly on the first drive screw 95b along the first longitudinal axis. Accordingly, the first linear stage 99a of the driven side and the first linear stage 99b of the follower side are selectively movable along the first longitudinal axis on opposite sides of the space between them.

The first positioner 92 may be connected to the housing 40 of the example robotic wire termination system 10 either directly or indirectly via the first mounting frames 92a, 92b. With the first mounting frames 92a, 92b fixedly connected to the housing 40 (or to some other structure), rotation of the first drive screw 95a by the first drive motor and encoder 93 will cause both first linear stages 99a, 99b to move together along the first longitudinal axis on their respective first drive screws 95a, 95b and respective first guide rails 97a, 97b. Thus, the robotic positioner 90 and more particularly the first positioner 92 can be controlled by the control unit 110 to selectively move the first linear stages 99a, 99b to any coordinate value along the first longitudinal axis within the limits of movement of the first linear stages 99a, 99b. The limits of movement of the first linear stages 99a, 99b along the first longitudinal axis are determined by the locations of the end plates of the respective first mounting frames 92a, 92b. The first positioner 92 is preferably positioned within the interior 42 of the housing 40 so that within its limits of movement it can move and position the heating device 80 along the first longitudinal axis in the space between the first mounting frames 92a, 92b so that the heating device 80 can be brought into a heating position relative to every individual connector pin 34 exposed to the interior 42 of the housing 40 through the opening 64 in the alignment plate retainer 60.

Similarly to the first positioner 92, the second mounting frame 94a of the second positioner 94 comprises a substantially elongated plate with end plates at opposite ends. The second drive screw 101 is connected to the second drive motor and encoder 100, and is selectively and rotationally drivable by the second drive motor and encoder 100. The second drive screw 101 extends outward linearly along the second longitudinal axis from the second drive motor and encoder 100 through an opening in the end plate at one end of second mounting frame 94a and terminates at the end plate at the opposite end of the second mounting frame 94a. The set of one or more second guide rails 102 extend linearly between the end plates substantially along the second longitudinal axis and substantially in parallel with the second drive screw 101, and are supported at their opposite ends by the end plates. The set of one or more second guide rails 102 extend though passages in the second linear stage 103 to support the second linear stage 103 and guide it for movement substantially along the second longitudinal axis between the end plates. The second drive screw 101 extends through a threaded passage of the second linear stage 103 so that rotation of the second drive screw 101 causes the second linear stage 103 to translate and move linearly on the set of one or more second guide rails 102 substantially along the second longitudinal axis between the end plates.

The second mounting frame 94a extends along the second longitudinal axis substantially orthogonal to the first mounting frames 92a, 92b. Each end plate at an opposite end of the second mounting frame 94a is connected to a first linear stage 99a, 99b of the first positioner 92 by a plate, adaptor, or the like and suitable fasteners. With this arrangement, the second positioner 94 is disposed beneath the first positioner 92 within the housing 40 and the second linear stage 103 of the second positioner 94 is selectively movable within the housing 40 in the space between the first mounting frames 92a, 92b of the first positioner 92.

With the second positioner 94 connected to the first positioner 92 as described, the second positioner 94 is movable with the first positioner 92 along the first longitudinal axis as the first linear stages 99a, 99b of the first positioner 92 move in parallel along the first longitudinal axis. However, because the first positioner 92 is not connected to the second linear stage 103 of the second positioner 94, the first positioner 92 does not move along the second longitudinal axis with the second positioner 94 when the second linear stage 103 moves along the second longitudinal axis.

Rotation of the second drive screw 101 by the second drive motor and encoder 100 causes the second linear stage 103 to translate on the second drive screw 101 and to move linearly along the second longitudinal axis on the second drive screw 101 and the respective second guide rails 102. Thus, the robotic positioner 90 and more particularly the second positioner 94 can be controlled by the control unit 110 to selectively move the second linear stage 103 to any coordinate value along the second longitudinal axis within the space between the first mounting frames 92a, 92b of the first positioner 92 and within the limits of movement of the second linear stage 103. Further, the second positioner 94 is arranged and connected to the first positioner 92 so that within its limits of motion, the second positioner 94 can move and position the heating device 80 connected to the second linear stage 103 along the second longitudinal axis so that the heating device 80 can be brought into a heating position relative to every individual connector pin 34 exposed to the interior 42 of the housing 40.

The limits of movement of the second linear stage 103 along the second longitudinal axis traversing the space between the first mounting frames 92a, 92b are determined by the locations of the edges of the respective first mounting frames 92a, 92b along the space. Preferably, a range of motion limit indicator 106 is coupled to the second linear stage 103 and is in communication with the control unit 110. The range of motion limit indicator 106 may be coupled to the second linear stage 103 either directly or indirectly, for example by being connected to a component such as the third positioner 96 which is in turn mounted on and connected to the second linear stage 103. In either case, when the second linear stage 103 reaches the limits of its allowed motion along the second longitudinal axis, the range of motion limit indicator 106 communicates a signal to the control unit 110, which is configured to control the second drive motor and encoder 100 to stop further movement of the second linear stage 103.

More specifically, the range of motion limit indicator 106 comprises a first limit switch 106*a* and a second limit switch 106*b*. The first limit switch 106*a* and the second limit switch 106*b* are spaced-apart and arranged so that when the second linear stage 103 reaches the limit of its range of motion in a first direction along the second longitudinal axis, the first limit switch 106*a* contacts the edge of the first mounting frame 92*a* of the first positioner 92 along the edge of the space. Similarly, when the second linear stage 103 reaches the limit of its range of motion in a second opposite direction along the second longitudinal axis, the second limit switch 106*b* contacts the edge of the first mounting frame 92*b* of the first positioner 92 along the opposite edge of the space. The first limit switch 106*a* and the second limit switch 106*b* are each in communication with the control unit 110. Thus, when the first limit switch 106*a* contacts the edge of the first mounting frame 92*a* indicating the second linear stage 103 has reached the limit of its range of motion in the first direction, the first limit switch 106*a* communicates a signal to the control unit 110, which is configured to stop the second drive motor and encoder 100 to stop further movement of the second linear stage 103 in the first direction. Similarly, when the second limit switch 106*b* contacts the edge of the first mounting frame 92*b* indicating the second linear stage 103 has reached the limit of its range of motion in the second opposite direction, the second limit switch 106*b* communicates a signal to the control unit 110, which is configured to control the second drive motor and encoder 100 to stop further movement of the second linear stage 103 in the second direction.

At least in connection with the example embodiments, the first longitudinal axis and the second longitudinal axis extend laterally in relation to the connector pins 34 that are exposed to the interior 42 of the housing 40. Based on the description above, it will be appreciated that the first positioner 92 is controllable to selectively move the second linear stage 103 of the second positioner 94 laterally to any coordinate value along the first longitudinal axis in the area beneath the connector pins 34 and the second positioner 94 is controllable to selectively move the second linear stage 103 laterally to any coordinate value along the second longitudinal axis in the area beneath the connector pins 34. Accordingly, with the heating device 80 mounted to the second linear stage 103 of the second positioner 94, the first positioner 92 and the second positioner 94 are controllable to selectively move the heating device 80 laterally in two orthogonal directions to any set of coordinates corresponding to any position within a substantially horizontal plane that extends laterally beneath the connector pins 34 including positions directly below each individual connector pin 34.

The third positioner 96 is mounted on and connected to the second positioner 94 and more specifically to the second linear stage 103 of the second positioner 94. The connection can be made using a suitable plate, adaptor, or the like and suitable fasteners. The third positioner 96 is movable with the second positioner 94 and more specifically with the second linear stage 103 of the second positioner 94 along the second longitudinal axis. In addition, because the second positioner 94, and more specifically the second linear stage 103 of the second positioner 94, is coupled with and movable with the first positioner 92 along the first longitudinal axis, the third positioner 96 is also movable with the first positioner 92 and the second positioner 94 along the first longitudinal axis. Thus, the third positioner 96 is selectively movable with the first positioner 92 and the second positioner 94 to any set of coordinates corresponding to any position within a substantially horizontal plane that extends laterally beneath the connector pins 34 of an electrical connector 30 that are exposed to the interior 42 of the housing 40 as described herein.

Figure 15A:
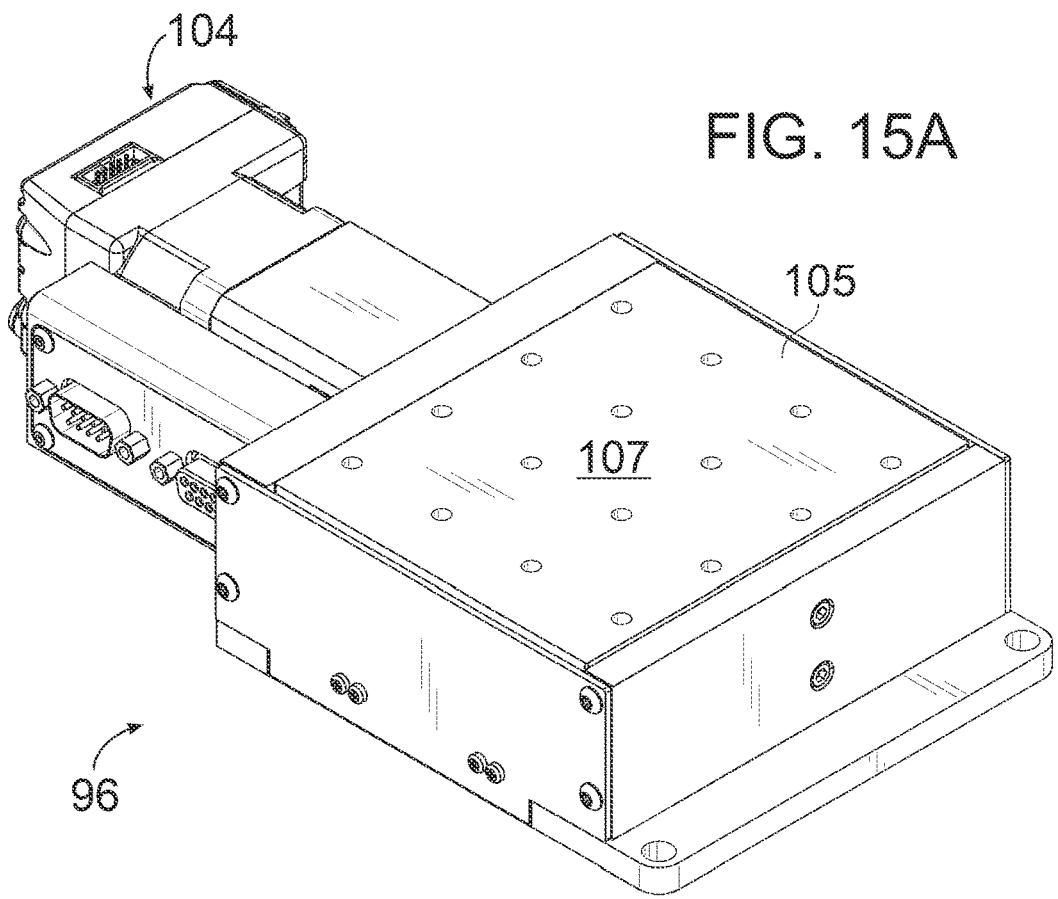
FIG. 15A is a top perspective view of a vertical lift stage of a robotic positioner of a robotic wire termination system in accordance with an example embodiment in a retracted position.
Figure 15B:
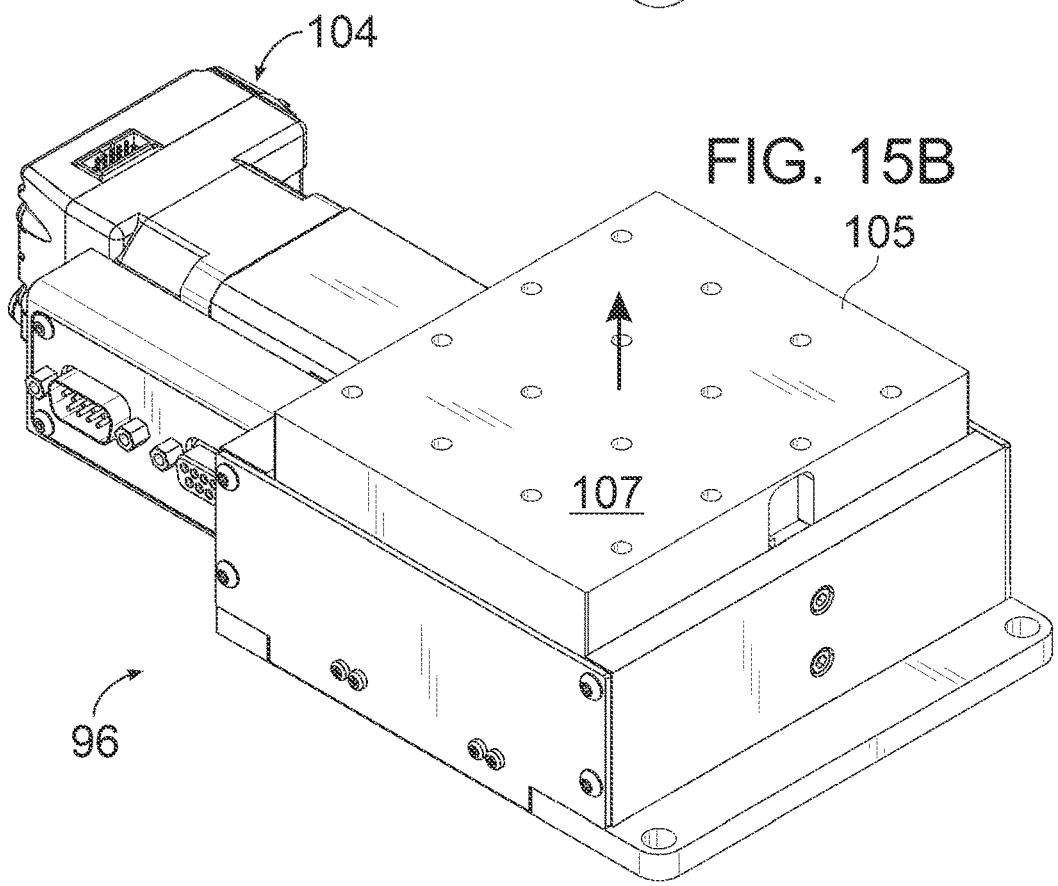
FIG. 15B is a top perspective view of a vertical lift stage of a robotic positioner of a robotic wire termination system in accordance with an example embodiment in an extended position.

The third drive motor and encoder 104 of the third positioner 96 is connected to the vertical stage 105. The third drive motor and encoder 104 is operable to selectively drive the vertical stage 105 to extend or retract as illustrated in FIGS. 15A and 15B. The third positioner 96 is mounted on and connected to the second linear stage 103 of the second positioner 94 such that the vertical stage 105 extends and retracts along a third longitudinal axis that is substantially orthogonal or perpendicular to the first longitudinal axis and the second longitudinal axis as described herein. With the first longitudinal axis and the second longitudinal axis arranged to extend laterally beneath and with respect to the connector pins 34 of an electrical connector 30 that are exposed to the interior 42 of the housing 40 as described herein, the third longitudinal axis thus extends substantially vertically in relation to the connector pins 34.

The third positioner 96 is controllable to selectively move (extend or retract) the vertical stage 105 to any coordinate value along the third longitudinal axis within its limits of motion. With the first positioner 92, second positioner 94, and third positioner 96 arranged and interconnected as described herein, the vertical stage 105 thus can be selectively moved and positioned to any set of coordinates corresponding to any position in three dimensional space in the area beneath the connector pins 34 of an electrical connector 30 that are exposed to the interior 42 of the housing 40 as described herein.

The heating device 80, which is described in further detail below, is mounted on and connected to a top surface 107 of the vertical stage 105 such that the heat providing element of the heating device 80 extends outwardly and upwardly substantially along the third longitudinal axis from the vertical stage 105. With the heating device 80 mounted on the vertical stage 105 and the third positioner 96 mounted on the second linear stage 103 of the second positioner 94 as described herein, within the limits of its motion the vertical stage 105 can be selectively extended and retracted to bring the heat providing element of the heating device 80 into a heating position relative to each individual connector pin 34 of an electrical connector 30 that is exposed to the interior 42 of the housing 40 as described herein and to remove the heat providing element from the heating position. As described further herein, the heating position can comprise the heat providing element being in contact with or in proximity with but not in contact with each connector pin 34.

With the first positioner 92, second positioner 94, and third positioner 96 arranged and interconnected as described and with the heating device 80 mounted to the third positioner 96 as described, it will be appreciated that the first positioner 92, the second positioner 94, and the third positioner 96 may each be independently controlled by the control unit 110 to sequentially move and position the heating device 80 in a plurality of different heating positions in three dimensional space within the interior 42 of the housing 40 to apply heat to a sequence or series of individual connector pins 34 exposed to the interior 42 of the housing 40 to melt the solder preform 39 in corresponding wire receptacles 38 and enable individual wires 20 to be sequentially connected to the connector pins 34. It will be further appreciated that each different heating position is associated with and relative to a selected connector pin 34 of an electrical connector 30 that is exposed to the interior 42 of the housing 40 as described herein and corresponds to a unique set of coordinates (e.g., X, Y, Z coordinates of a Cartesian coordinate system) in the three dimensional space within the interior 42 of the housing 40.

Figure 16A:
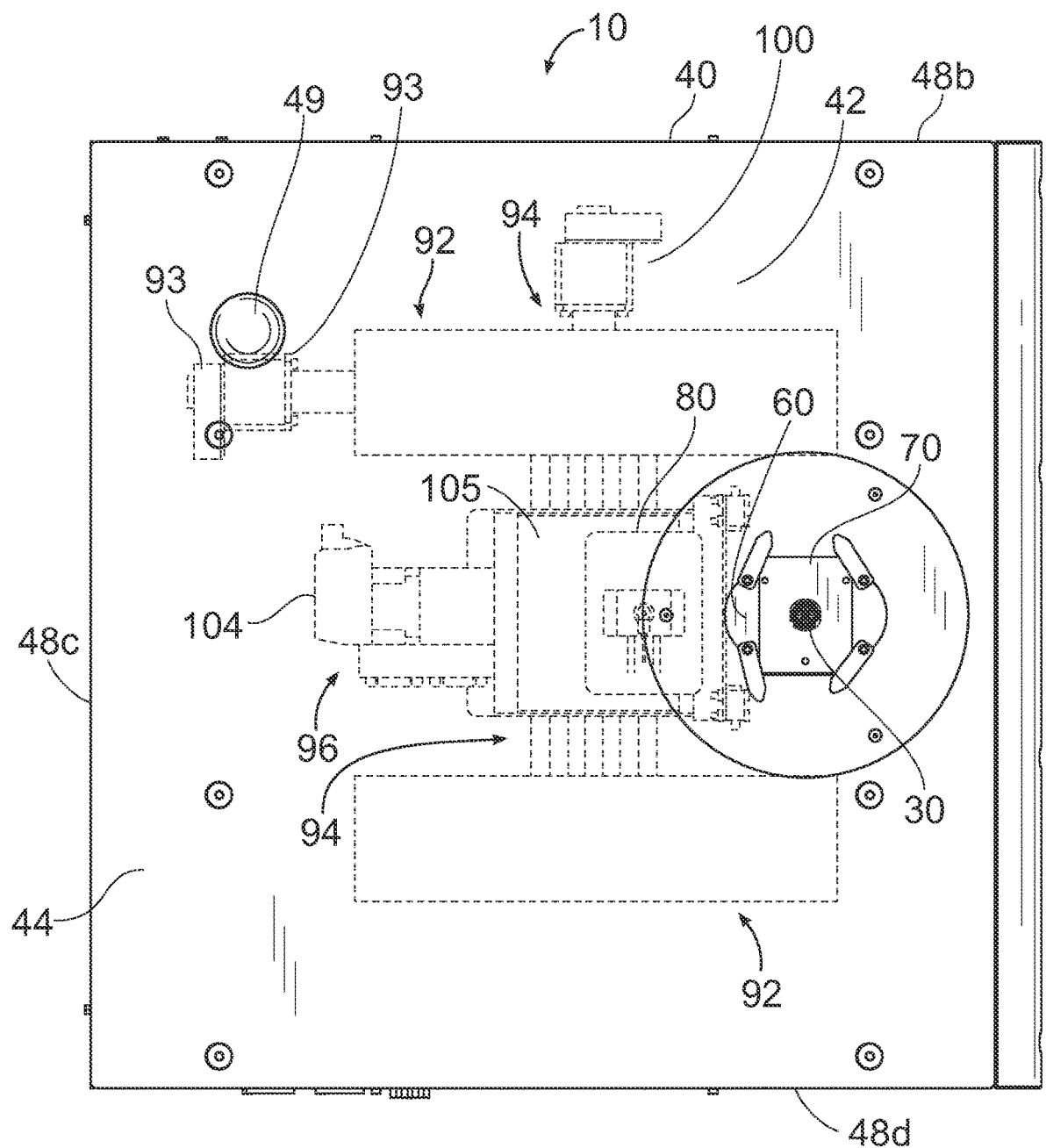
FIG. 16A is a top plan view of a robotic wire termination system in accordance with an example embodiment with a housing illustrated partially transparent to reveal an internal robotic positioner and heating device in an example starting position relative to the connector pins of an electrical connector.
Figure 16B:
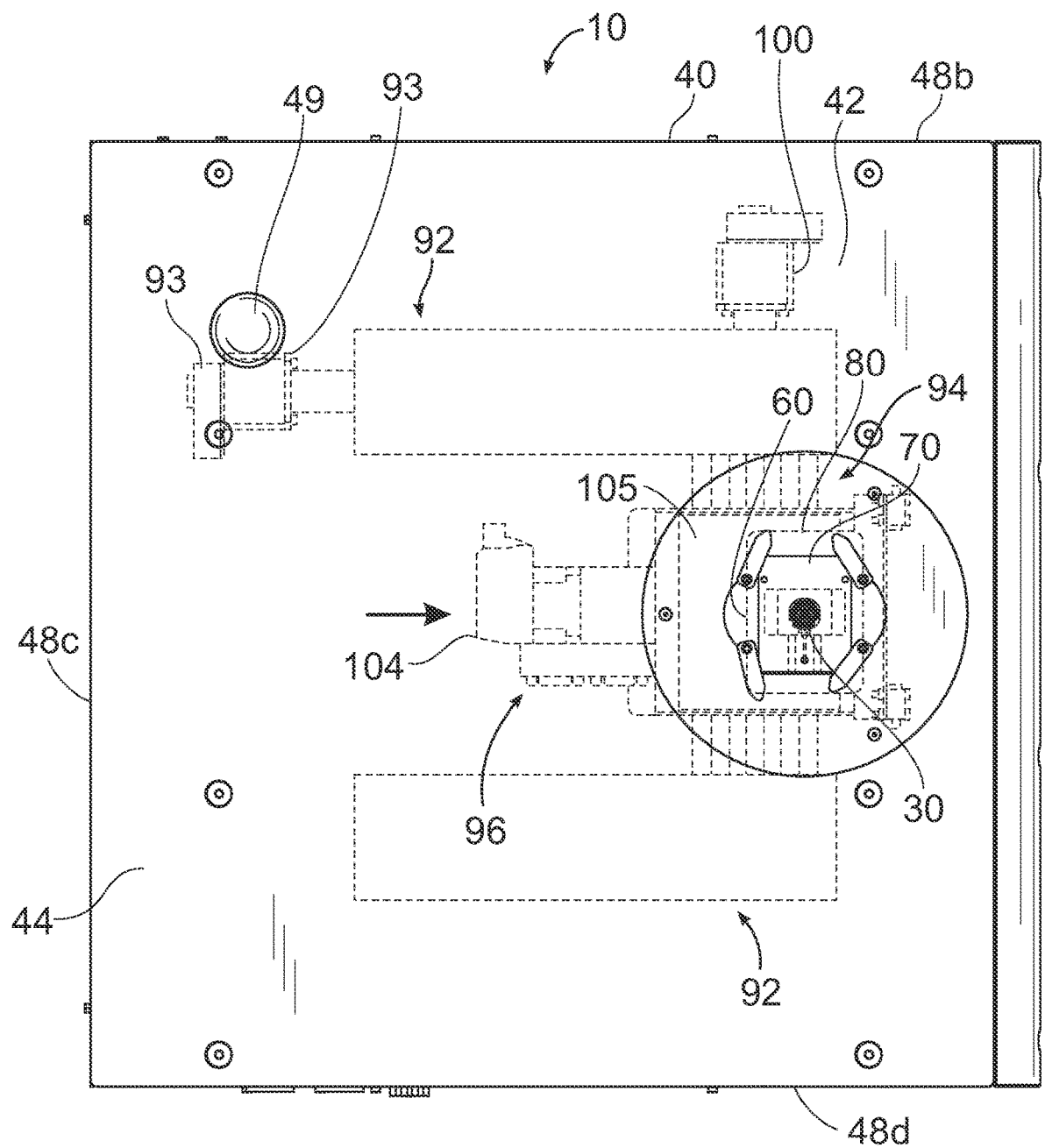
FIG. 16B is a top plan view of a robotic wire termination system in accordance with an example embodiment with a housing illustrated partially transparent to reveal an internal robotic positioner and heating device moved laterally along a first orthogonal longitudinal axis to a first position relative to the connector pins of an electrical connector.

An example sequence is illustrated in FIGS. 16A-16H. In the example sequence, an electrical connector 30 is held in a an alignment plate 70 in the alignment plate retainer 60 on the top surface 44 of the housing 40 with the connector pins 34 of the electrical connector 30 exposed to the interior 42 of the housing 40 as described herein. As shown in FIG. 16A, the robotic positioner 90 starts in a zero or starting position. In this position, the heating device 80 is laterally removed from the area beneath the connector pins 34. A connector pin 34 may be selected to have a wire 20 connected. As described herein, the selection may be made in a number of ways. For example, an operator may manually select an individual connector pin 34. Alternatively, the connector pin 34 may be automatically selected programmatically, for example as the first selected connector pin 34 of a predetermined sequence or series of connector pins 34 to which wires 20 are to be connected. Regardless of the manner in which the connector pin 34 is selected, as shown in FIG. 16B in response the robotic positioner 90, and more specifically the first positioner 92, is automatically controlled by the control unit 110 to move the heating device 80 laterally along the first longitudinal axis (indicated by the direction of the arrow) to a coordinate value corresponding to a position in the area beneath the connector pins 34. For example, the coordinate value may correspond to a position directly beneath a row of connector pins 34 that contains the selected connector pin 34.

Figure 16C:
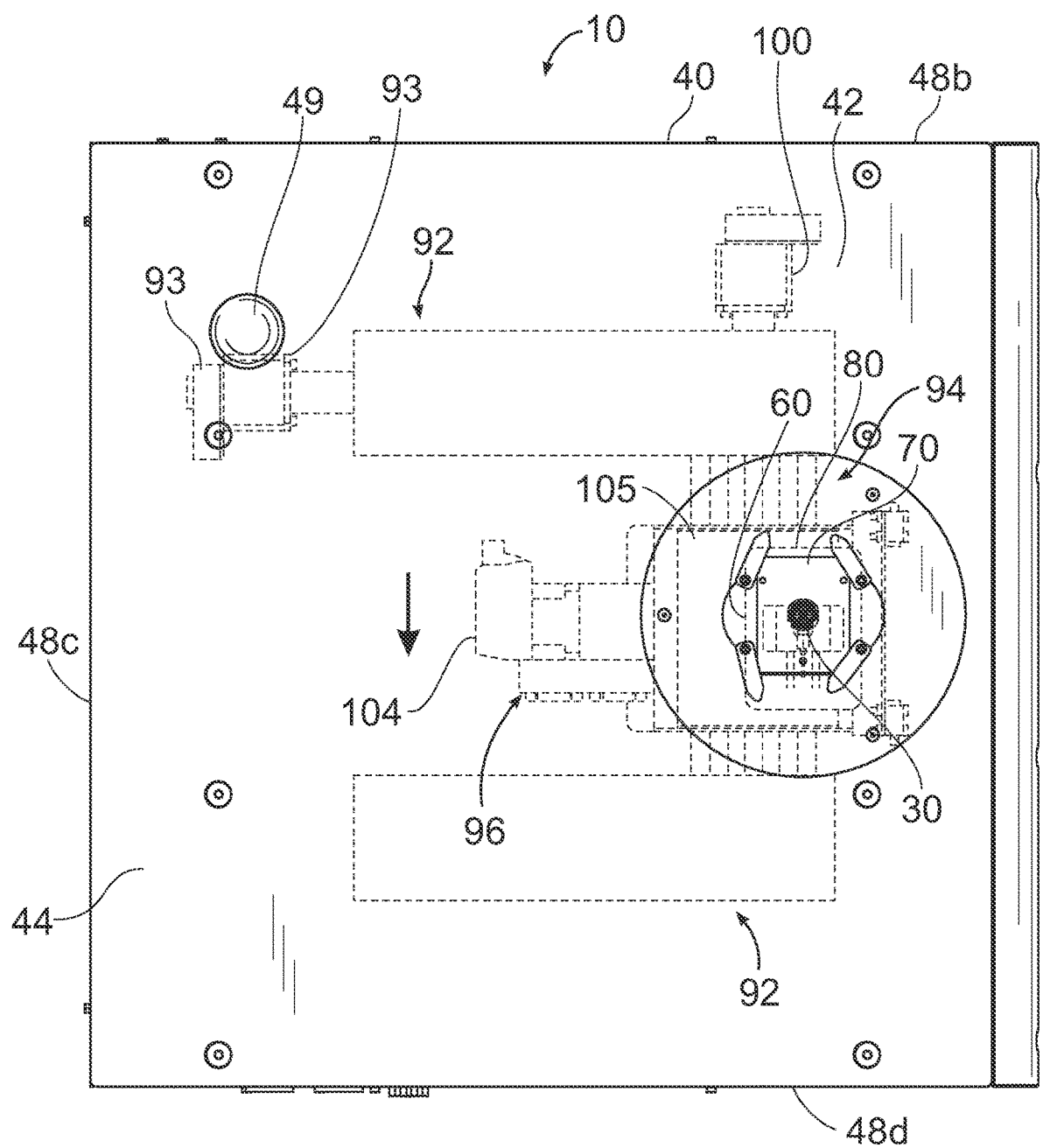
FIG. 16C is a top plan view of a robotic wire termination system in accordance with an example embodiment with a housing illustrated partially transparent to reveal an internal robotic positioner and heating device moved laterally along a second orthogonal longitudinal axis to a second position relative to the connector pins of an electrical connector.

Next, as shown in FIG. 16C, the robotic positioner 90, and more specifically the second positioner 94, is automatically controlled by the control unit 110 to move the heating device 80 laterally along the second longitudinal axis (indicated by the direction of the arrow) to a coordinate value corresponding to another position in the area beneath the connector pins 34. For example, the coordinate value may correspond to a position directly beneath the selected connector pin 34.

It will be appreciated that while FIGS. 16B and 16C show the heating device 80 being moved laterally first along the first longitudinal axis and then along the second longitudinal axis, this is just an example. The heating device may be moved laterally along the first longitudinal axis and the second longitudinal axis in any order.

Figure 16D:
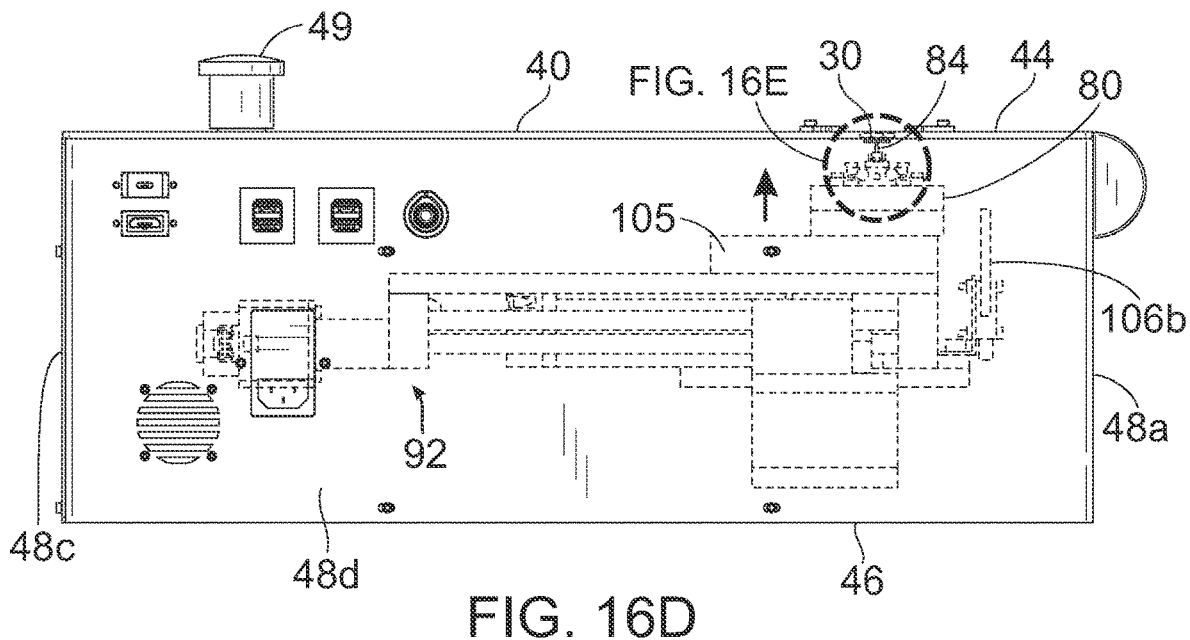
FIG. 16D is a side view of a robotic wire termination system in accordance with an example embodiment with a housing illustrated partially transparent to reveal an internal robotic positioner and heating device moved vertically along a third orthogonal longitudinal axis to a heating position relative to a first connector pin of an electrical connector.
Figure 16E:
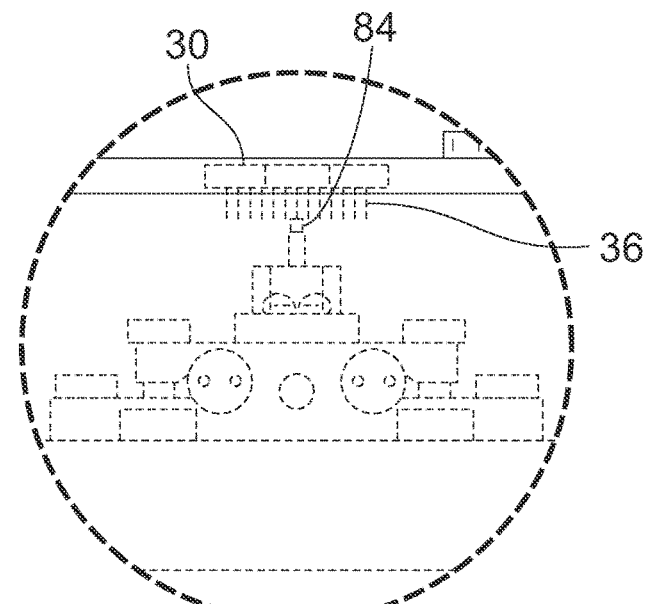
FIG. 16E is an enlarged view of the area enclosed by dashes in FIG. 16D.

Next, as shown in FIGS. 16D and 16E, the robotic positioner 90, and more specifically the third positioner 96, is automatically controlled by the control unit 110 to move the heating device 80 along the third longitudinal axis (indicated by the direction of the arrow) to a coordinate value corresponding to a heating position associated with and relative to the selected connector pin 34. Depending on the heat providing element of the heating device 80, which is described further below, the heating position can comprise the heat providing element being in contact with the male connecting end 36 of the selected connector pin 34 (FIG. 16E) or in proximity to but not in contact with the male connecting end 36. The heating device 80 is then activated to provide heat to the male connecting end 36 to melt the solder preform 39 in the corresponding wire receptacle 38 of the connector pin 34 to enable a wire 20 to be connected.

Figure 16F:
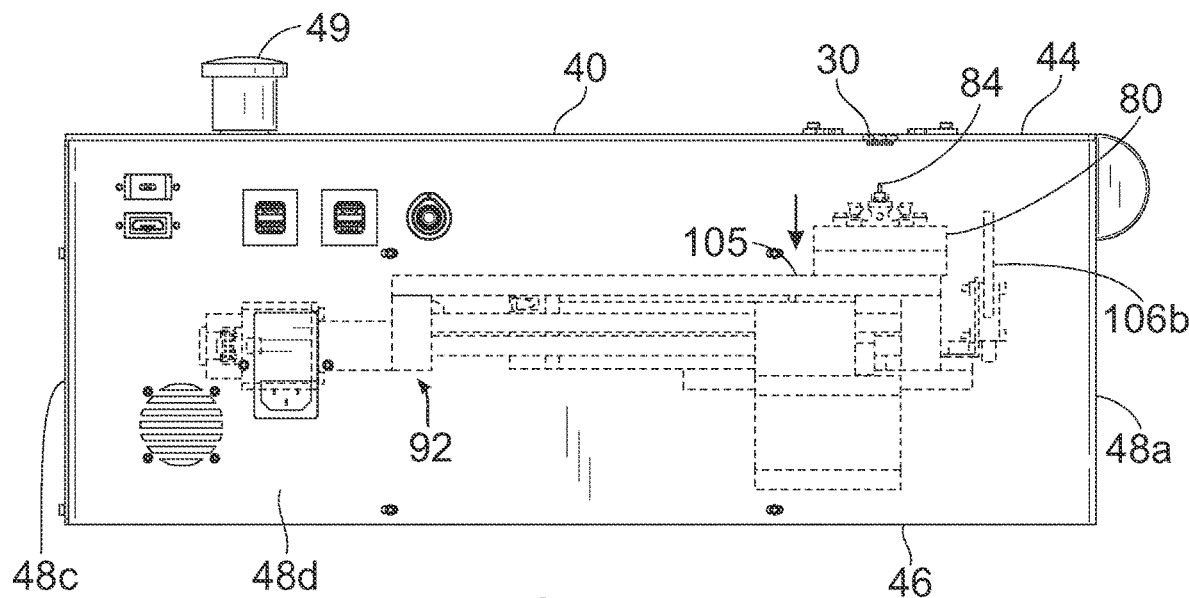
FIG. 16F is a side view of a robotic wire termination system in accordance with an example embodiment with a housing illustrated partially transparent to reveal an internal robotic positioner and heating device moved vertically along a third orthogonal longitudinal axis away from a heating position relative to a first connector pin of an electrical connector.

After a wire 20 has been connected, another connector pin 34 may be selected. As described herein, another connector pin 34 may be selected in a number of ways. For example, an operator may manually select another connector pin 34 or may select to proceed to the next connector pin in a predetermined sequence or series of connector pins 34. Alternatively, the connector pin 34 may be automatically or programmatically selected in response to an operator indicating the wire connection procedure with respect to the previously selected connector pin 34 is complete or in response to the control unit 110 detecting a reduction in the temperature of the heating device 80 for example. Regardless of the manner in which another connector pin 34 is selected, as shown in FIG. 16F in response the robotic positioner 90, and more particularly the third positioner 96, is automatically controlled by the control unit 110 to move the heating device 80 along the third longitudinal axis in the opposite direction (indicated by the direction of the arrow) to a coordinate value at which the heating device 80 is removed from the heating position with respect to the previously selected connector pin 34.

Figure 16G:
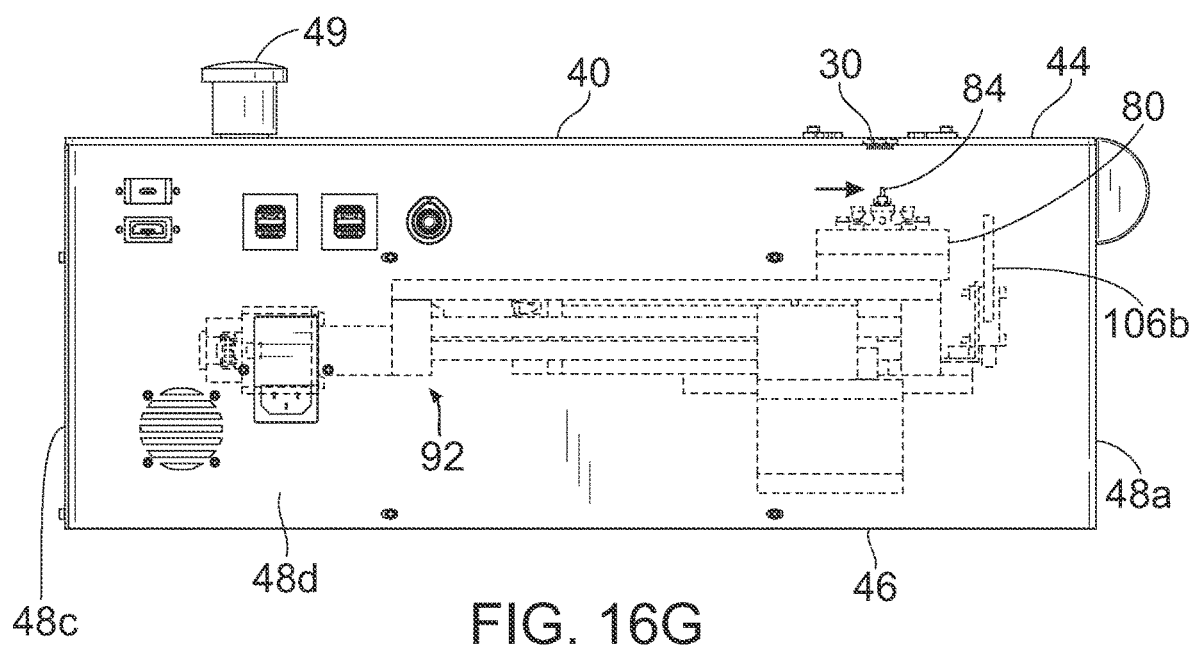
FIG. 16G is a side view of a robotic wire termination system in accordance with an example embodiment with a housing illustrated partially transparent to reveal an internal robotic positioner and heating device moved laterally along a second orthogonal longitudinal axis relative to a third position relative to the connector pins of an electrical connector.

Next, as shown in FIG. 16G, the robotic positioner 90 and more particularly the first positioner 92 can be automatically controlled to move the heating device 80 laterally along the first longitudinal axis (indicated by the direction of the arrow) to a coordinate value corresponding to another position in the area beneath the exposed connector pins 34. For example, the coordinate value may correspond to a position directly beneath the next selected connector pin 34. It will be appreciated that while FIG. 16F shows only lateral movement of the heating device 80 along the first longitudinal axis to bring it beneath the next selected connector pin 34, this is just an example. It may be that the heating device 80 also must be moved laterally along the second longitudinal axis, or along both the first longitudinal axis and the second longitudinal axis as shown in FIGS. 16B and 16C, to position it at a set of coordinates corresponding to a position directly beneath the next selected connector pin 34. As noted in connection with FIGS. 16B and 16C, in that case the heating device 80 may be moved laterally along the first longitudinal axis and the second longitudinal axis in any order.

Figure 16H:
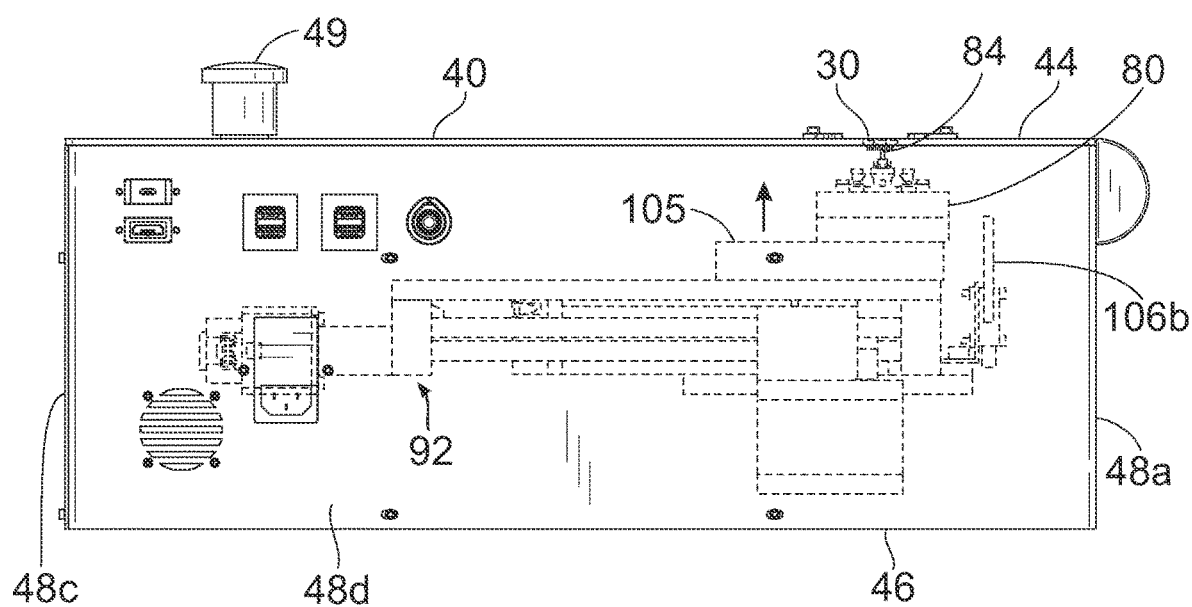
FIG. 16H is a side view of a robotic wire termination system in accordance with an example embodiment with a housing illustrated partially transparent to reveal an internal robotic positioner and heating device moved vertically along a third orthogonal longitudinal axis to a heating position relative to a second connector pin of an electrical connector.
Figure 17:
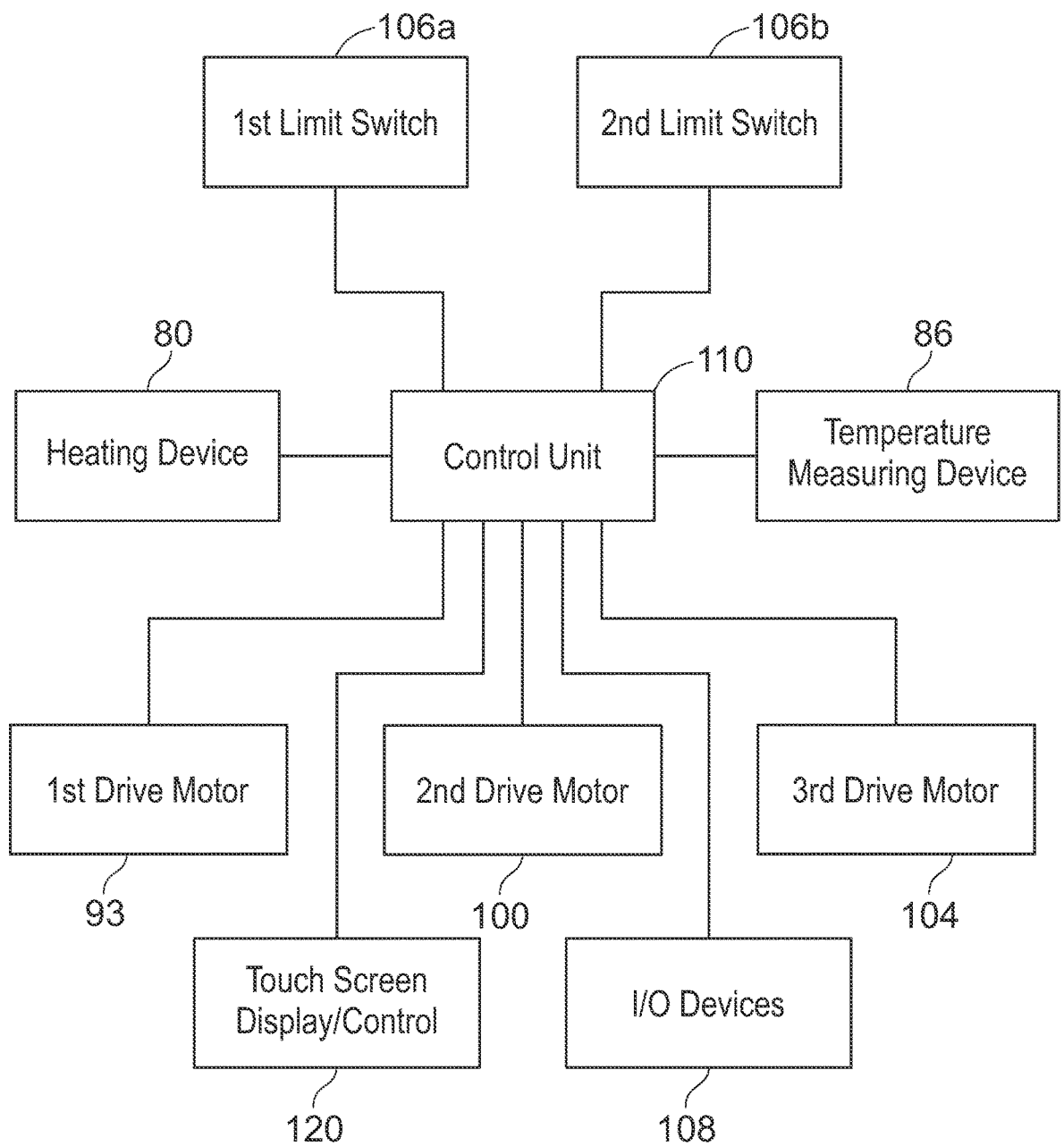
FIG. 17 is a block diagram of a robotic wire termination system in accordance with an example embodiment illustrating the connections and communications between a control unit and other system components.

Next, as shown in FIG. 16H, the robotic positioner 90, and more specifically the third positioner 96, is automatically controlled by the control unit 110 to move the heating device 80 along the third longitudinal axis (indicated by the direction of the arrow) to a coordinate value corresponding to a heating position associated with and relative to the next selected connector pin 34 to apply heat. The sequence as illustrated in FIGS. 16A-16H and as described above can continue indefinitely until all connector pins 34 of the electrical connector 30 which are to have wires 20 connected have been selected and wires 20 have been connected.

G. Heating Device

Figure 13A:
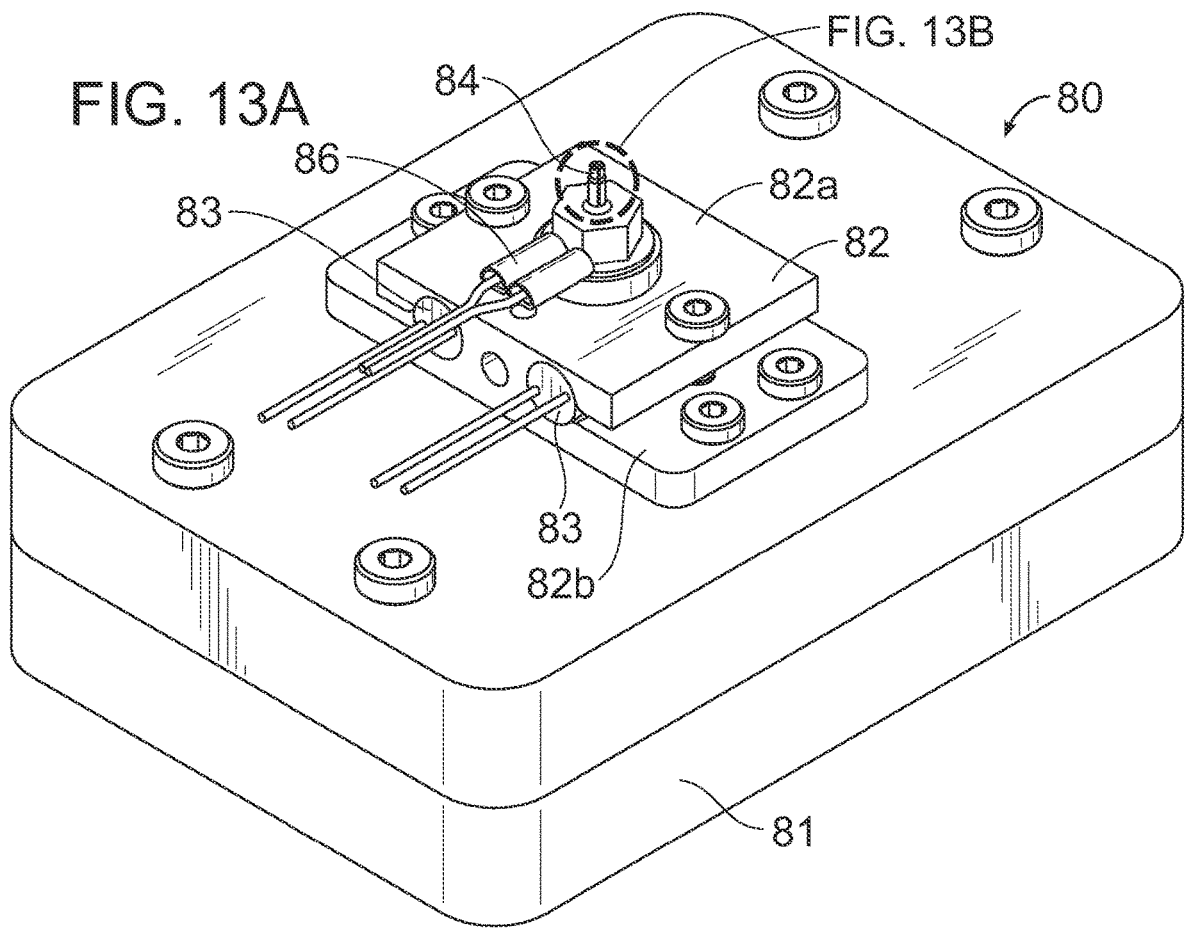
FIG. 13A is a top perspective view of one variation of a heating device of a robotic wire termination system in accordance with an example embodiment.
Figure 13B:
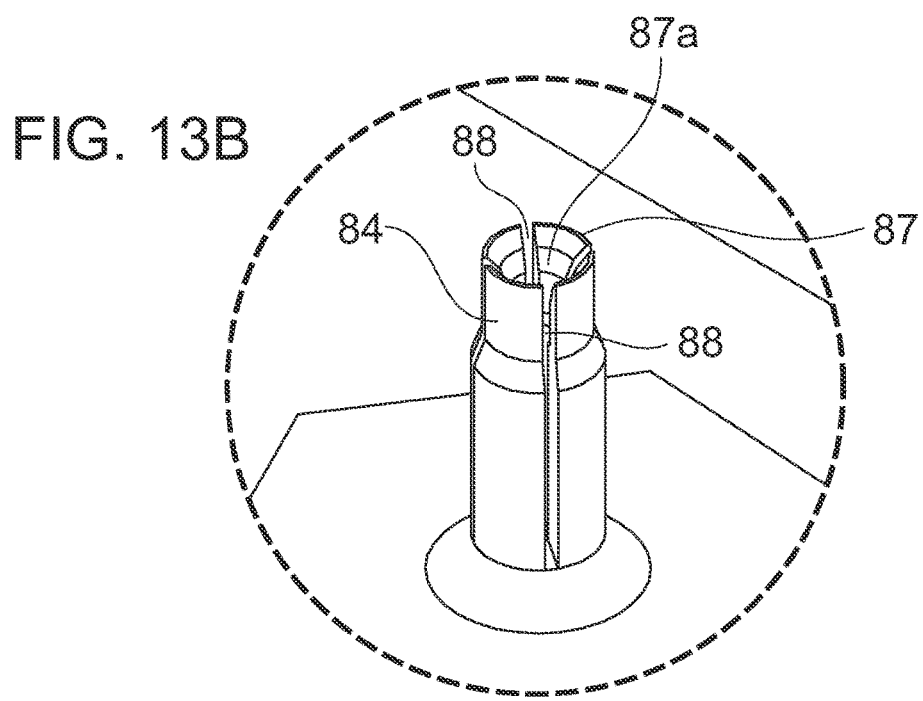
FIG. 13B is an enlarged view of the area enclosed by dashes in FIG. 13A.
Figure 13C:
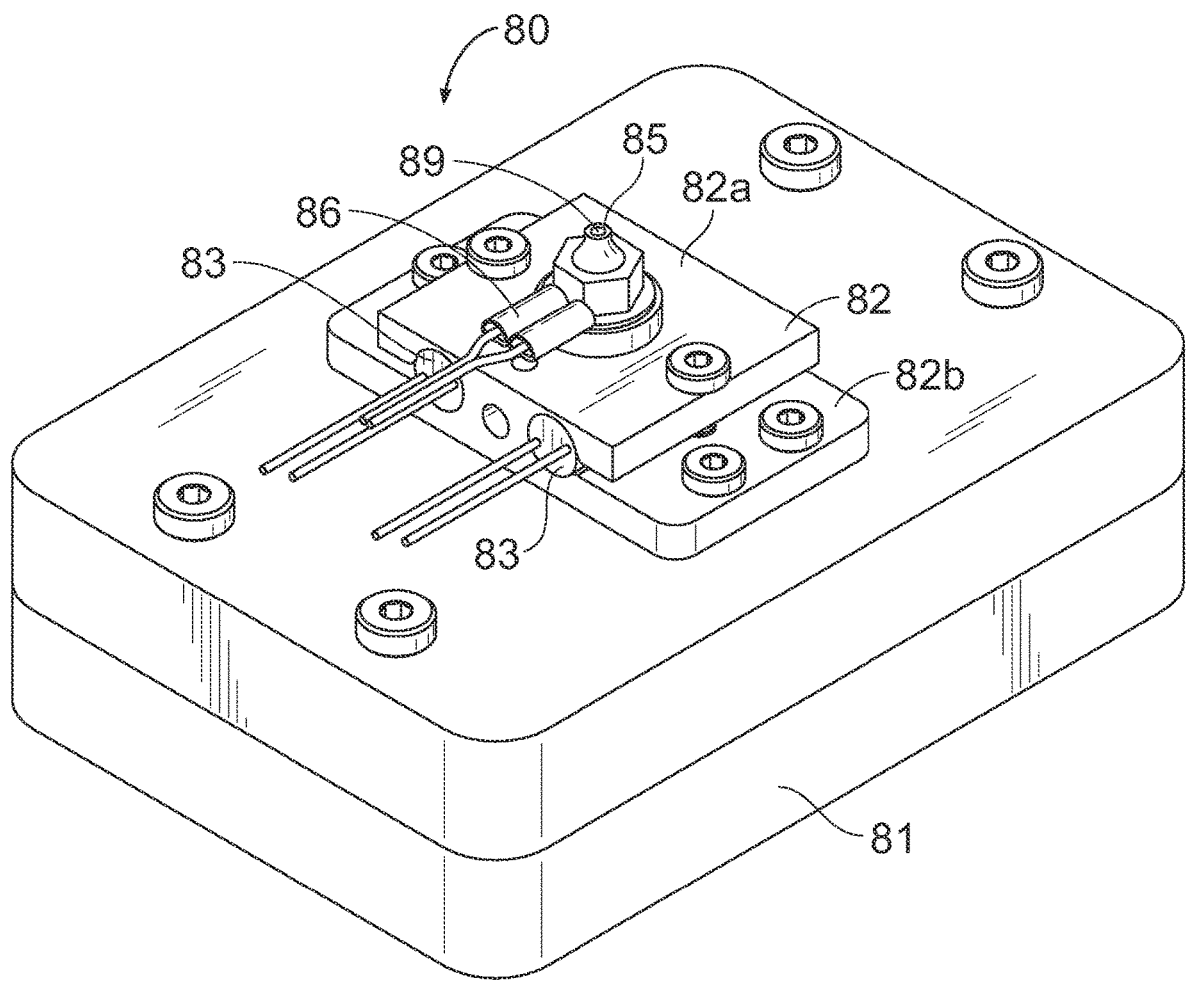
FIG. 13C is a top perspective view of another variation of a heating device of a robotic wire termination system in accordance with an example embodiment.
Figure 14A:
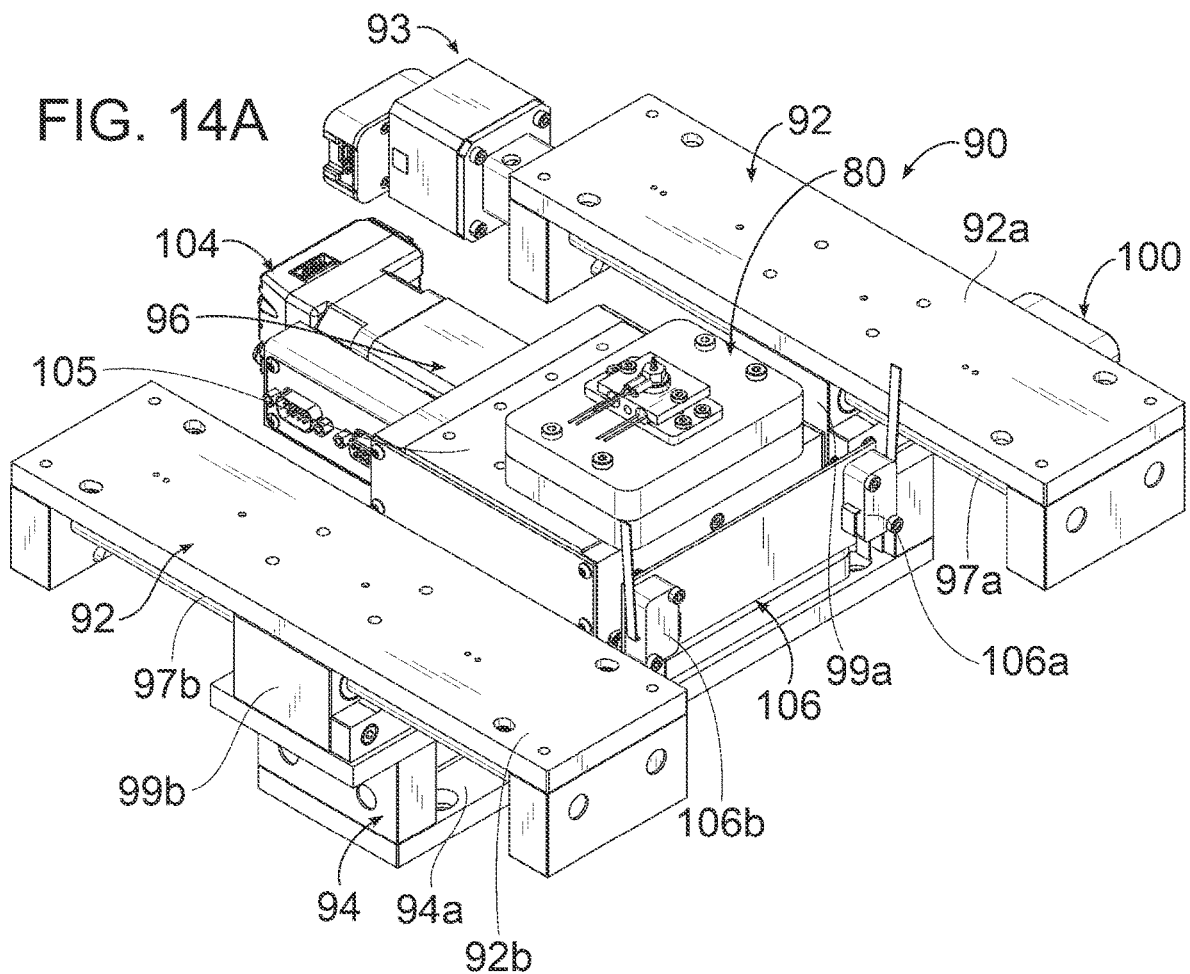
FIG. 14A is a top perspective view of a robotic positioner and mounted heating device of a robotic wire termination system in accordance with an example embodiment.
Figure 14B:
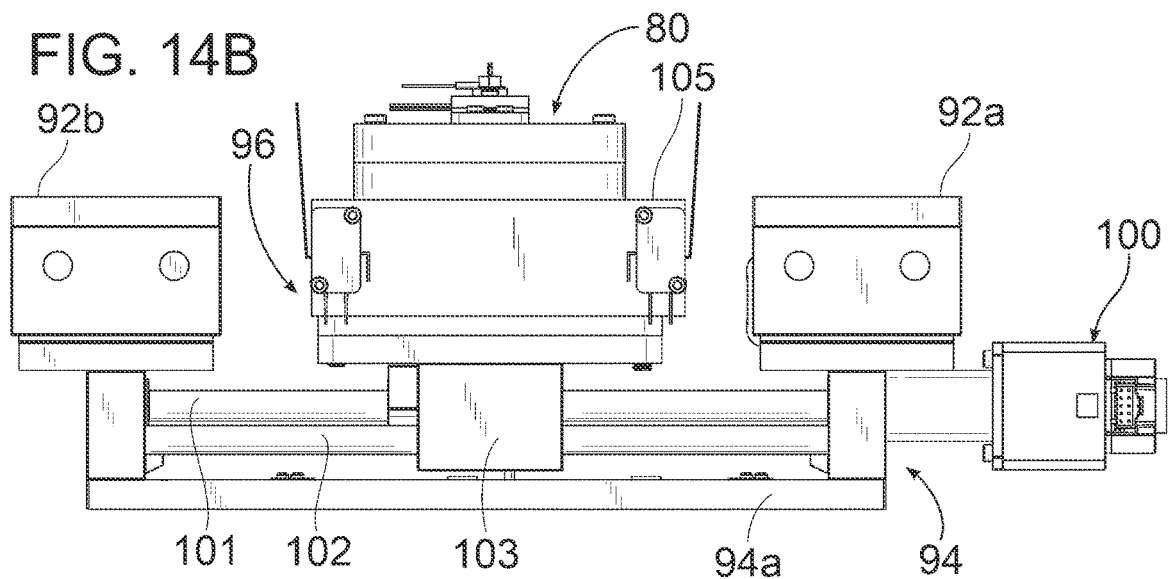
FIG. 14B is a front view of a robotic positioner and mounted heating device of a robotic wire termination system in accordance with an example embodiment.
Figure 14C:
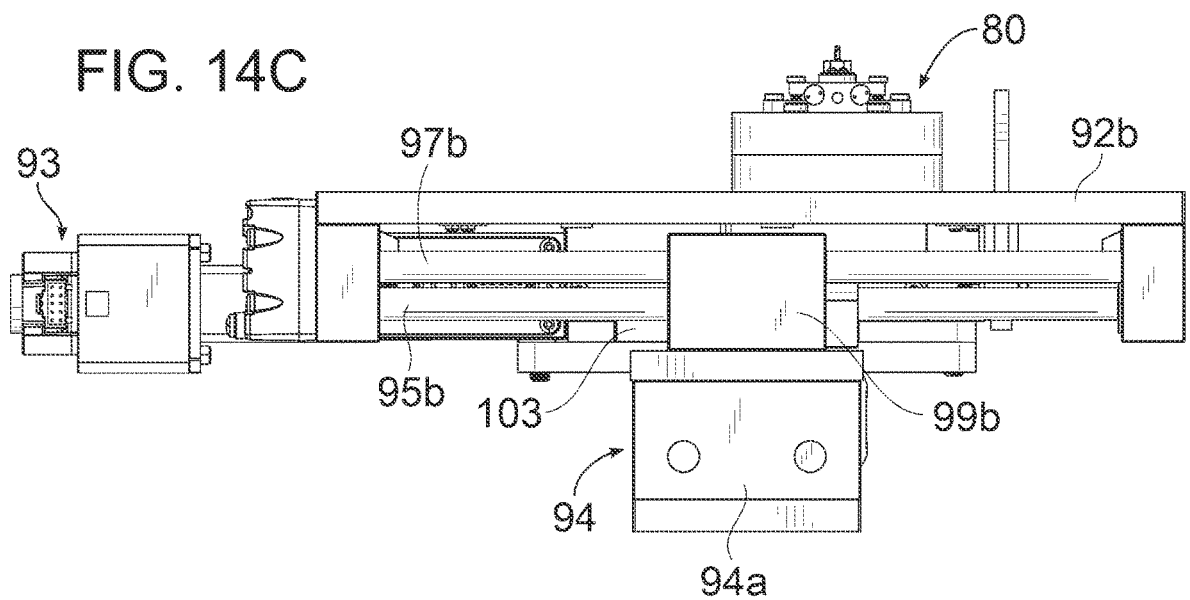
FIG. 14C is a first side view of a robotic positioner and mounted heating device of a robotic wire termination system in accordance with an example embodiment.
Figure 14D:
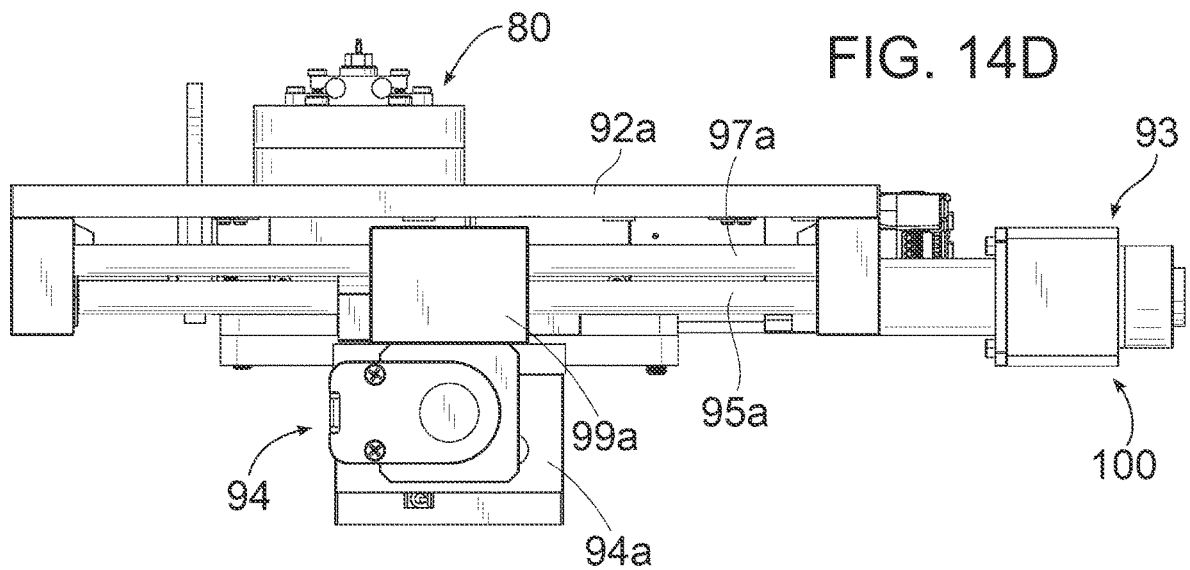
FIG. 14D is a second side view of a robotic positioner and mounted heating device of a robotic wire termination system in accordance with an example embodiment.
Figure 14E:
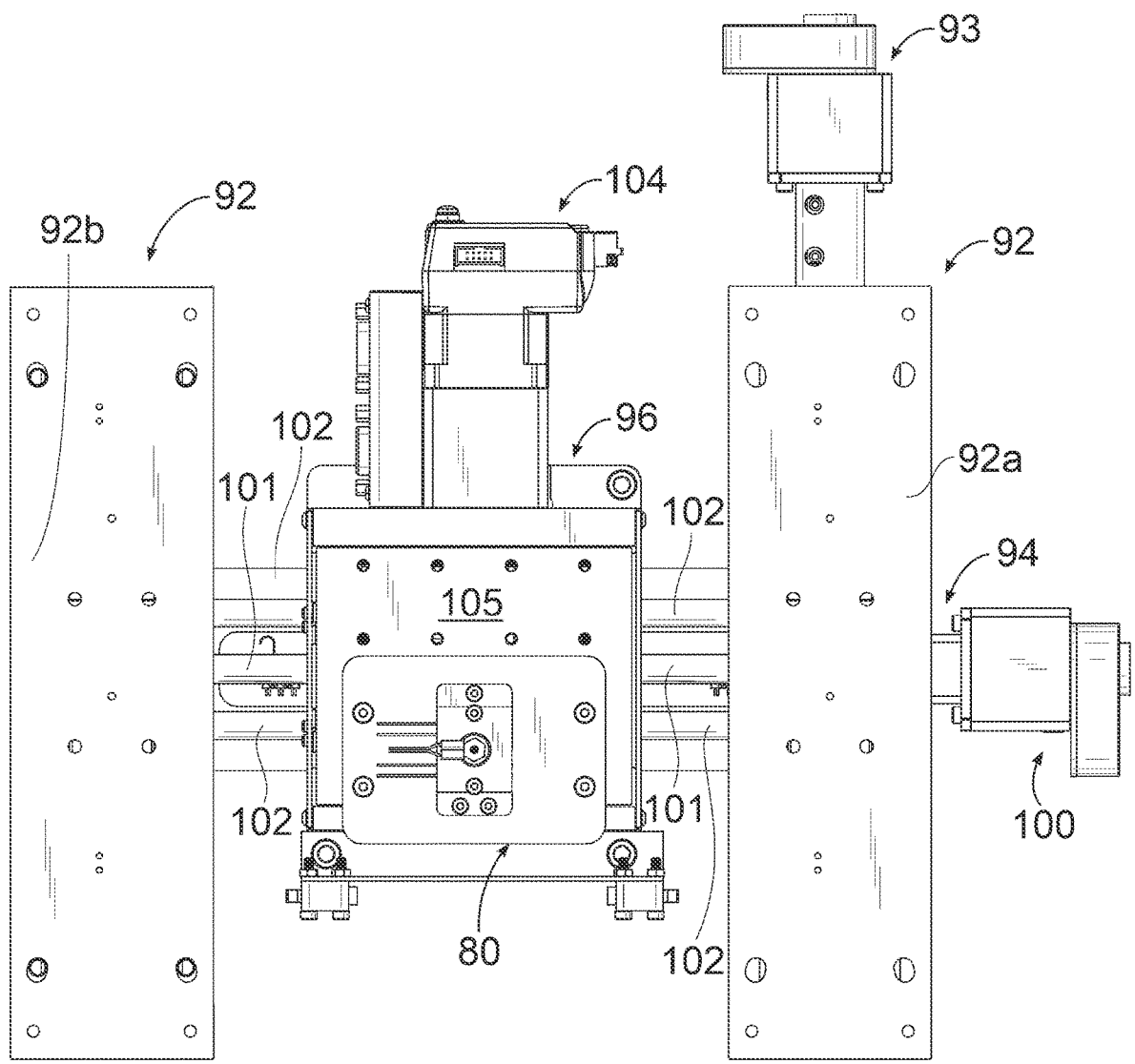
FIG. 14E is a top view of a robotic positioner and mounted heating device of a robotic wire termination system in accordance with an example embodiment.
Figure 14F:
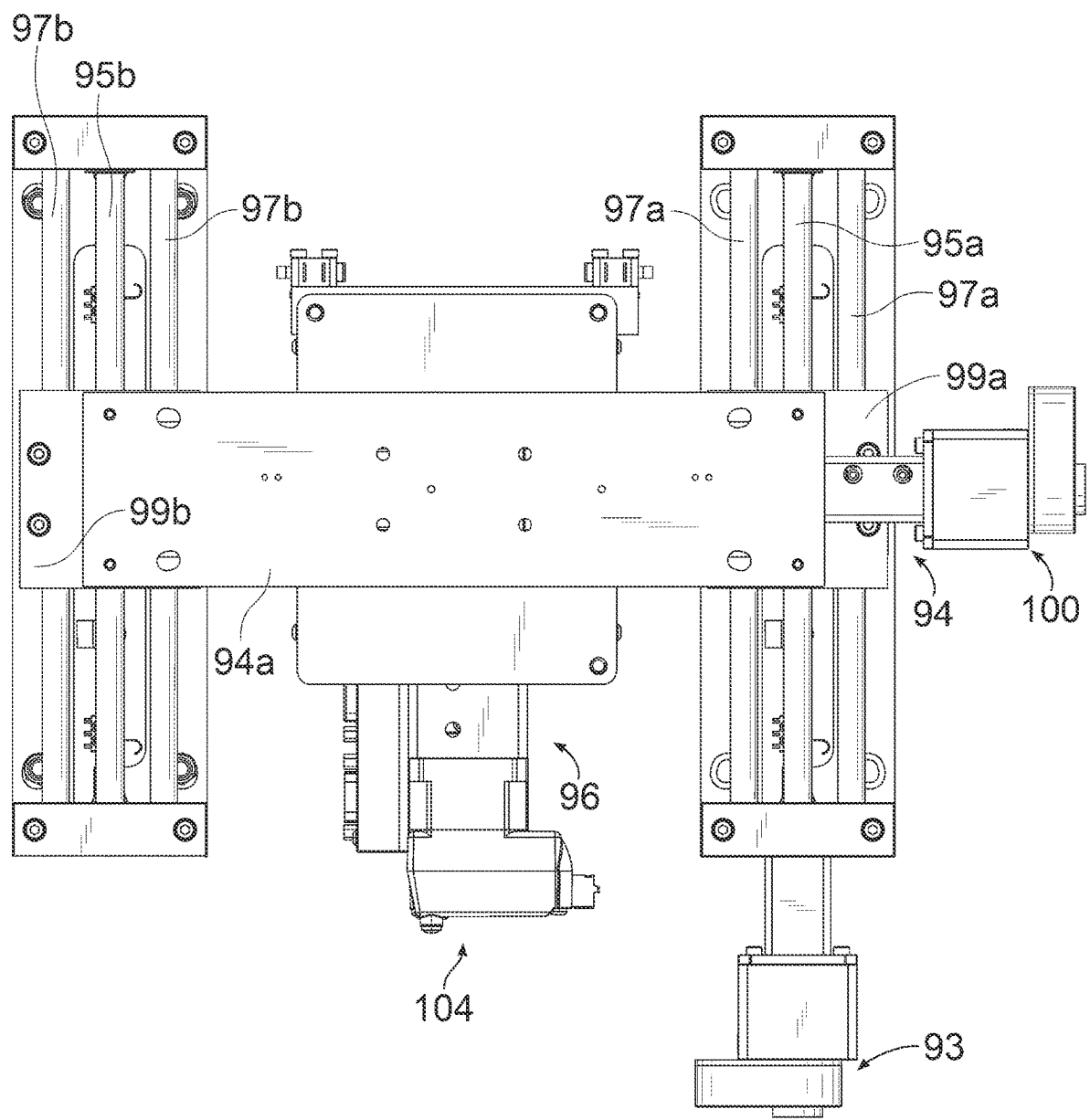
FIG. 14F is a bottom view of a robotic positioner and mounted heating device of a robotic wire termination system in accordance with an example embodiment.

The heating device 80 of the example robotic wire termination system 10 is utilized to apply heat to the individual connector pins 34 of electrical connectors 30 sufficient to melt solder preform 39 (e.g., approximately 190 degrees F. or greater) into a liquid state to solder connect the wires 20 of cable 22 or another source to the connector pins 34. Details of alternative example heating devices 80 are illustrated in FIGS. 13A-13C and the heating device 80 is further illustrated in connection with the robotic positioner 90 and other system components in FIGS. 1, 4A, 5A, 14A-14F, 16A-16H, and 17.

The heating device 80 is preferably constructed as a relatively compact mobile unit that is adapted and configured for attachment to the robotic positioner 90 for movement within the interior 42 of the housing 40. The heating device 80 comprises a base 81, a mounting block 82, one or more heating elements 83, a heat providing element which in the example embodiments comprises a thermal tip 84 (FIG. 13A, 13B) or nozzle 85 (FIG. 13C), and a temperature measuring device 86.

The heating elements 83 can be comprised of any device capable of generating heat sufficient to melt solder preform 39 to connect wires 20 to the connector pins 34 of the electrical connector 30. The heating elements 83 can generate heat via electricity or via other options. In the example robotic wire termination system 10, the one or more heating elements 83 preferably comprise electronic-type heating elements. For example, the ceramic cartridge-type electronic heating elements employed in 3D printers are suitable. For the purpose of generating heat to melt the solder preform, a single 12v 40W heating element of that type is at least minimally sufficient. However, in order to raise the temperature from ambient to and above the melting point of solder more rapidly, the use of at least two such heating elements 83 is preferred. The heating elements 83 are electrically connected to the control unit 60 by wires, are in electrical communication with the control unit 110, and are controllable by the control unit 110 as described further below.

The heating elements 83 are fixedly attached to and are in physical and thermal contact with the mounting block 82. The mounting block 82 is preferably constructed of a thermal conducting material, such as a metal. The heating elements 83 are preferably attached to the mounting block 82 in a manner so that they remain in good physical and thermal contact with the mounting block 82 even when the heating device 80 is moved within the interior 42 of the housing 40 with the robotic positioner 90. Accordingly, while the heating elements 83 may be attached to an external surface of the mounting block 82, it is more preferred that they be securely held within the mounting block 82. One way to accomplish this is to divide the mounting block 82 into a separate upper mounting block 82*a* and lower mounting block 82*b*. Complementary half-rounds can be formed in the mating surfaces of the upper mounting block 82*a* and the lower mounting block 82*b*. The half-rounds engage, surround, and securely hold cylindrical cartridge-type heating elements 83 when the mating surfaces of the upper mounting block 82*a* and the lower mounting block 82B are brought together or mated. The upper mounting block 82*a* and the lower mounting block 82*b* are suitably connected and held together by screws, bolts or other similar fasteners. By tightening the screws, bolts, or other fasteners the heating elements 83 are engaged and securely held in the half-rounds between and in good physical and thermal contact with the mating surfaces of the upper mounting block 82*a* and the lower mounting block 82*b*.

Although a solid block of material can be used for the mounting block 82, the described arrangement has the advantage of maximizing the surface contact between the heating elements 83 and the mounting block 82 and therefore maximizing thermal transfer from the heating elements to the mounting block 82. It also has the advantage that if a heating element 83 must be replaced, it can be easily replaced by simply loosening the screws, bolts, or other fasteners and separating the upper mounting block 82*a* and the lower mounting block 82*b*.

The mounting block 82 preferably includes a threaded receptacle. The threaded receptacle is adapted to receive and securely but removably hold the heat providing element, which is described further below, in threaded engagement. The threaded receptacle enables one heat providing element to be removed from the mounting block 82 and another inserted in its place quickly and easily. Since different electrical connectors 30 may require different types or sizes of heat providing elements to connect wires 20, the use of the threaded receptacle (alone or together with the use of the removable alignment plate 70) advantageously reduces down time associated with switching over between different electrical connectors 30.

The mounting block 82 is fixedly attached, connected or mounted to the top surface of the base 81, for example by suitable bolts, screws, or similar fasteners. The base 81 in turn is fixedly attached, connected, or mounted to the robotic positioner 90, also by suitable bolts, screws, or similar fasteners for example. More particularly, and as described further below, the base 81 is connected or mounted to the third positioner 96 of the robotic positioner 90, and still more particularly to the top surface 107 of the vertical stage 105 of the third positioner 96. The base 81 is preferably constructed of a material, such as a ceramic, that has substantial resistance to heat and is a good thermal insulator. The base 81 thus resists the conductance and transfer of heat from the heating elements 83 and mounting block 82 to the robotic positioner 90 and other components of the system.

The heat providing element of the heating device 80 may comprise any technology that can selectively provide heat to the connector pins 34 of the electrical connector 30 sufficient to melt solder preform 39 in any suitable manner. In the example embodiments, the heat providing element comprises technology that provides the heat to individual connector pins 34 of an electrical connector 30 either directly or indirectly.

In one alternative, illustrated in FIGS. 13A and 13B, the heat providing element comprises the thermal tip 84. The thermal tip 84 is comprised of a heat conductive material, such as a metal, having a higher melting point than the solder preform 39. The thermal tip 84 may, for example, comprise a tip similar to a soldering tip of a soldering tool of the type used to solder connect fine structures, such as small wires. The thermal tip 84 has a first end portion that is preferably threaded. The threaded portion is adapted to be inserted in the threaded receptacle of the mounting block 82 and to be securely but removably held in threaded physical engagement with the mounting block 82. The thermal tip 84 has a second end portion that extends outwardly from the top surface of the mounting block 82 substantially along the third longitudinal axis and in the direction of the connector pins 34.

The second end portion of the thermal tip 84 preferably comprises a hollow point or tip 87 with a substantially cylindrical interior portion 87*a*. The hollow point or tip 87 is dimensioned and configured so that the male connecting end 36 of an individual connector pin 34 of the electrical connector 30 can be received in the cylindrical interior portion 87*a* of the hollow point or tip 87 when the heating device 80 is brought into a heating position with respect to the individual connector pin 34 by the robotic positioner 90. When received in the cylindrical interior portion 87*a*, the male connecting end 36 is surrounded by and in physical and thermal contact with the hollow point or tip 87. The edge of the hollow point or tip that engages the male connecting end as it is received in the cylindrical interior portion may be beveled in order to help guide the male connecting end into the cylindrical interior portion 87*a*.

The hollow point or tip can 87 be provided with a holding mechanism to help securely but removably hold the male connecting end 36 in the interior portion 87a. The holding mechanism can comprise an expansion or spring mechanism 88 that biases the hollow point or tip 87 and helps it engage the male connecting end 36 when it is positioned in the interior portion 87a. The expansion or spring mechanism 88 can comprise one or more elongated slots for example. Accordingly, the diameter of the cylindrical interior portion 87a can be dimensioned slightly smaller than the male connecting end 36 so that the male connecting end 36 fits snugly within the interior portion 87a preferably with substantially the entire external surface of the male connecting end 36 in contact with the surface of the interior portion 87a of the hollow point or tip 87. In addition to helping hold the connector pin 34 securely in place as the heating device is moved into the heating position and heat is applied, this also helps maximize the heat transfer from the thermal tip 84 to the connector pin 34.

When the heating device 80 is in heating position in relation to an individual connector pin 34 of the electrical connector 30 with the male connecting end 36 of the connector pin 34 in the cylindrical interior portion 87a of the hollow point or tip 87 of the thermal tip 84, and the heating elements 83 are activated, the heat generated transfers from the heating elements 83 through the mounting block 82 to the thermal tip 84. The thermal tip 84 transfers the heat to the male connecting end 36 and hence to the individual connector pin 34 of the electrical connector 30 directly by conduction.

In another alternative, illustrated in FIG. 13C, the heat providing element comprises the nozzle 85. The nozzle 85 comprises an air inlet and an air outlet 89. The nozzle 85 is comprised of a material, such as a metal, having a higher melting point than the solder preform 39. The nozzle 85 may, for example, comprise a nozzle of the type used to provide heated air to melt materials in 3D printers. The nozzle 85 has a first end portion that is preferably threaded. The threaded portion is adapted to be inserted in the threaded receptacle of the mounting block 82 and securely but removably held in threaded physical engagement with the mounting block 82. The nozzle 85 has a second end portion that extends outwardly from the top surface of the mounting block 82 substantially along the third longitudinal axis and in the direction of the connector pins 34. The second end portion of the nozzle 85 preferably comprises the air outlet 89.

When the heating device 80 is in heating position in relation to an individual connector pin 34 of the electrical connector 30, the air outlet 89 of the nozzle 85 is in proximity to but not in physical contact with the male connecting end 36 of the connector pin 34. When the heating elements 83 are activated, the heat generated transfers from the heating elements 83 through the mounting block 82 to the nozzle 85. Air is blown through the nozzle 85 from the air inlet to the air outlet 89. As the air passes through the nozzle 85, the nozzle 85 transfers the heat to the air to heat the air to a temperature sufficient to melt the solder preform 39. The air outlet 89 of the nozzle 85 directs the heated air onto the male connecting end 36 of the individual connector pin 34 to melt the solder preform 39 indirectly and without physical contact by convection.

The temperature measuring device 86 can be thermally coupled to the heating elements 83 and the heat providing element of the heating device 80 indirectly through the mounting block 82. The temperature measuring device 86 also can be directly thermally coupled to the heating elements 83 or to the heat providing element. In embodiments employing convection heating, the temperature measuring device 86 can be exposed in a flow of heated air to directly measure the temperature of the air. The temperature measuring device 86 measures the temperature of the heat produced by the heating device 80 and provided to the connector pins 34 by the heat providing element. The temperature measuring device 86 is in communication with the control unit 110 and communicates temperature data measurements to the control unit 110. The control unit 110 is configured to determine from the measured temperature data the amount of heat being provided to the connector pins 34 in response to control the operation of the heating device 80, for example by activating or deactivating the heating device 80 or increasing or decreasing the level of a drive signal. The temperature measuring device 86 can be comprised of any device capable of measuring high temperatures such as temperatures in excess of the melting point of solder. The temperature measuring device 86 can comprise but is not limited to a thermocouple.

H. Control Unit

The control unit 110 can be comprised of any type of circuit board or computer suitable for practicing the various aspects of the example robotic wire termination system 10. Preferably, the control unit 110 comprises a computer or controller with a small footprint, such as a Rasberry Pi, that can be easily enclosed and contained within housing 40, and that requires little space and little power to operate, yet has sufficient functionality to communicate with and control the operation of the various components of the system as described herein. This helps to make the example robotic wire termination system 10 relatively light, compact, portable, and suitable for desktop or benchtop use.

However, the control unit 110 can be comprised of any conventional computer, controller, or similar electronic device that has sufficient functionality to communicate with and control the operation of the various components of the system as described herein. The control unit 110 can comprise without limitation a personal computer (e.g. APPLE® based computer, an IBM based computer, or compatible thereof) or a tablet computer (e.g. IPAD®). The control unit 110 can also be comprised of various other electronic devices capable of sending and receiving electronic data including but not limited to smartphones, mobile phones, telephones, personal digital assistants (PDAs), mobile electronic devices, handheld wireless devices, two-way radios, smart phones, communicators, video viewing units, television units, television receivers, cable television receivers, pagers, communication devices, and digital satellite receiver units.

The control unit 110 may comprise a conventional computer that can and preferably does include a display screen (or monitor), a disk drive or other storage device, a network interface, one or more conventional I/O interfaces, and optionally a keyboard and a printer. A conventional computer also will include a microprocessor, a memory bus, random access memory (RAM), read only memory (ROM), a peripheral bus, and one or more I/O controllers for a keyboard, mouse, and/or other I/O devices. The microprocessor will typically be a general-purpose digital processor that controls the operation of the computer. The microprocessor can be a single-chip processor or implemented with multiple components. Using instructions retrieved from memory, the microprocessor controls the reception and manipulations of input data and the output and display of data on output devices. The memory bus is utilized by the microprocessor to access the RAM and the ROM. RAM is used by microprocessor as a general storage area and as scratch-pad memory, and can also be used to store input data and processed data. ROM can be used to store instructions or program code followed by microprocessor as well as other data. A peripheral bus is used to access the input, output and storage devices used by the computer. In the described embodiments, these devices can include a display screen, a hard disk drive or other storage device, a network interface, and optionally a printer device. The conventional computer will typically include a keyboard controller that is used to receive input from the keyboard and send decoded symbols for each pressed key to the microprocessor over the bus. The keyboard can be used by a user to input commands and other instructions to the computer system. Other types of user input devices can also be used in conjunction with the example robotic wire termination system 10. For example, pointing devices such as a computer mouse, a track ball, a stylus, or a tablet can be used to manipulate a pointer on a display screen of the computer system, and make selections as inputs to the control unit 110. Hand operated switches, foot operated switches, or other switches can be used to provide signals to the control unit 110 indicating selections by an operator or the occurrence of events. The display screen is typically an output device that displays images of data provided by the microprocessor via the peripheral bus or provided by other components in the computer. However, the display screen can also be touch sensitive and able to generate signals to the control unit 110 indicating selections by an operator and/or the occurrence of events. If used, the printer device when operating as a printer provides an image on a sheet of paper or a similar surface. The hard disk drive or other storage device, such as a solid state disk device, can be utilized to store various types of data. The microprocessor, together with an operating system, operates to execute computer code and produce and use data. The computer code and data may reside on RAM, ROM, hard disk drive or other storage medium such as solid state disk drive. The computer code and data can also reside on a removable program medium and loaded or installed onto computer system when needed. Removable program mediums include, for example, CD-ROM, PC-CARD, USB drives, floppy disk and magnetic tape. The network interface circuit is utilized to send and receive data over a network connected to other computer systems. An interface card or similar device and appropriate software implemented by microprocessor can be utilized to connect the computer system to an existing network and transfer data according to standard protocols.

The control unit 110 is adapted and configured to control the operation of the example robotic wire termination system 10 as described herein. The control unit 110 is in communication with and is configured to control the heating device 80, the temperature measuring device 86, the robotic positioner 90, the display 120, which is described further below, and various I/O devices 108, which also are described further below, through the plurality of input/output (I/O) ports 50-54.

More particularly regarding the robotic positioner 90, the control unit 110 is in communication with and is configured to control each of the first positioner 92, the second positioner 94, and the third positioner 96 separately and independently. Even more particularly, the control unit 110 is in communication with and is configured to control each of the first drive motor and encoder 93 of the first positioner 92, the second drive motor and encoder 100 of the second positioner 94, and the third drive motor and encoder 104 of the third positioner 96 separately and independently. The control unit 110 also is in communication with and is configured to receive inputs from the range of motion limit indicator 106 of the second positioner and even more particularly from the first limit switch 106a and the second limit switch 106b of the range of motion limit indicator 106.

The control unit 110 can be configured to control the heating device 80 by selectively activating and deactivating the heating elements 83. When the control unit 110 activates the heat elements 83, heat is provided to the heat providing element (thermal tip 84 or nozzle 85) which can provide heat to a selected connector pin 34 to melt solder preform 39 for connecting a wire 20. When the heat elements 83 are deactivated, heat for melting the solder preform 39 is no longer provided by the heat providing element. The control unit 110 also can be configured to selectively control the heating device 80 to produce a desired amount of heat by selectively controlling the level and/or frequency of one or more drive signals to the heat elements 83.

The control unit 110 is configured to receive temperature measurements from the temperature measuring device 86 either continuously or periodically. The control unit 110 can receive the temperature measurements either with or without transmitting requests to the temperature measuring device 86.

The control unit 110 is configured to control the robotic positioner 90 to selectively move and position the heating device 80 in one or more heating positions associated with and relative to one or more corresponding selected individual connector pins 34 of an electrical connector 30 to which wires 20 are to be connected. The control unit 110 controls the robotic positioner 90 by sending control signals separately and independently to the first drive motor and encoder 93 of the first positioner 92, the second drive motor and encoder 100 of the second positioner 94, and the third drive motor and encoder 104 of the third positioner 96 to move the heating device 80 to sets of coordinates in 3D space corresponding to the heating positions relative to the selected connector pins 34.

The control signals can take various forms, but can comprise for example step counts for stepper motors comprising the drive motors 93, 100, 104. For example, as described above, an electrical connector 30 to which wires 20 are to be connected is received and held in a corresponding alignment plate 70 in the alignment plate retainer 60 of the housing 40 in a specific position and orientation with the connector pins 34 of the electrical connector 30 exposed to the interior 42 of the housing 40. The coordinates (e.g., X, Y, and Z coordinates of a Cartesian coordinate system) corresponding to the heating position associated with and relative to each such connector pin 34 in 3D space can thus be determined. Similarly, the coordinates of a starting position of the heating device 80 in 3D space can be assigned or determined. From the starting position and heating position coordinates, the distance the heating device 80 must move along each of the first, second, and third longitudinal axes to reach the heating position associated with each selected connector pin 34 can be determined. Those distances can be related to corresponding step counts for the stepper motors comprising the drive motors 93, 100, 104 of the corresponding first, second, and third positioners 92, 94, 96. The control unit 110 can thus send the step counts as control signals to the robotic positioner 90 to move and position the heating device 80 in the heating position relative to each and any selected connector pin 34 of the electrical connector 30.

A set of coordinates corresponding to each heating position of each connector pin 34 of each electrical connector 30 with which the example robotic wire termination system 10 is intended to be used can be stored and later retrieved by the control unit 110 for use, for example in response to receiving as input a selection of an electrical connector 30 from an operator. The coordinates can be stored in any suitable storage, including RAM, EPROM, hard drive, solid state device, etc. Each stored coordinate set can be indexed by or associated with an identifier of the electrical connector 30 to which it applies. The coordinates can be stored as positions in 3D space, distances from an origin, such as a predetermined starting point, step counts, and/or in other forms.

The control unit 110 also is configured to receive various inputs, including inputs identifying selections of one or more connector pins 34 of an electrical connector 30 to which wires 20 are to be connected. The inputs identifying selections of one or more connector pins 34 may include inputs identifying the selection of a single arbitrarily selected connector pin 34 of an electrical connector 30 to which a wire 20 is to be connected, for example in connection with a rework operation. The inputs identifying selections of one or more connector pins 34 also can include inputs identifying the selection of a connector pin 34 of a predetermined set, sequence, or series of connector pins 34 that constitute all or some of the connector pins 34 of an electrical connector 30 to which wires 20 are to be connected.

The control unit 110 is configured to receive the inputs identifying selections of one or more connector pins 34 from the display 120, from one or more input devices of the I/O devices 108, or automatically under control of a predetermined program. Inputs received from the display 120 can result from an operator manually interacting with the display 120 as described further below. Inputs received from the I/O devices 108 can result from an operator manually actuating a hand switch and/or a foot switch, also as described further below.

In comparison, inputs received automatically under control of a predetermined program are received by the control unit 110 internally and automatically and may result without any manual intervention or action by an operator. Such inputs, for example, can result from the control unit 110 determining under programmatic control that the heating device 80 has reached a predetermined temperature, and/or that a predetermined time period has elapsed, and/or that some other event or condition exists or has occurred.

The control unit 110 also is configured to control the display 102 to visually display various information. As described further below, the control unit 110 can control the display 120 to visually display information such as an icon or graphic for an operator to select an electrical connector 30, to visually display a graphic indication of the connector pins 34 of a selected electrical connector 30, to provide a visual indication of the selection of a connector pin 34, to provide a visual indication of the heating device 80 being in a heating position with respect to a selected connector pin 34, to visually display icons or graphics for an operator to select to move the heating device 80 to a next or a previous connector pin 34 in a predetermined series of connector pins 34, to visually display the measured and target temperatures of the heating device 80, and to visually display icons or graphics for an operator to selectively increase or decrease the target temperature of the heating device 80. The control unit 110 also can control the display 120 to visually display other information for controlling the operation of the system, such as an icon or graphic for an operator to select a manual mode of operation of the system, a visual indication of the selected mode of operation of the system (e.g., automatic or manual), an icon or graphic for an operator to stop the system from carrying out a sequence or series of wire connection operations, an icon or graphic for an operator to select to manually engage or disengage the heating device 80 with a selected connector pin 34 and a visual indication of the engagement and disengagement status of the heating device 80, an icon or graphic for an operator to select to activate and deactivate the heating device 80, and any other information to enable an operator to control operation of the system.

The control unit 110 is further configured to control the various components of the example robotic wire termination system 10 to take various actions and to perform various operations in response to receiving various inputs. Generally, in response to receiving inputs identifying the selection of one or more connector pins 34 to which wires are to be connected, the control unit 110 is configured to control the robotic positioner 90 to selectively position the heating device 80 to one or more heating positions associated with and relative to the selected connector pins 34 and to provide heat to melt solder preform 39 to enable wires 20 to be connected to the selected connector pins 34.

More specifically, in response to inputs indicating selection of an electrical connector 30 and an automatic mode of operation, the control unit 110 is configured to control the robotic positioner 90 to sequentially position the heating device 80 in a plurality of heating positions with each heating position being associated with a selected connector pin 34 of a predetermined set of connector pins 34 according to a predetermined sequence or series in order to connect a plurality of wires 20. The control unit 110 is further configured in response to receiving an input indicating a selection to proceed to the next connector pin 34 to control the robotic positioner 90 to move the heating device 80 from the heating position associated with the currently selected connector pin 34 of the predetermined sequence or series to a heating position associated with the next connector pin 34 in the predetermined sequence or series.

The input indicating a selection to proceed to the next connector pin 34 in a predetermined series can be generated manually by an operator, for example by actuating a hand or foot switch of the I/O devices 108, or by selecting a displayed icon or graphic on the display 120, or can be generated automatically under programmatic control. In the latter case, the control unit 110 can monitor the temperature of the heating device 80 by periodically or continuously receiving temperature measurements from the temperature measuring device 86. When the control unit 110 determines that the heating device 80 is in a heating position relative to a selected connector pin 34 and that the temperature of the heating device 80 has reached a predetermined target value for melting solder preform 39, it can automatically take an action in response, such as controlling the robotic positioner 90 to move the heating device 80 from the heating position associated with the currently selected connector pin 34 in the predetermined series to a heating position associated with the next selected connector pin 34 in the predetermined series. It can also control the heating device 80 to deactivate the heating elements 83 as the heating device 80 is moved from one heating position to another. Also under programmatic control, the control unit 110 can factor into the determination whether to take an action a predetermined elapsed time, for example the elapsed time the heating device 80 has been in a heating position and at a predetermined target temperature.

Also more specifically, in response to inputs indicating selection of an electrical connector 30, a manual mode of operation, and a connector pin 34, the control unit 110 is configured to control the robotic positioner 90 to position the heating device 80 to the heating position associated with the selected connector pin 34. If after that the control unit 110 receives an input indicating selection of another connector pin 34, it controls the robotic positioner 90 to move the heating device 80 from the heating position associated with the currently selected connector pin 34 to a heating position associated with the newly selected connector pin 34. It can also control the heating device 80 to deactivate the heating elements 83 as the heating device 80 is moved. In the manual mode of operation, the connector pins 34 can be selected arbitrarily and in any order.

In all of the situations described above it is understood that, as described previously, whenever the control unit 110 controls the robotic positioner 90 to move the heating device 80, it independently and separately controls the first positioner, the second positioner, and the third positioner 92, 94, 96 of the robotic positioner 90 as described herein to move the heating device 80 along three substantially orthogonal longitudinal axes. It is also understood that the control unit 110 is further configured to control the heating device 80 at each heating position to provide heat to the selected connector pin 34 to melt solder preform 39 for connecting a wire 20 to the connector pin 34 either in response to input manually initiated by an operator or input automatically received under control of a predetermined program.

I. Display and Input Devices

The display 120 is in communication with the control unit 110 and is adapted and configured to display various information, including the information described above, under the control of the control unit 110. The display 120 can comprise a touch sensitive type display which is further adapted and configured to sense or detect an operator physically touching or otherwise selecting a displayed icon, graphic, or other visual indication and in response to generate a corresponding input signal that is received by the control unit 110 and indicates the selection.

The display 120 also can comprise a conventional non-touch responsive monitor or display that is adapted and configured to display a visual pointer that is generated by an input device of the I/O devices 108, such as a mouse, track ball, or pointer, that is in communication with the control unit 110. The input device is adapted to be manipulated by an operator to selectively position the visual pointer on the display 120. The input device also comprises a switch that when actuated generates an input signal that is received by the control unit 110. When the input device is manipulated to position the visual pointer at a location on the display 120 associated with a displayed icon or graphic, actuation of the switch generates an input signal that is received by the control unit 110 and that indicates the selection of the icon or graphic.

There are many other ways an operator can select icons or graphics on the display 120 and those selections can be indicated to the control unit 110. In the description herein whenever there is reference to such a selection being made, it is assumed that a resulting input signal indicating the selection is received by the control unit 110. Further, all suitable ways of making the selection and indicating it to control unit 110 are contemplated, including but not limited to those specifically described above.

Figure 18:
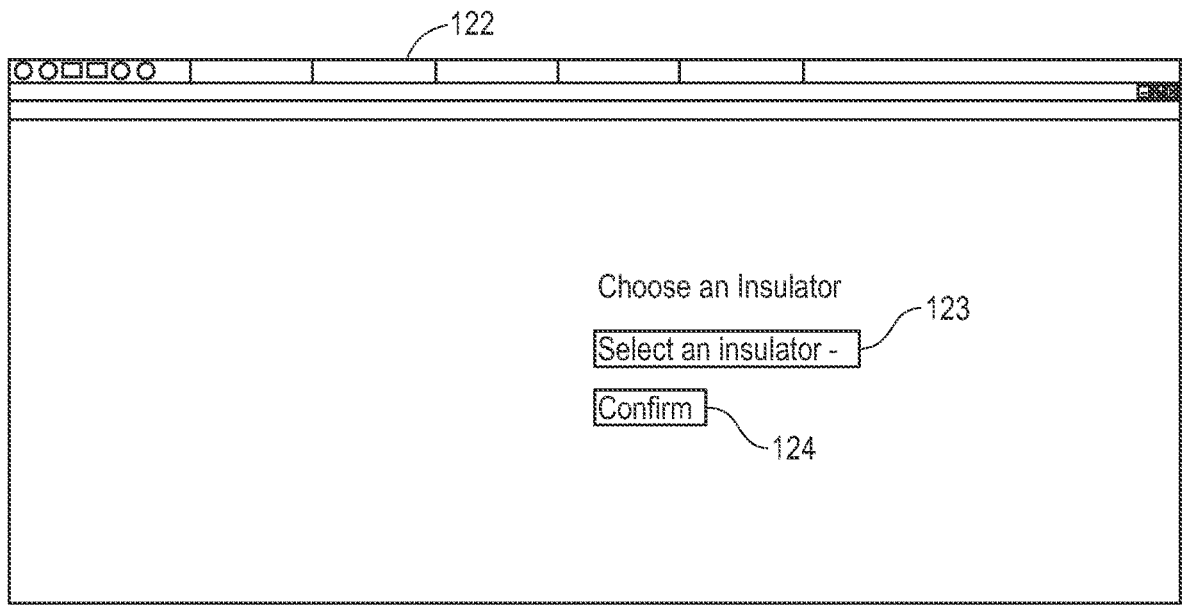
FIG. 18 is an example of a first control screen of a display of a robotic wire termination system in accordance with an example embodiment for selecting an electrical connector.

When the example robotic wire termination system 10 is powered up, the display 120 can be controlled by the control unit 110 to display a control screen 122 such as shown in FIG. 18. The control screen 122 can include an icon or graphic, such as a control box 123, for an operator to select an electrical connector 30 (which also may be called an "insulator") to which wires 20 are to be connected. The control screen 122 can also display an icon or graphic, such as a control box 124, for an operator to confirm a selection of an electrical connector 30. The example robotic wire termination system 10 can be used with a plurality of different electrical connectors 30 each of which can be identified by a suitable unique identifier. The identifiers can be stored in the system. The control unit 110 can be configured to respond to the operator selecting the control box 123 to retrieve the list of identifiers stored in the system and to cause the display 120 to display the list. The control unit 110 can be configured to respond to the operator electing a particular identifier from the displayed list by retrieving from system storage the information for the electrical connector 30 corresponding to the selected identifier. Such information will include the information necessary for the control unit 110 to control the robotic positioner 90 to position the heating device 80 to a heating position relative to each individual connector pin 34 of the selected electrical connector 30. The information can include for example the number, spacing, dimensions, arrangement, and coordinates of the connector pins 34 on the electrical connector 30, as well as the coordinates of the heating position relative to each connector pin 34.

Figure 19A:
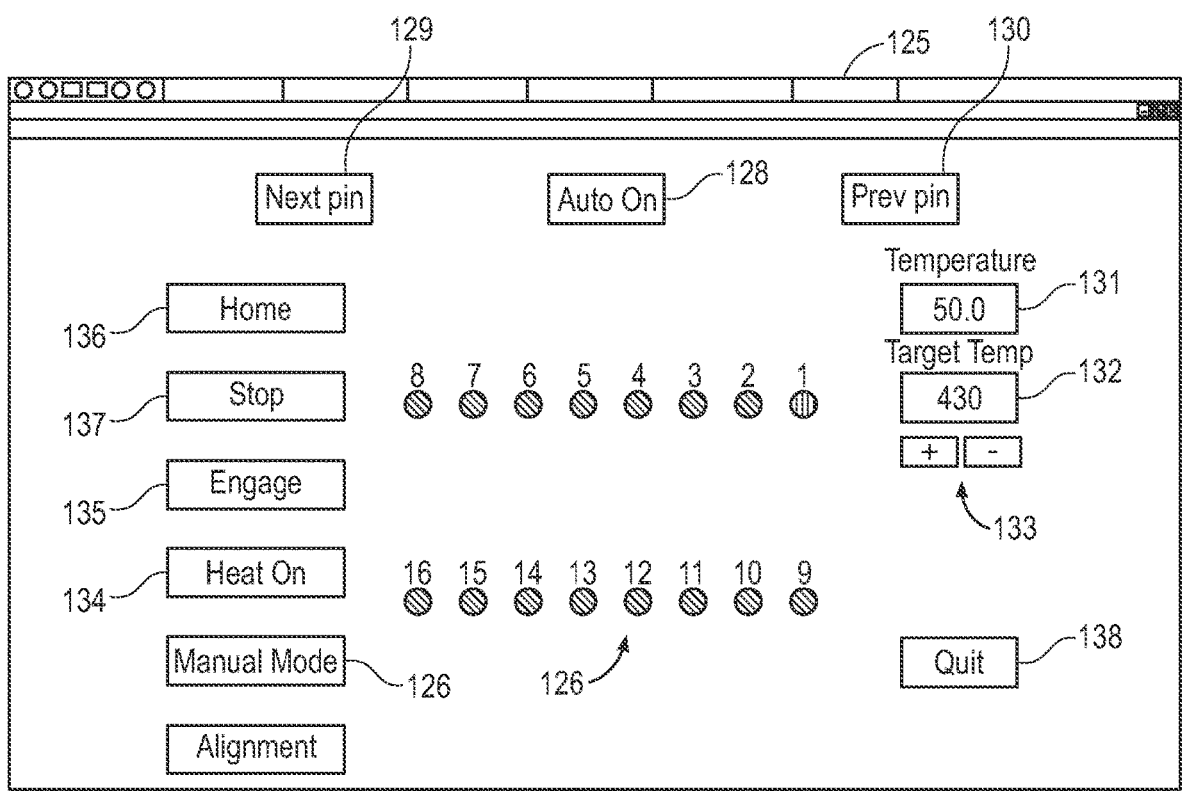
FIG. 19A is an example of a second control screen of a display of a robotic wire termination system in accordance with an example embodiment for selecting a connector pin of a selected electrical connector and for providing a visual indication of the selected connector pin.
Figure 19B:
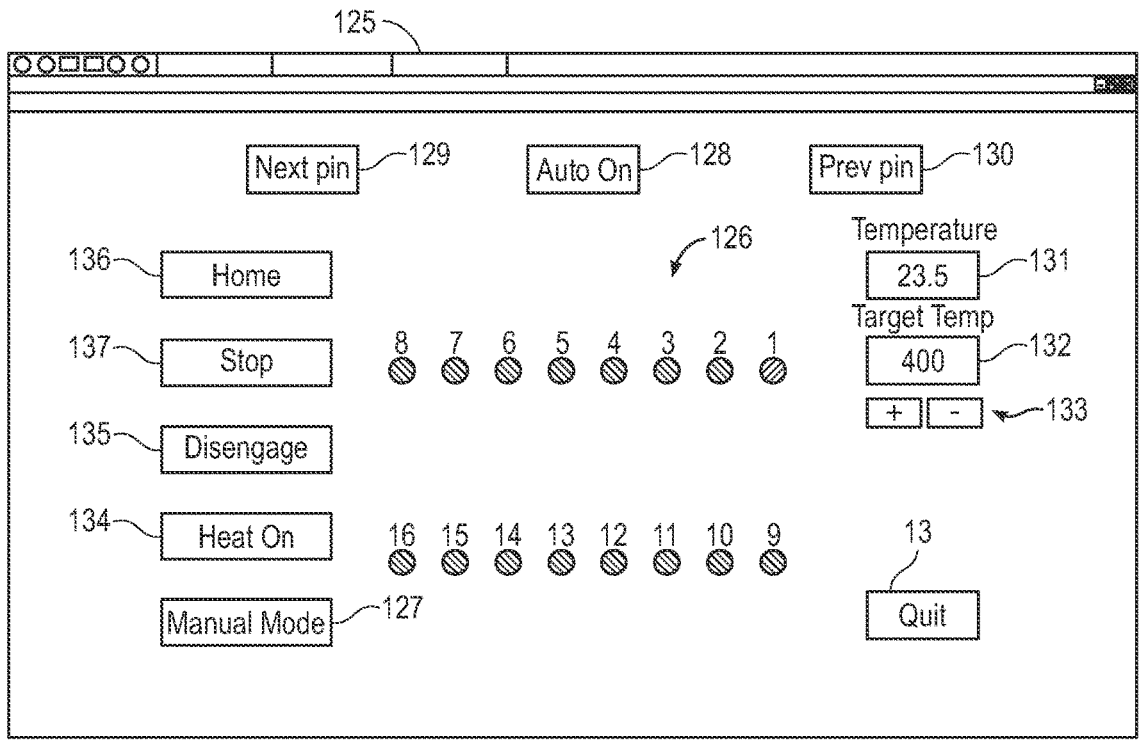
FIG. 19B is an example of a second control screen of a display of a robotic wire termination system in accordance with an example embodiment for selecting a connector pin of a selected electrical connector and for providing a visual indication of a heating device in a heating positioner relative to the selected connector pin.

The display 120 also can be controlled by the control unit 110 to display a control screen 125 such as shown in FIGS. 19A and 19B. The control unit 110 can control the display 120 to display the control screen 125 in response to an operator selecting a particular electrical connector 30 on the control screen 122. The control screen 125 can include a number of icons, graphics, including control boxes, and visual indications that the operator can select to control the operation of the example robotic wire termination system 10 as described herein.

The control screen 125 can include a graphical representation 126 of the connector pins 34 of the selected electrical connector 30. Each of the connector pins displayed in the graphical representation 126 corresponds to a connector pin 34 of the selected electrical connector 30. The connector pins displayed in the graphical representation 126 can be arranged in substantially the same way the actual connector pins 34 are arranged on the electrical connector 30. For example purposes, FIGS. 19A and 19B illustrate the graphical representation of the connector pins 34 of a simple two row electrical connector 30. It is understood however, that in actual practice the electrical connectors 30 with which the example robotic wire termination system 10 is intended for use can and often will include a substantially greater number of connector pins 34 arranged in substantially more complex arrangements, which need not be regular or symmetrical.

The control screen 125 also can include one or more icons or graphics, such as control boxes 127, 128 for an operator to select a manual 127 or automatic 128 mode of operation of the system and to provide a visual indication of the selected mode of operation of the system (e.g., automatic or manual) 128. The control unit 110 can be configured to automatically start the system in automatic mode or can be configured to await a mode selection by the operator.

In automatic mode, the control unit 110 can be configured to control the robotic positioner 90 to automatically move and position the heating device 80 beneath a predetermined first connector pin 34 of the electrical connector 30. As described herein, the predetermined first connector pin 34 can be the first in a predetermined series of connector pins 34 to which wires 20 are to be connected. In the example illustrated in FIG. 19A, the predetermined first connector pin 34 corresponds to a pin labeled "1" in the graphic representation 126 of the display 120.

In manual mode, the control unit 110 can be configured to await an input signal corresponding to a selection of a connector pin 34 to which the heating device 80 is to be moved. The input signal identifying the selected connector pin 34 can comprise a signal that results from an operator selecting (e.g., by touching or by using an input device as described above) a position in the graphical representation 126 associated with the selected connector pin 34, i.e., the position of the pin displayed in the graphical representation 126 that corresponds to the selected connector pin 34 of the electrical connector 30.

Any individual connector pin 34 of the electrical connector 30 can be selected arbitrarily, and any number of individual connector pins 34 can be selected individually in any arbitrary order. For example, a connector pin 34 may be selected and a wire connecting operation may be completed with respect to the selected connector pin 34. Another connector pin 34 may then be selected. This selection results in a signal from the display 120 that is received by the control unit 110 as an input and that indicates completion of the wire connecting operation with respect to the previously selected connector pin 34. The control unit 110 can be configured to respond to the input by automatically controlling the robotic positioner 90 to move the heating device 80 to a position beneath the now-selected connector pin 34. The control unit 110 can be configured to control the robotic positioner 90 to move the heating device from that position into a heating position relative to the now-selected connector pin 34 to carry out a wire connecting operation with respect to that connector pin 34.

Figure 20:
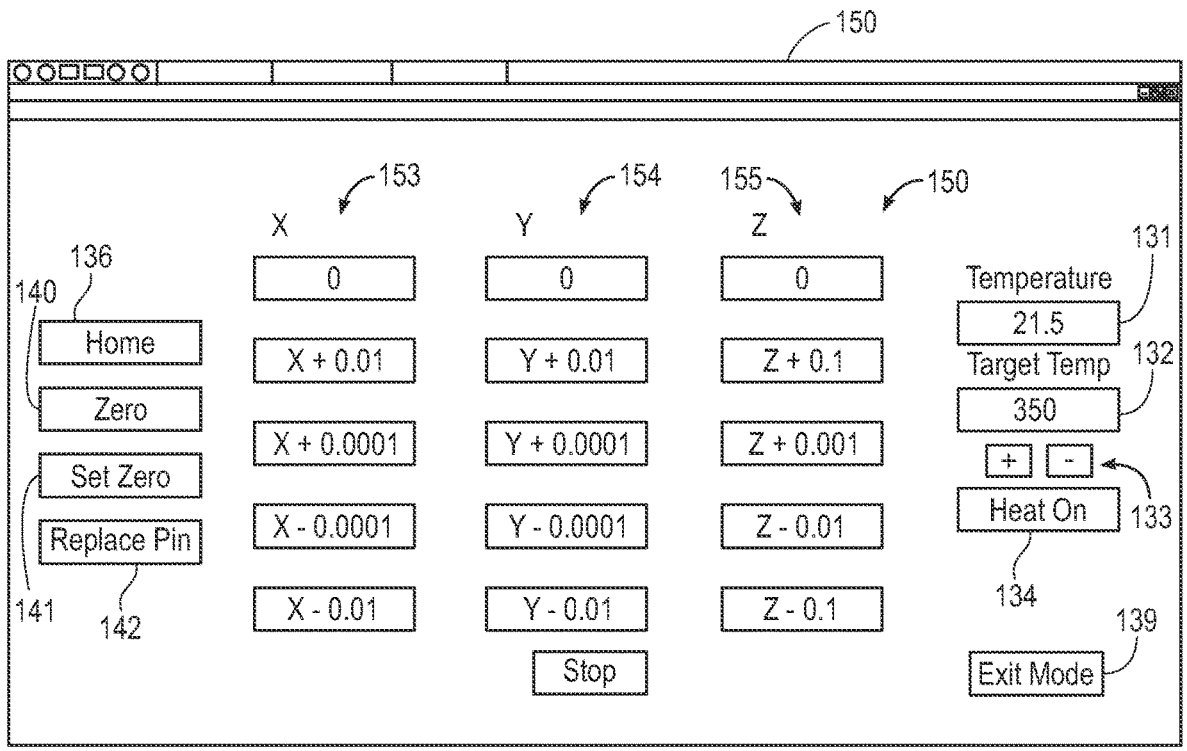
FIG. 20 is an example of a third control screen of a display of a robotic wire termination system in accordance with an example embodiment for manually controlling movement of a robotic positioner and heating device with respect to the connector pins of an electrical connector.

In manual mode, the control unit 110 also can be configured to await input signals corresponding to selections of distances the heating device 80 is to be moved along each of the orthogonal first, second, and third longitudinal axes (e.g., X, Y, and Z axes of a Cartesian coordinate system). In response to an operator selecting manual mode, the display 120 can be controlled by the control unit 110 to display a control screen 150 such as shown in FIG. 20. The control screen 150 can include icons or graphics, such as control boxes 152, that an operator can select to control movement of the robotic positioner 90 and in turn the heating device 80 along the first, second, and third longitudinal axes. For example, control boxes 152 can include a first plurality of individual control boxes 153 corresponding to the first longitudinal axis, a second plurality of individual control boxes 154 corresponding to the second longitudinal axis, and a third plurality of individual control boxes 155 corresponding to the third longitudinal axis. Each individual control box can be selected to move the heating device 80 by a predetermined distance from the current position of the heating device 80 along one of the three longitudinal axes, e.g., "X+0.01," "Y−0.01," Z+0.001." In this way, an operator can manually and incrementally move the heating device 80 into any heating position relative to and associated with any connector pin 34 of the electrical connector 30.

The control screen 125 can also include various other icons or graphics, including control boxes, and visual indications that can be selected by an operator to control other actions and operations of the example robotic wire termination system 10. The control screen 125 can include control boxes 129, 130 that can be selected when the system is in automatic mode. The control unit 110 can be configured to respond to selection of the control boxes 129, 130 to control the robotic positioner 90 to move the heating device 80 to the next or previous connector pin 34 in a predetermined series of connector pins 34. Thus, for example, selection of the control box 129 after a wire connection operation has been completed with respect to a currently selected connector pin 34 can indicate completion of the wire connecting operation to the control unit 110. The control unit 110 can be configured so that in response it automatically controls the robotic positioner 90 to reposition the heating device 80 from a position beneath the previously selected connector pin 34 to a programmatically predetermined position beneath the next connector pin 34 in the predetermined series of connector pins 34 to which wires 20 are to be connected. From there, the control unit 110 can control the robotic positioner 90 to position the heating device 80 in the heating position relative to the next connector pin 34 to provide heat for melting solder preform 39 and connecting a wire 20.

Also in automatic mode, the control boxes 129, 130 can be selected to skip or return to connector pins 34 in a predetermined series of connector pins 34. For example, it may be desired for one or more connector pins 34 of an electrical connector 30 to not have wires 20 connected. An operator can simply select control box 129 without carrying out a wire connecting operation. The control unit 110 can be configured to respond to the selection to move the heating device 80 to the next connector pin 34 in the predetermined series. Also for example, it may be discovered that a wire connecting operation with respect to a connector pin 34 had a problem and that rework is required. An operator can select control box 130 without carrying out a wire connecting operation. The control unit 110 can be configured to respond to the selection to move the heating device 80 to the previous connector pin 34 in the predetermined series. The operator can select control boxes 129, 130 repeatedly without carrying out wire connecting operations to skip forward or backwards in the predetermined sequence or series of connector pins 34 as desired.

Alternatively or in addition to the above, input devices of the I/O devices 108, such as a foot switch or hand switch, also can be used by an operator to indicate the completion of a wire connection operation in order to move the heating device 80 to the next connector pin 34 in the series, or to move the heating device 80 to the next connector pin 34 in the series without carrying out a wire connection operation. The input device can be manually actuated by the operator either after a wire connection operation has been completed or when the operator desires to move the heating device 80 to the next connector pin 34 in a predetermined series without carrying out a wire connection operation. Actuation of the input device generates an input signal that is received by the control unit 110 via one or more of the I/O ports 50-54. The control unit 110 can be configured to respond to the input signal in the same way it responds to the operator selecting the control boxes 129, 130 on the display 120.

Regardless of the mode of operation, the display 120 is adapted to provide a visual indication of the currently selected connector pin 34 regardless of whether that selection is made automatically under programmatic control or manually by an operator. As an example, the currently selected connector pin 34 of the electrical connector 30 corresponds to the connector pin labeled "1" in the graphic representation 126 on the control screen 125. Under control of the control unit 110, the display 120 provides a visual indication of the selected connector pin 34 by displaying pin "1" with a display attribute that is different from the display attributes of the other connector pins displayed in the graphic representation 126. Pin "1" is illustrated as having different display attribute(s) from pins "2"-"16" of the graphic representation 126 by vertical hashes as compared to the diagonal hashes shown for pins "2"-"16." For example, the selected connector pin "1" may be displayed as having a color, e.g., yellow, that is different than the color, e.g., green, of the rest of the pins "2"-"16". Alternatively or in combination, the connector pin of the graphic representation 126 that corresponds to the currently selected connector pin 34 of the electrical connector 30 can be displayed as blinking, as being brighter, or as having any other display attribute that distinguishes it from the other pins of the graphic representation 126 that correspond to non-selected connector pins 34 of the electrical connector 30. When another connector pin 34 of the electrical connector 30 is subsequently selected either manually or automatically under programmatic control, the control unit 110 controls the display 120 to display the corresponding connector pin in the graphic representation 126 with the display attribute associated with a selected connector pin, and the connector pin in the graphic representation 126 corresponding to the previously selected connector pin 34 of the electrical connector 30 with the same display attribute as the other pins in the graphic representation 126 corresponding to the other non-selected connector pins 34 of the electrical connector 30.

The control screen 125 and the control screen 150 also can include icons or graphics 131, 132 that provide visual indications of the measured and target temperatures of the heating device 80. The control screen 125 and the control screen 150 also can include icons or graphics, such as control boxes 133 and 134 that an operator can select to activate or deactivate the heating device 80 and to selectively increase or decrease the target temperature of the heating device 80. The control unit 110 can be configured to respond to the selection of the control box 134 by applying an electrical drive signal to the heating elements 83 to activate the heating device 80 or by removing the electrical drive signal to deactivate the heating device 80. The control unit 110 also can be configured to respond to the selection of the control box 134 by activating the heating device 80 for a predetermined period of time and then automatically deactivating the heating device 80. In that case, the operator need only select the control box 134 to activate the heating device 80.

The control unit 110 can be configured to control the display 120 to display the measured temperature 131 of the heating device 80 as determined by the control unit 110 from the measured temperature data provided by the temperature measuring device 86. The control boxes 133 can be selected by an operator to increase (+) or decrease (−) the target temperature of the heat the heating device 80 is to provide to a selected connector pin 34. Under control of the control unit 110, the display 120 also displays the selected target temperature 132. The control unit 110 can be configured to respond to the selection of control boxes 133 by an operator to maintain the electrical drive signal to the heating elements 83 if the measured temperature has not reached the target temperature or to remove the electrical drive signal from the heating elements 83 if the measured temperature exceeds the target temperature. The control unit 110 also can be configured to respond to the selection of control box 133 by increasing or decreasing the level and/or frequency of the electrical drive signal to the heating elements 83 to increase or decrease the temperature of the heat provided by the heating device 80 to the selected connector pin 34. The control unit 110 can be configured to monitor the temperature provided by the heating device 80 to a selected connector pin 34 via the temperature measuring device 86 and to either deactivate the heating device 80 when the measured temperature reaches the target temperature or to increase or decrease the level and/or frequency of the electrical drive signal to the heating elements 83 as necessary for the measured temperature to reach and maintain the target temperature.

The control screen 125 also can include an icon or graphic, such as a control box 135, that can be selected by an operator to position the heating device 80 from a position beneath a selected connector pin 34 to a heating position relative to the selected connector pin 34, and to remove the heating device 80 from the heating position to a position beneath the connector pin 34. The control unit 110 can be configured to respond to the selection of control box 135 when the heating device 80 is beneath a selected connector pin 34 and not in the heating position by controlling the robotic positioner 90 to move the heating device 80 to the heating position relative to the selected connector pin 34. Similarly, the control unit 110 can be configured to respond to selection of the control box 135 by an operator when the heating device 80 is in the heating position relative to a selected connector pin 34 by controlling the robotic positioner 90 to move the heating device 80 from the heating position to a position beneath the selected connector pin 34.

Alternatively or in addition to the above, the operator can also manually actuate an input device of the I/O devices 108, such as a foot switch and/or a hand switch, to generate an input signal indicating to the control unit 110 to move the heating device 80 into and out of a heating position relative to the selected connector pin 34. The control unit 110 can be configured to respond to the input signal in the same way it responds to the operator selecting the control box 135 on the display 120.

It will be appreciated that while movement of the heating device 80 into and out of the heating position relative to a selected connector pin 34 can be initiated manually by an operator as described above, the control unit 110 can also be configured to automatically move the heating device 80 into and out of a heating position without operator intervention, for example in connection with or as a continuation of moving the heating device 80 from one selected connector pin 34 to another.

The display 120 under control of the control unit 110 can also display one or more visual indications of the heating position status of the heating device 80 to show an operator whether the heating device 80 is in or is removed from a heating position relative to a selected connector pin 34. The control unit 110 can be configured to control the display 120 to display the control box 135 as a visual indication of the heating position status of the heating device 80, for example by displaying the terms "Engage" and "Disengage" in association with the control box 135. "Engage" indicates that the heating device 80 is not in a heating position and selection of the control box 135 is required to move the heating device 80 into the heating position. "Disengage" indicates that the heating device 80 is in a heating position and selection of the control box 135 is required to remove the heating device 80 from the heating position. It is noted that although the control box 135 as illustrated in FIGS. 19A and 19B provides the visual indication of heating position status using the descriptors "Engage" and "Disengage," this is for example purposes only and other descriptive terms can be used instead. In addition, it will be recalled that whether the heat providing element of the heating device 80 is actually in physical engagement with a selected connector pin 34 or in proximity to but not in actual physical engagement with the selected connector pin 34 depends on whether the thermal tip 84 or nozzle 85 is employed as the heat providing element.

The control unit 110 also can be configured to control the display 120 to display the pins in the graphic representation of the connector pins 34 of the electrical connector 30 to provide a visual indication of the heating position status of the heating device 80 relative to the selected connector pin 34. For description it is assumed again that the currently selected connector pin 34 of the electrical connector 30 corresponds to the connector pin labeled "1" in the graphic representation 126 on the control screen 125. The control unit 110 can be figured such that when the heating device 80 is in the heating position with respect to the selected connector pin 34, the control unit 110 controls the display 120 to display pin "1" with one or more display attributes that are different from the one or more display attributes with which pin "1" was previously displayed to indicate the corresponding connector pin 34 has been selected (FIG. 19A). The display attributes with which pin "1" is displayed to indicate the heating device 80 is in the heating position should also be different from the display attributes with which the other pins "2"-"16" of the graphic representation 126 that correspond to non-selected connector pins 34 of the electrical connector 30 are displayed.

Accordingly, pin "1" is illustrated in FIG. 19B as being displayed with one or more different display attribute(s) by reverse diagonal hashes as compared to the diagonal hashes shown for pins "2"-"16" and the vertical hashes shown for pin "1" in FIG. 19A. For example, when the connector pin 34 corresponding to pin "1" has been selected and the heating device 80 is in the heating position relative to the selected connector pin 34, pin "1" may be displayed as having a particular color, e.g., red, that is different from the color, e.g., yellow, with which pin "1" was displayed when the corresponding connector pin 34 had been selected but the heating device 80 was not in the heating position. Thus, the use of two different display attributes, in this example color, to display the pin in the graphical representation that corresponds to the selected connector pin 34, provides a visual indication of the heating position status of the heating device 80 with respect to the selected connector pin 34. As noted previously, other display attributes besides color can also be employed alone or in combination, including without limitation blinking, brightness, etc.

The control screens 125 and 150 can include any number of other icons or graphics, including control boxes, for an operator to control the operations of the example robotic wire termination system 10. The control screens 125 and 150 can include a control box 136 that an operator can select to return to a home screen, for example the control screen 122. This control box 136 can be selected by an operator for example when the operator has completed connecting wires 20 to all of the electrical connectors 30 of one type and needs to switch to an electrical connector 30 of another type.

The control screen 125 can also include a control box 137 that an operator can select to stop the system from carrying out a sequence or series of wire connection operations, and a control box 138 that an operator can select to quit further use of the system and shut down. The control screen 150 can include a similar control box 139 that an operator can select to exit manual mode and return to the control screen 122 or 125 for example. The control screen 150 also can include a control box 140 that can be selected to cause the control unit 110 to control the robotic positioner 90 to return the heating device 80 from its current position to its zero or start position, and a control box 141 that can be selected to set the current position of the heating device 80 as its zero or starting position. The control screen 150 also can include a control box 142 that can be selected to cause the control unit 110 to control the robotic positioner 90 to position the heating device 80 with the heat providing device elevated and directly beneath the opening 64 in the alignment plate retainer 60 in the top surface 44 of the housing 40 to facilitate the operator changing or replacing the heat providing device (thermal tip 84 or nozzle 85) of the heating device 80.

J. Operation of Preferred Embodiment

Figure 21:
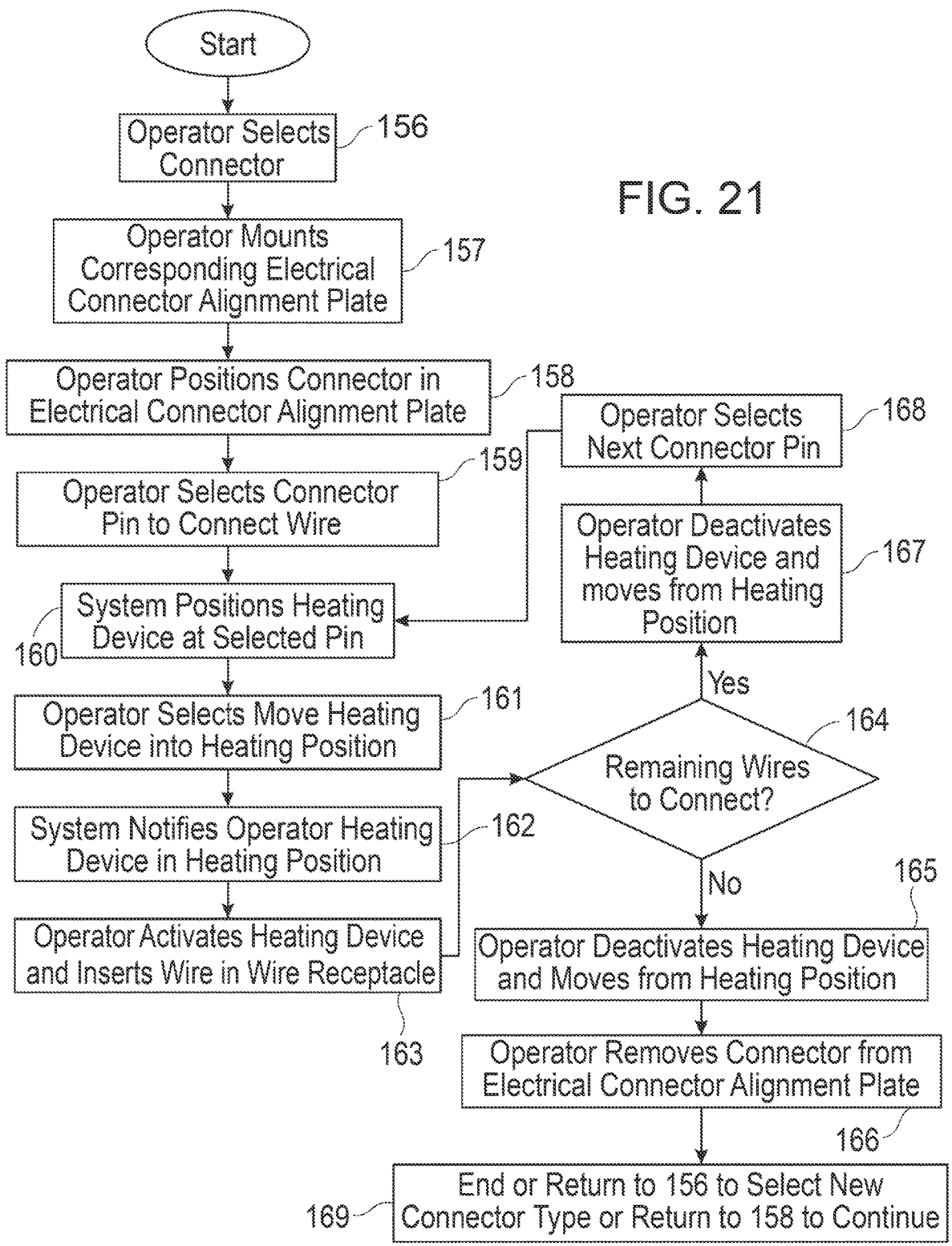
FIG. 21 is a flow chart illustrating an example of operation of a robotic wire termination system in accordance with an example embodiment.

An example of use of the example robotic wire termination system 10 to connect wires 20 to an electrical connector 30 is described with reference to FIG. 21 among others. When the example robotic wire termination system 10 is powered up, the display 120 displays the control screen 122. The operator selects an electrical connector 30 as indicated in flow chart box 156. The operator selects an electrical connector 30 by selecting the control box 123 on the control screen 122. In response, a list of electrical connectors 30 is displayed and the operator selects an electrical connector 30 from the list.

As indicated in flow chart box 157, the operator then mounts an alignment plate 70 corresponding to the selected electrical connector 30 in the alignment plate retainer 60 on the top surface 44 of the housing 40. The operator mounts the alignment plate 70 in the alignment plate retainer 60 in a specific position and orientation as determined by the inset portion 62 of the alignment plate retainer 60. The operator secures the alignment plate 70 in the alignment plate retainer 60 using the retainer 66.

As indicated in flow chart box 158, the operator then positions the selected electrical connector 30 in the alignment plate 70. The operator positions the selected electrical connector in the alignment plate 70 in a specific position and orientation with the keys of the electrical connector 30 and the alignment plate 70 aligned, i.e., with the flats 31, 71 and/or the notches and protrusions 37, 79 aligned. With the electrical connector 30 properly positioned in the alignment plate 70, the male connecting ends 36 of the connector pins 34 are exposed to the interior 42 of the housing 40 and the corresponding wire receptacles 38 of the connector pins 34 are exposed outside the housing 40.

As indicated in flow chart box 159, the operator selects a connector pin 34 to which a wire 20 is to be connected. As described herein, the operator can manually select the connector pin 34 by selecting a corresponding pin in the graphic representation 126 of the connector pins 34 on the control screen 125 displayed on display 120. The operator can also manually select the connector pin 34 by selecting movement control boxes 152 on the control screen 152 displayed on the display 120 to manually move the heating device 80 to the coordinates of a position beneath the selected connector pin 34. The operator also can select the connector pin 34 by simply allowing the system to power up in automatic mode or by selecting control box 128 on the control screen 125 displayed on the display 120 to place the system in automatic mode. In automatic mode, the system automatically selects the first connector pin 34 on the electrical connector 30. As indicated in flow chart box 160, in response to the selection of the connector pin 34, the system automatically provides a visual indication of the selected connector pin 34 on control screen 125 and moves the heating device 80 to a set of coordinates corresponding to a position beneath the selected connector pin 34.

The system provides a visual indication of the selected connector pin 34 by displaying the corresponding pin of the graphical representation of connector pins 126 on the control screen 125 with a unique display attribute, e.g., yellow color. The operator can use this visual indication to confirm that the correct connector pin 34 has been selected before proceeding.

As indicated in flow chart box 161, the operator can then select to move the heating device 80 into the heating position relative to the selected connector pin 34. The operator can select to move the heating device 80 into the heating position by selecting the control box 135 on control screen 125 or by manually actuating an input device of the I/O devices 108, e.g., a foot switch or hand switch. In response, the system automatically positions the heating device 80 to a set of coordinates corresponding to the heating position. In the heating position, the heat providing element of the heating device 80 is either in contact with the male connecting end 36 of the selected connector pin 34 or is in proximity to but not in contact with the male connecting end 36 depending on the heat providing element being used.

As indicated in flow chart box 162, the system provides a visual indication to notify the operator that the heating device 80 is in the heating position relative to the selected connector pin 34. The system notifies the operator by displaying the connector pin in the graphical representation 126 of connector pins displayed on the control screen 125 that corresponds to the selected connector pin 34 with another unique display attribute, e.g., red color.

As indicated in flow chart box 163, the operator can then select to activate the heating device 80 to provide heat to the selected connector pin 34. The operator can select to activate the heating device 80 by selecting the control box 134 displayed on control screen 125 or by manually actuating an input device of the I/O devices 108, a foot switch or hand switch. In response, the system activates the heating elements 83 of the heating device 80. The operator can monitor the measured temperature 131 and the target temperature 132 of the heating device 80 displayed on the control screen 125. The operator also can adjust the target temperature by selecting the temperature control boxes 133 displayed on the control screen 125. When the temperature of the heat provided by the heating device 80 to the selected connector pin 34 is sufficient to melt solder preform 39, the operator inserts the end of a wire 20 in the wire receptacle 38 of the selected connector pin 34 to connect the wire 20 to the electrical connector 30.

As indicated in flow chart decision box 164 the operator next determines if there are any remaining wires 20 to be connected to the electrical connector 30. If no wires 20 remain to be connected, then as indicated in flow chart box 165 the operator deactivates the heating device 80 and moves the heating device 80 from the heating position. The operator can deactivate the heating device 80 and move it from the heating position by selecting the control boxes 134 and 135 displayed on control screen 125 or by manually actuating an input device of the I/O devices 108, e.g., a foot switch or hand switch. Alternatively, the system can automatically deactivate the heating device 80 after a predetermined period of time has elapsed or in response to the operator selecting the control box 135 or actuating an input device to remove the heating device 80 from the heating position. In response to the operator selecting control box 135 or actuating an input device, the system automatically moves the heating device 80 from the heating position to a set of coordinates corresponding to a position beneath the selected connector pin 34. Then, as indicated in flow chart box 166, the operator removes the electrical connector 30 with connected wires 20 from the alignment plate 70.

However, if any wires 20 remain to be connected to the electrical connector 30 then as indicated in flow chart box 167 the operator deactivates the heating device 80 and moves it from the heating position in the same manner as described above with respect to flow chart box 165. Next, as indicated in flow chart box 168, the operator selects the next connector pin 34 to which a wire 20 is to be connected. The operator can manually select the next connector pin 34 in the same manner as the previous connector pin 34 by selecting the corresponding pin in the graphic representation 126 displayed on control screen 125. In automatic mode, the operator can select the control box 129 displayed on the control screen 125 or actuate an input device of the I/O devices 108, e.g., a footswitch or hand switch, and the system automatically selects the next connector pin 34 in a predetermined sequence or series of connector pins 34. In response to the selection of the next connector pin 34 by the operator or by the system, the system automatically moves the heating device 80 to a set of coordinates corresponding to a position beneath the selected connector pin 34 as indicated in flow chart box 160. The foregoing process continues indefinitely until all wires 20 to be connected to the electrical connector 30 have been connected.

As indicated in flow chart box 169, once all of the wires 20 to be connected to an electrical connector 30 have been connected, the operator can end the process and quit connecting additional wires 20 to additional electrical connectors 30. For example, the operator can select the control box 138 ("Quit") on the control screen 125 to quit further use of the system and shut down.

Alternatively, the operator can continue to connect additional wires 20 to additional electrical connectors 30 of the same type. The operator can remove the electrical connector 30 to which wires 20 have been connected from the alignment plate 70 and replace it with an electrical connector 30 of the same type to which wires 20 are to be connected next as described above with respect to flow chart box 158. Using control screen 125, the operator can then select the mode of operation by selecting control box 127 or 128 and, if proceeding manually, an individual starting pin by selecting a position in the graphical representation 126 associated with the selected connector pin 34 as previously described. Alternatively or in addition to the above, the operator can also manually actuate an input device of the I/O devices 108, such as a foot switch and/or a hand switch, to generate an input signal to begin the process of connecting wires 20 to the next electrical connector 30 of the same type in the manner described above in connection with flow chart boxes 159 et seq. The foregoing process can continue indefinitely until all of the electrical connectors 30 of the same type to which wires 20 are to be connected have had wires 20 connected.

Alternatively also, the operator can continue and prepare to connect wires 20 to electrical connectors 30 of a different type. For example, the operator can select the control box 136 ("Home") on control screen 125 or control screen 150 to return to control screen 122. On control screen 122, the operator can select control box 123 and then select a type of electrical connector 30 to which wires 20 are to be connected as described above in connection with flow chart box 156. The operator can then mount an alignment plate 70 corresponding to the selected type of electrical connector 30 in the alignment plate retainer 60 on the housing 40, position an electrical connector 30 of the selected type in the alignment plate 70, and continue the process of connecting wires 20 to electrical connectors 30 of the selected type as described above in connection with flow chart boxes 157-159. The process of selecting different types of electrical connectors 30 and connecting wires 20 to electrical connectors 30 of the selected types can continue indefinitely until all electrical connectors 30 of all types to which wires 20 are to be connected have had the wires 20 connected.

Any and all headings are for convenience only and have no limiting effect. Unless otherwise defined, all technical and scientific terms used herein have the same meaning as commonly understood by one of ordinary skill in the art to which this invention belongs. Although specific terms are employed herein, they are used in a generic and descriptive sense only and not for purposes of limitation. All publications, patent applications, patents, and other references mentioned herein are incorporated by reference in their entirety to the extent allowed by applicable law and regulations.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs), DVDs (digital video discs), and computer instruction signals embodied in a transmission medium (with or without a carrier wave upon which the signals are modulated). For example, the transmission medium may include a telecommunications network, such as the Internet.

At least one embodiment of the robotic wire termination system is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention. These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer-readable program code or program instructions embodied therein, the computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks. Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

The present invention may be embodied in other specific forms without departing from the spirit or essential attributes thereof, and it is therefore desired that the present embodiment be considered in all respects as illustrative and not restrictive. Many modifications and other embodiments of the robotic wire termination system will come to mind to one skilled in the art to which this invention pertains and having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although methods and materials similar to or equivalent to those described herein can be used in the practice or testing of the robotic wire termination system, suitable methods and materials are described above. Thus, the robotic wire termination system is not intended to be limited to the embodiments shown, but is to be accorded the widest scope consistent with the principles and features disclosed herein.

What is claimed is:

1. A system, comprising:
a robotic positioner, the robotic positioner comprising a first positioner movable along a first longitudinal axis, a second positioner movable along a second longitudinal axis substantially orthogonal to the first longitudinal axis, and a third positioner movable in a third longitudinal axis substantially orthogonal to the first longitudinal axis and to the second longitudinal axis, wherein each of the first positioner, the second positioner, and the third positioner is selectively and independently controllable for movement;
a heating device connected to the third positioner of the robotic positioner, wherein the heating device comprises a thermal tip or a nozzle adapted to direct a flow of heated air; and
a control unit in communication with the robotic positioner, wherein the control unit is configured to independently control the first positioner, the second positioner, and the third positioner to position the heating device in a plurality of heating positions with each heating position of the plurality of heating positions being associated with a connector pin of a plurality of connector pins of an electrical connector to melt solder in a corresponding wire receptacle of a plurality of corresponding wire receptacles of the electrical connector;
wherein the first longitudinal axis and the second longitudinal axis extend laterally beneath the plurality of connector pins, and the third longitudinal axis extends vertically in relation to the plurality of connector pins.

2. The system of claim 1, wherein the control unit is configured to move and position the heating device to a first set of coordinates that correspond to a first heating position relative to a first selected connector pin of the plurality of connector pins and a second set of coordinates that correspond to a second heating position relative to a second selected connector pin of the plurality of connector pins.

3. The system of claim 1, wherein the control unit is configured to automatically control the first positioner, the second positioner, and the third positioner to position the heating device in the plurality of heating positions.

4. The system of claim 1, wherein the control unit is configured to move and position the heating device based on a manual input from an operator.

5. The system of claim 1, wherein the control unit is configured to move and position the heating device along a common row of the plurality of connector pins.

6. The system of claim 1, wherein the first positioner, the second positioner and the third positioner are each comprised of a linear positioner.

7. The system of claim 1, wherein the first positioner and the second positioner are each comprised of a stepper motor-driven leadscrew linear stage.

8. The system of claim 1, wherein the third positioner is comprised of a stepper motor-driven leadscrew vertical lift stage.

9. The system of claim 1, including a display in communication with the control unit, wherein the display is comprised of a touch sensitive type display adapted and configured to sense an operator physically selecting a visual indication on the display and in response to generate a corresponding input signal that is received by the control unit indicating a selection of the visual indication on the display.

10. The system of claim 1, including a holder member adapted to removably receive and hold the electrical connector.

11. The system of claim 1, wherein the second positioner is connected to the first positioner, wherein the first positioner moves the second positioner along an axis that is parallel to the first longitudinal axis, wherein the third positioner is connected to the second positioner, and wherein the second positioner moves the third positioner along an axis that is parallel to the second longitudinal axis.

12. The system of claim 1, wherein the first positioner includes a first linear stage movable along the first longitudinal axis, wherein the second positioner is connected to the first linear stage of the first positioner, and wherein the first positioner moves the second positioner along an axis that is parallel to the first longitudinal axis.

13. The system of claim 1, wherein the second positioner is connected to the first positioner, wherein the third positioner is connected to the second positioner, wherein the first positioner moves the second positioner along an axis that is parallel to the first longitudinal axis, and wherein the second positioner moves the third positioner along an axis that is parallel to the second longitudinal axis.

14. The system of claim 1, wherein the first positioner includes a first linear stage movable along or parallel to the first longitudinal axis, wherein the second positioner includes a second linear stage movable along or parallel to the second longitudinal axis, wherein the second positioner is connected to the first linear stage of the first positioner, wherein the first positioner moves the second positioner along an axis that is parallel to the first longitudinal axis, wherein the third positioner is connected to the second linear stage of the second positioner, and wherein the second positioner moves the third positioner along an axis that is parallel to the second longitudinal axis.

15. The system of claim 1, wherein the first positioner includes a first guide rail and a first linear stage movably connected to the first guide rail, wherein the first linear stage is movable along or parallel to the first longitudinal axis, wherein the second positioner includes a second guide rail and a second linear stage movably connected to the second guide rail, wherein the second linear stage is movable along or parallel to the second longitudinal axis, wherein the second positioner is connected to the first linear stage of the first positioner, wherein the first positioner moves the second positioner along an axis that is parallel to the first longitudinal axis, wherein the third positioner is connected to the second linear stage of the second positioner, and wherein the second positioner moves the third positioner along an axis that is parallel to the second longitudinal axis.

16. The system of claim 1, wherein the first positioner includes a first guide rail, a first drive screw and a first linear stage movably connected to the first guide rail and the first drive screw, wherein the first linear stage is movable along or parallel to the first longitudinal axis, wherein the second positioner includes a second guide rail, a second drive screw and a second linear stage movably connected to the second guide rail and the second drive screw, wherein the second linear stage is movable along or parallel to the second longitudinal axis, wherein the second positioner is connected to the first linear stage of the first positioner, wherein the first positioner moves the second positioner along an axis that is parallel to the first longitudinal axis, wherein the third positioner is connected to the second linear stage of the second positioner, and wherein the second positioner moves the third positioner along an axis that is parallel to the second longitudinal axis.

17. A system, comprising:
a robotic positioner, the robotic positioner comprising a first positioner movable along a first longitudinal axis, a second positioner movable along a second longitudinal axis substantially orthogonal to the first longitudinal axis, and a third positioner movable in a third longitudinal axis substantially orthogonal to the first longitudinal axis and to the second longitudinal axis, wherein each of the first positioner, the second positioner, and the third positioner is selectively and independently controllable for movement;
wherein the second positioner is connected to the first positioner, wherein the third positioner is connected to the second positioner, wherein the first positioner moves the second positioner along an axis that is parallel to the first longitudinal axis, and wherein the second positioner moves the third positioner along an axis that is parallel to the second longitudinal axis;
a heating device connected to the third positioner of the robotic positioner; and
a control unit in communication with the robotic positioner, wherein the control unit is configured to independently control the first positioner, the second positioner, and the third positioner to position the heating device in a plurality of heating positions with each heating position of the plurality of heating positions being associated with a connector pin of a plurality of connector pins of an electrical connector to melt solder in a corresponding wire receptacle of a plurality of corresponding wire receptacles of the electrical connector;
wherein the first longitudinal axis and the second longitudinal axis extend laterally beneath the plurality of connector pins, and the third longitudinal axis extends vertically in relation to the plurality of connector pins;

wherein the control unit is configured to move and position the heating device to a first set of coordinates that correspond to a first heating position relative to a first selected connector pin of the plurality of connector pins and a second set of coordinates that correspond to a second heating position relative to a second selected connector pin of the plurality of connector pins.

18. The system of claim 17, including a display in communication with the control unit, wherein the display is comprised of a touch sensitive type display adapted and configured to sense an operator physically selecting a visual indication on the display and in response to generate a corresponding input signal that is received by the control unit indicating a selection of the visual indication on the display.

19. A robotic positioner system, comprising:
a first positioner movable along a first longitudinal axis;
a second positioner movable along a second longitudinal axis substantially orthogonal to the first longitudinal axis;
a third positioner movable in a third longitudinal axis substantially orthogonal to the first longitudinal axis and to the second longitudinal axis;
wherein each of the first positioner, the second positioner, and the third positioner is selectively and independently controllable for movement;
wherein the first positioner and the second positioner are each comprised of a linear positioner;
wherein the second positioner is connected to the first positioner, wherein the third positioner is connected to the second positioner, wherein the first positioner moves the second positioner along an axis that is parallel to the first longitudinal axis, and wherein the second positioner moves the third positioner along an axis that is parallel to the second longitudinal axis;
a heating device connected to the third positioner, wherein the heating device comprises a thermal tip or a nozzle adapted to direct a flow of heated air; and
a control unit, wherein the control unit is configured to communicate with and independently control the first positioner, the second positioner, and the third positioner to position the heating device in a plurality of heating positions with each heating position of the plurality of heating positions being associated with a connector pin of a plurality of connector pins of an electrical connector to melt solder in a corresponding wire receptacle of a plurality of corresponding wire receptacles of the electrical connector;
wherein the first longitudinal axis and the second longitudinal axis extend laterally beneath the plurality of connector pins, and the third longitudinal axis extends vertically in relation to the plurality of connector pins;
wherein the control unit is configured to move and position the heating device to a first set of coordinates that correspond to a first heating position relative to a first selected connector pin of the plurality of connector pins and a second set of coordinates that correspond to a second heating position relative to a second selected connector pin of the plurality of connector pins;
wherein the control unit is configured to automatically control the first positioner, the second positioner, and the third positioner to position the heating device in the plurality of heating positions.

20. The robotic positioner system of claim 19, including a display in communication with the control unit, wherein the display is comprised of a touch sensitive type display adapted and configured to sense an operator physically selecting a visual indication on the display and in response to generate a corresponding input signal that is received by the control unit indicating a selection of the visual indication on the display.

* * * * *